US010885425B2

(12) United States Patent
Imam et al.

(10) Patent No.: US 10,885,425 B2
(45) Date of Patent: Jan. 5, 2021

(54) NETWORK TRAVERSAL USING NEUROMORPHIC INSTANTIATIONS OF SPIKE-TIME-DEPENDENT PLASTICITY

(71) Applicant: Intel Corporation, Santa Clar, CA (US)

(72) Inventors: Nabil Imam, Sam Jose, CA (US); Narayan Srinivasa, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 1051 days.

(21) Appl. No.: 15/385,220

(22) Filed: Dec. 20, 2016

(65) Prior Publication Data
US 2018/0174041 A1    Jun. 21, 2018

(51) Int. Cl.
*G06N 3/08* (2006.01)
*G06N 3/04* (2006.01)
*G06N 3/063* (2006.01)
*G06N 3/00* (2006.01)

(52) U.S. Cl.
CPC ......... *G06N 3/049* (2013.01); *G06N 3/063* (2013.01); *G06N 3/088* (2013.01); *G06N 3/008* (2013.01)

(58) Field of Classification Search
CPC .................. G06N 3/049; G06N 3/08
See application file for complete search history.

(56) References Cited

U.S. PATENT DOCUMENTS

| 2013/0073497 | A1* | 3/2013 | Akopyan | G06N 3/049 706/27 |
| 2015/0242746 | A1* | 8/2015 | Rao | G06N 3/088 706/16 |
| 2017/0364793 | A1* | 12/2017 | Kim | G11C 11/54 |

OTHER PUBLICATIONS

EPO; Office Action issued in EP Patent Application No. 17204236.8, dated Aug. 8, 2019; 12 pages.
Davies Mike et al: "Loihi: A Neuromorphic Manycore Processor with On-Chip Learning", IEEE Micro, IEEE Service Center, Los Alamitos, CA, US, vol. 38, No. I, Jan. 1, 2018 (Jan. 1, 2018), 18 pgs.
EESR European Search Report issued in EP Patent Application No. 17204236.8 dated Apr. 20, 2018 (11 pages).
Filip Ponulak et al: "Rapid, parallel path planning by propagating wavefronts of spiking neural activity", Frontiers in Computational Neuroscience, vol. 7, Jan. 1, 2013 (Jan. 1, 2013) 14 pgs.
Kichmar Jeffrey L: "Path planning using a spiking neuron algorithm with axonal delays", 2016 IEEE Congress on Evolutionary Computation (CEC), IEEE, Jul. 24, 2016 (Jul. 24, 2016), 8 pgs.

(Continued)

*Primary Examiner* — Hal Schnee
(74) *Attorney, Agent, or Firm* — Alliance IP, LLC

(57) ABSTRACT

A spiking neural network (SNN) includes artificial neurons interconnected by artificial synapses to model a particular network. A first neuron emits spikes to neighboring neurons to cause a wave of spikes to propagate through the SNN. Weights of a portion of the synapses are increased responsive to the wave of spikes based on a spike timing dependent plasticity (STDP) rule. A second neuron emits spike to cause a chain of spikes to propagate to the first neuron on a path based on the increase in the synaptic weights. The path is determined to represent a shortest path in the particular network from a first network node represented by the second neuron to a second network node represented by the first neuron.

19 Claims, 34 Drawing Sheets

(56) References Cited

OTHER PUBLICATIONS

P. A. Merolla et al: "A million spiking-neuron integrated circuit with a scalable communication network and interface", Science, vol. 345, No. 6197, Aug. 8, 2014 (Aug. 8, 2014) 7 pgs.
Steve Furber: "Large-scale neuromorphic computing systems", Journal of Neural Engineering, Institute of Physics Publishing, Bristol, GB, vol. 13, No. 5, Aug. 16, 2016 (Aug. 16, 2016) 15 pgs.
Ulrich Roth et al: "Dynamic path planning with spiking neural networks" In: "Biological and Artificial Computation: From Neuroscience to Technology. IWANN 1997.", Jan. 1, 1997 (Jan. 1, 1997), Springerinternational Publishing, Cham 032548, 10 pgs.

* cited by examiner

1100e

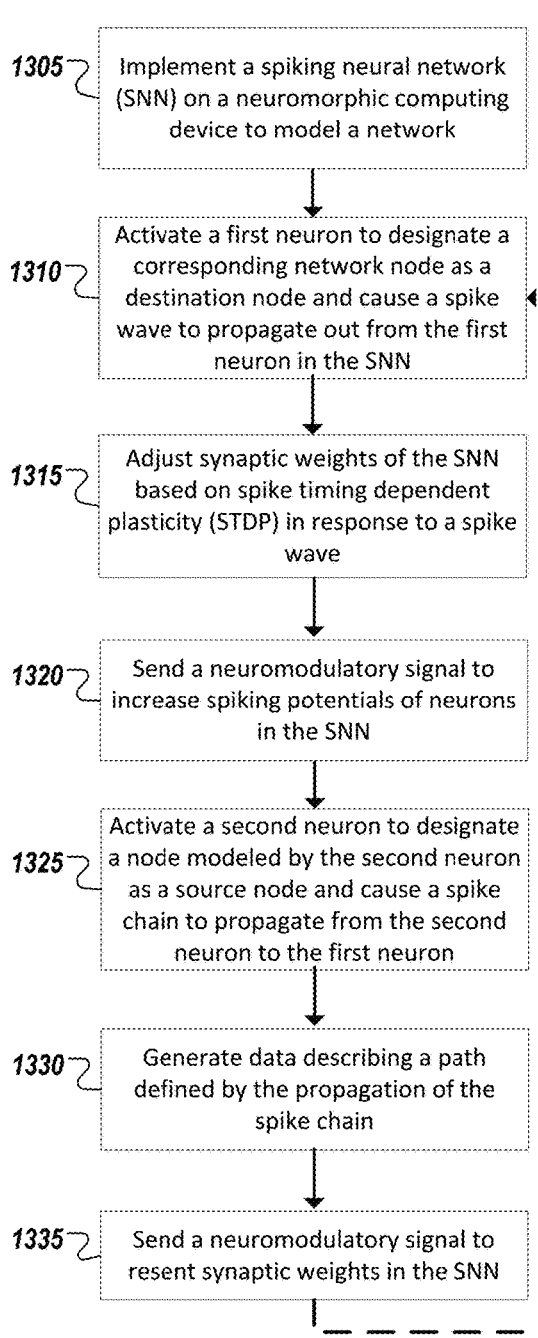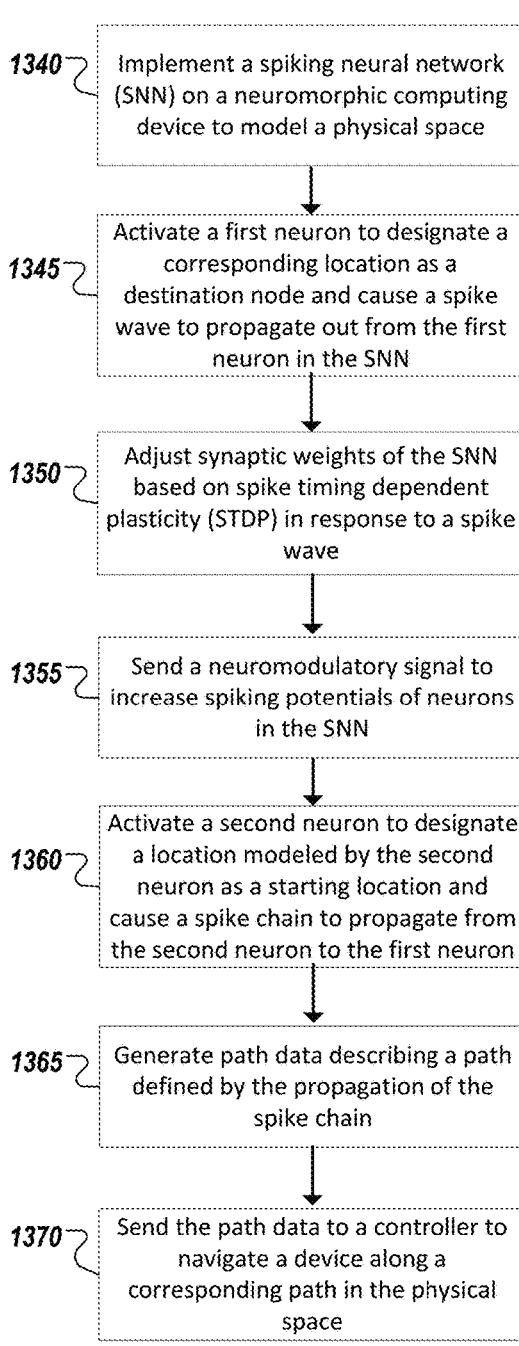
FIG. 13A
FIG. 13B

US 10,885,425 B2

NETWORK TRAVERSAL USING NEUROMORPHIC INSTANTIATIONS OF SPIKE-TIME-DEPENDENT PLASTICITY

TECHNICAL FIELD

This disclosure relates in general to the field of computer systems and, more particularly, to neuromorphic computing.

BACKGROUND

Artificial neural networks (or ANNs) are generally presented as systems of interconnected "neurons" which can compute values from inputs. ANNs represent one of the most relevant and widespread techniques used to learn and recognize patterns. Consequently, ANNs have emerged as an effective solution for intuitive human/device interactions that improve user experience, a new computation paradigm known as "cognitive computing." Among other usages, ANNs can be used for imaging processing, voice and object recognition or natural language processing. Convolution Neural Networks (CNNs) and Deep Belief Networks (DBNs) are just a few examples of computation paradigms that employ ANN algorithms.

BRIEF DESCRIPTION OF THE DRAWINGS

FIGS. 13A-13C are flowcharts illustrating example techniques involving spiking neural networks (SNNs) to determine paths within networks of various topologies.

Like reference numbers and designations in the various drawings indicate like elements.

DETAILED DESCRIPTION OF EXAMPLE EMBODIMENTS

Figure 1:
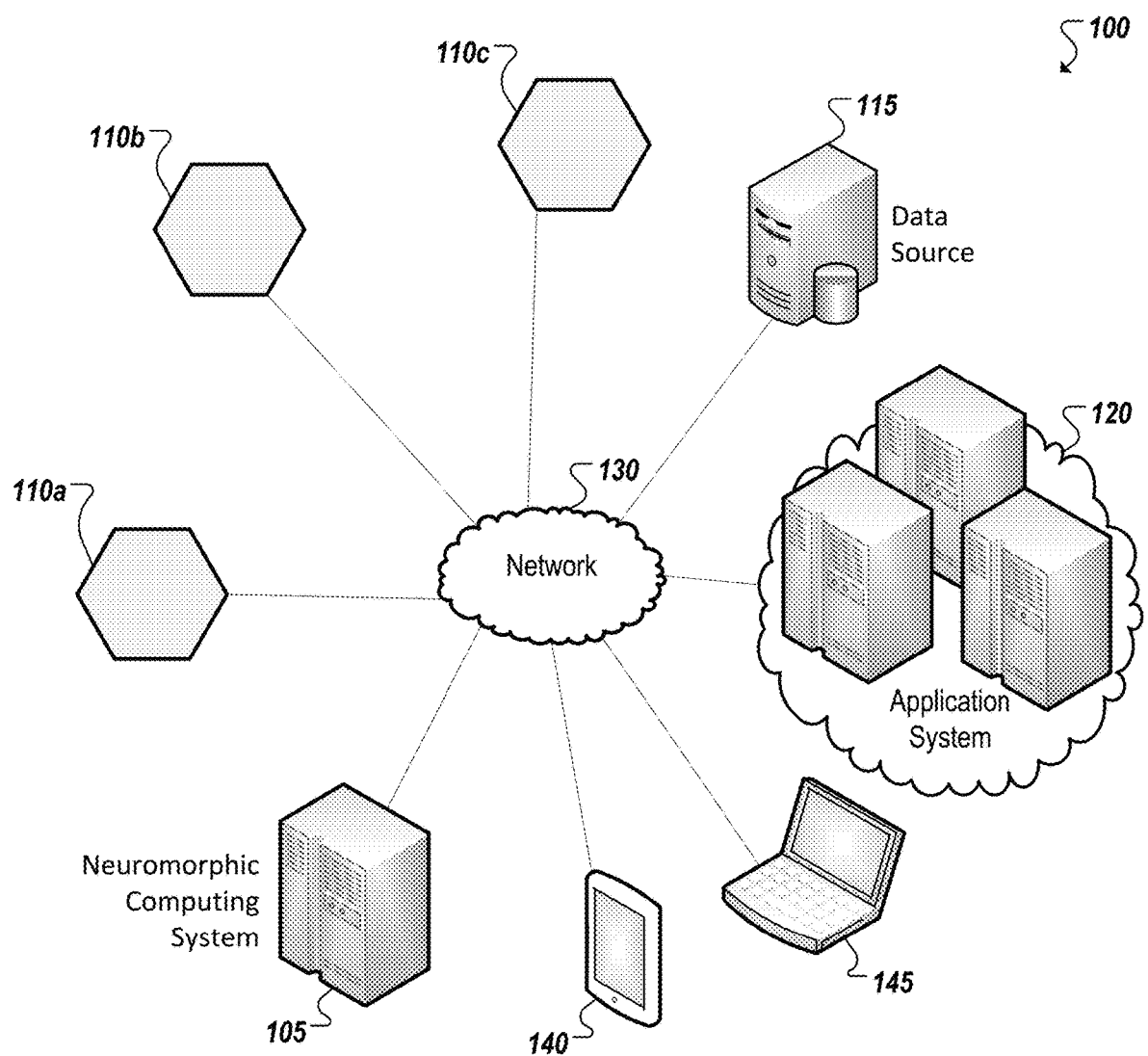
FIG. 1 illustrates an embodiment of a system including a neuromorphic computing systems.

FIG. 1 illustrates an example computing system including a neuromorphic computing system 105, which may accept as inputs, data from one or a variety of sources. For instance, sources may include sensor devices (e.g., 110*a-c*). Such devices 110*a-c* may detect and/or measure attributes of an environment and generate sensor data describing or capturing characteristics of the environment. For instance, a given sensor may be configured to detect such characteristics as movement, weight, physical contact, temperature, wind, noise, light, computer communications, wireless signals, humidity, the presence of radiation or specific chemical compounds, among several other examples. Sensors may generate numerical data describing these attributes, audio data, photographic images, video, among other sensor data. Sources may additionally include data stores, such as databases of one or more computing systems (e.g., 115), which may aggregate data and/or generate additional data (e.g., from post processing of the aggregated data), such as in connection with a governmental, enterprise, scientific, or other entity or project. Data from the one or more sources (e.g., 110*a-c*, 115, etc.) may be provided to the neuromorphic computing system 105 to perform machine and deep learning as well as other tasks on the information encapsulated in the data. Results of produced by the neuromorphic computing system 105 may be additionally consumed, for instance, by an application system 120 hosting one or more other processes, programs, or applications. User endpoint devices (e.g., 140, 145), such as personal computers and mobile devices, may additionally make use of the results generated from or in connection with a neuromorphic computing system 105, such as through the consumption of the results by one or more applications hosted by the user devices (e.g., 140, 145), presenting the results on a graphical user interface of the user device. In still other examples, machine learning functionality of the neuromorphic computing system 105 may be consumed by robots, autonomous vehicles, autonomous devices, among other examples.

In some instances, as implied by the example illustrated in FIG. 1, a neuromorphic computing system 105 may be provided as a service (e.g., over a network 130) to one or more other systems (e.g., 120, 140, 145). A neuromorphic computing system 105 may additionally utilize inputs generated by remote systems (e.g., an Internet of Things (IoT) network composed of multiple sensor devices (e.g., 110*a-c*). In other instances, the functionality of a neuromorphic computing system 105 may be integrated with any one of the other example systems (e.g., 110*a-c*, 115, 120, 130, 140, 145, etc.), and vice versa. For instance, an autonomous device (such as a robot) may be provided with sensors (e.g., to determine location) and may be additionally provided with neuromorphic computing resources to operate directly on inputs generated by the sensors of the device. As another example, an application or service may be provided (e.g., by application server system 120), which includes and makes use of neuromorphic computing resources, among a variety of other examples and use cases. In general, "servers," "clients," "computing devices," "network elements," "hosts," "system-type system entities," "user devices," "sensor devices," and "systems" (e.g., 105, 110a-c, 115, 120, 130, 140, 145, etc.) in example computing environment 100, can include electronic computing devices operable to receive, transmit, process, store, or manage data and information associated with the computing environment 100. As used in this document, the term "computer," "processor," "processor device," or "processing device" is intended to encompass any suitable processing apparatus. For example, elements shown as single devices within the computing environment 100 may be implemented using a plurality of computing devices and processors, such as server pools including multiple server computers. Further, any, all, or some of the computing devices may be adapted to execute any operating system, including Linux, UNIX, Microsoft Windows, Apple OS, Apple iOS, Google Android, Windows Server, etc., as well as virtual machines adapted to virtualize execution of a particular operating system, including customized and proprietary operating systems.

While FIG. 1 is described as containing or being associated with a plurality of elements, not all elements illustrated within computing environment 100 of FIG. 1 may be utilized in each alternative implementation of the present disclosure. Additionally, one or more of the elements described in connection with the examples of FIG. 1 may be located external to computing environment 100, while in other instances, certain elements may be included within or as a portion of one or more of the other described elements, as well as other elements not described in the illustrated implementation. Further, certain elements illustrated in FIG. 1 may be combined with other components, as well as used for alternative or additional purposes in addition to those purposes described herein.

Neuromorphic computing may involve the use of very-large-scale integration (VLSI) systems containing electronic circuits to mimic neuro-biological architectures present in the nervous system to imbue computing systems with "intelligence". A desirable feature of neuromorphic computing is its ability to autonomously extract high dimensional spatiotemporal features from raw data streams that can reveal the underlying physics of the system being studied thus making them amenable for rapid recognition.

In some implementations, an improved neuromorphic computing platform may be provided which adopts an energy efficient architecture inspired by the brain that is both scalable and energy efficient while also supporting multiple modes of learning on-chip. Furthermore, such neuromorphic computing hardware may be connected to, integrated with, or otherwise used together with general computing hardware (e.g., a CPU) to support a wide range of traditional workloads as well as non-traditional workloads such as dynamic pattern learning and adaptation, constraint satisfaction and sparse coding using a single compute platform. Such a solution may leverage understandings from biological neuroscience regarding the improvement of system level performance by leveraging various learning modes such as unsupervised, supervised and reinforcement using spike timing and asynchronous computation, among other example features and considerations.

Figure 2A:
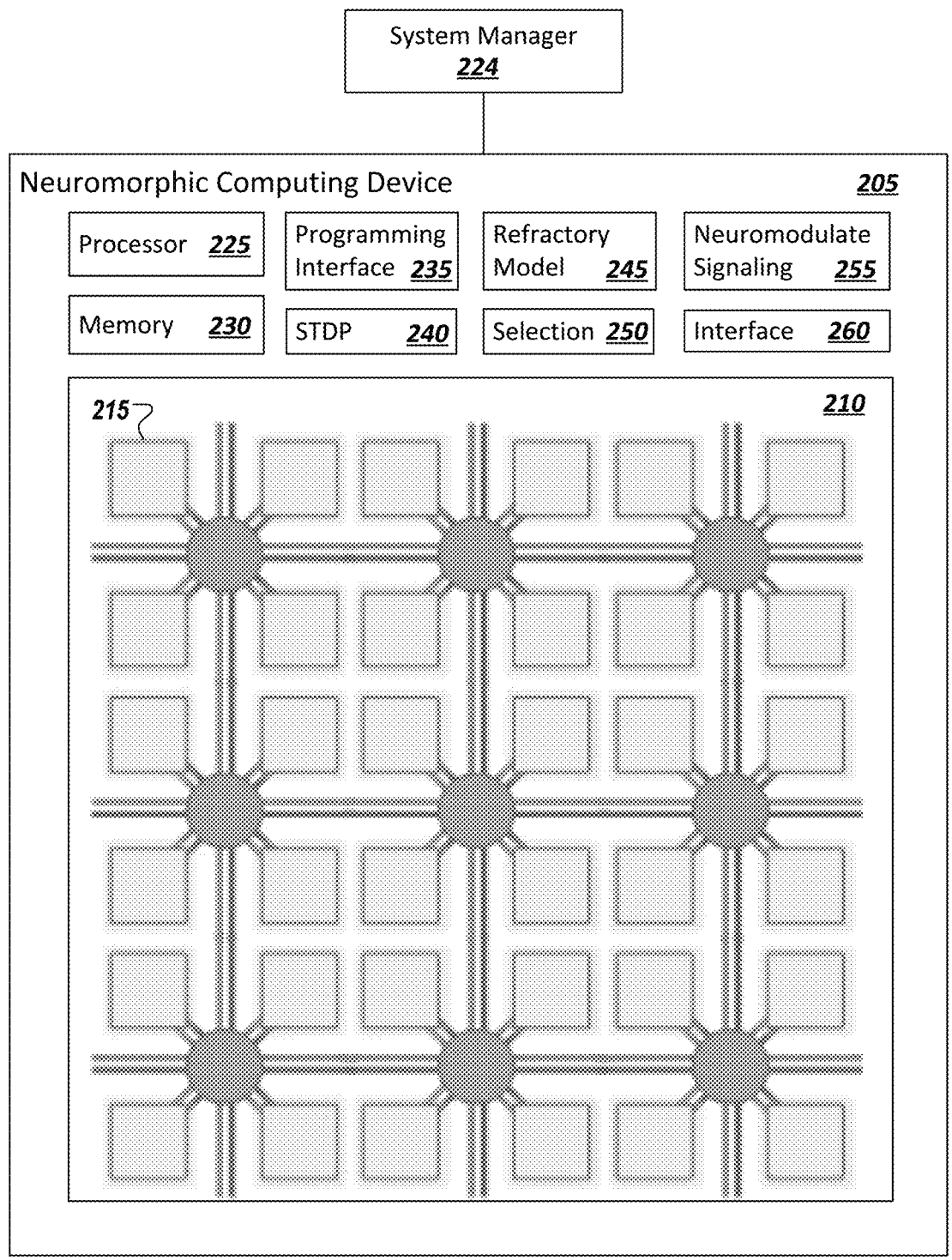
FIG. 2A illustrates a simplified block diagram of an example neuromorphic computing device utilizing a network of hardware-implemented neuromorphic cores.

In one implementation, a neuromorphic computing system is provided that adopts a multicore architecture where each core houses the computing elements including neurons, synapses with on-chip learning capability, and local memory to store synaptic weights and routing tables. FIG. 2A is a simplified block diagram 200 illustrating an example of at least a portion of such a neuromorphic computing device 205. As shown in this example, a neuromorphic computing device 205 may be provided with a network 210 of multiple neural network cores (e.g., 215) interconnected by an on-device network such that multiple different connections may be potentially defined between the cores. For instance, a network 210 of spiking neural network cores may be provided in the device 205 and may each communicate via short packetized spike messages sent from core to core over the network channels. Each core (e.g., 215) may possess processing and memory resources and logic to implement some number of primitive nonlinear temporal computing elements to implement one or more neurons using the neuromorphic core. For instance, each neuromorphic core (e.g., 215) may concurrently implement (e.g., through time multiplexing of its processing resources) multiple (e.g., 1000+) distinct artificial neurons (referred to herein as "neurons"). For instance, each core (e.g., 215) may be capable of concurrently implementing multiple neurons such that the collection of neuromorphic cores may implement many multiples of neurons using the device.

Continuing with the example of FIG. 2A, a neuromorphic computing device 205 may additionally include a processor 225 and system memory 230 to implement logic and one or more components to manage and provide functionality of the neuromorphic computing device 205. The multi-core architecture of the neuromorphic computing device may enable any one of a variety of different neural networks to be implemented using the device 205. For instance, in one example, the neuromorphic computing device may include a programming interface 235 to accept data defining a particular network topology, including the number of neurons to implement in the neural network, the synapses used to interconnect the neurons, the respective synaptic weights of the synapses, individual parameters of the neurons to be implemented on the neuromorphic computing device, among other configurable attributes. The programming interface 235 may take the input of the programmer to prompt the creation of the various neurons on the neuromorphic cores of the neuromorphic computing device 205 and generate corresponding routing tables and populate local memory of individual neuromorphic cores (e.g., 215) with the specified parameters to implement a corresponding, customized network of artificial neurons implemented by the neuromorphic cores. The programming interface 235 may allow a user-programmer to potentially define any spiking neural network (SNN) desired by the user (contingent on the processor and memory resources of the neuromorphic computing device 205 supporting the scope of the desired SNN). In some implementations, network definition data may be received through an outside computing system.

In one example, one or more system managers 224 (implemented in hardware and/or software-based logic hosted on a different system or the same system as the neuromorphic computing device (or on the neuromorphic computing device itself) may be provided to interface with logic of the neuromorphic computing device 205 to direct functions and configuration of the neuromorphic computing device 205, including the definition and implementation of a specific SNN using the neuromorphic computing device 205 and providing inputs to an implemented SNN on the neuromorphic computing device 205 (e.g., in connection with a particular algorithm or procedure), among other examples. Definition of an SNN may include the definition and provisioning of specific routing tables on the various routers in the network 210 (e.g., corresponding to synapses defined in the SNN), orchestration of a network definition and attributes (e.g., weights, decay rates, etc.) to be applied in the network, core synchronization and time multiplexing management, routing of inputs to the appropriate cores, among other potential functions. In some cases, the functionality of a system manager 224 may be divided among potentially multiple different system, including systems internal or external to the neuromorphic computing device or a system in which the neuromorphic computing device is implemented, among other examples.

In some implementations, a neuromorphic computing device 205 may be provided with additional logic to implement various features and models of an artificial neuron, artificial synapse, soma, or axon, etc. to provide additional optional functionality for SNNs implemented using the neuromorphic computing device 205. For instance, in one example, a neuromorphic computing device 205 may include logic 240 to support spike timing dependent plasticity (STDP) within an SNN implemented using the neuromorphic computing device 205. In some cases, STDP logic 240 may be distributed and implemented in each of (or a portion of) the neuromorphic cores (e.g., 215) of the neuromorphic computing device 205. STDP logic 240 may enable neurons to be implemented, which model STDP within biological neurons. In neuroscience, STDP may refer to a biological process that adjusts the strength of connections between biological neurons based on the relative timing of a particular neuron's output and input action potentials (or spikes) received by the particular neuron from other neurons. Specifically, according to STDP, if an input spike from a first neuron to a second neuron tends to occur immediately before the second neuron sends an output spike, the input, or synapse, from the first neuron to the second neuron may be strengthened based on a suggestion of a positive correlation between the output spike and the input spike. On the other hand, if an input spike from the first neuron to the second neuron tends to occur shortly after an output spike by the second neuron (in other words, a larger delay is observed between the incoming spike from the first neuron and the next outgoing spike of the second neuron), then that particular input from the first neuron may be made somewhat weaker based on STDP. An input, or synapse, may become stronger or weaker by adjusting the synaptic weight of the synapse based on STDP. STDP may cause the strengthening of inter-neuron connections based on determining a likely causal link between a spike from a first neuron's spike to a second neuron and the second neurons next outgoing spike. STDP logic 240 can allow the artificial neurons and synapses to model this behavior, by tracking and/or determining average time difference between particular spikes received at a neuron and the next outgoing spike sent by that neuron. In some implementations, STDP logic may reward synapses involved in sending spikes with a strong correlation to the receiving neuron's next spike and penalizing synapses that do not. STDP logic 240 may facilitate more sophisticated learning applications based on SNNs implemented in the neuromorphic computing device 205.

Additional logic may be provided in an example neuromorphic computing device (or the individual neuromorphic cores within the neuromorphic computing device). For instance, a neuromorphic computing device may include refractory modeling logic 245. Refractory modeling logic 245 may be used by neuromorphic cores to implement artificial neurons that include a behavior to enforce a refractory period in which the artificial neuron will not send its next output spike until the expiration of a defined refractory period (e.g., defined in a refractory period parameter of the neuron). This feature may be beneficial to protect against feedback loops from developing within an SNN. Further, enforcing a refractory period in a neuron may enhance the usefulness of STDP, such as in network path finding applications, including those described herein. A neuromorphic computing device 205 may also include exclusive selection logic 250, which may be used to perform conflict resolution in connection with STDP, such that when two spikes are received at the same time (e.g., within the same time step of a digital SNN such implemented using neuromorphic computing device 205), only one of the synapses delivering the simultaneous spikes is rewarded and strengthened.

An example neuromorphic computing device 205 may further include neuromodulatory signaling logic 255 allowing global signals to be sent to the multiple neuromorphic cores within the neuromorphic computing device, to effect changes to multiple (or all) neurons implemented on multiple different cores in the neuromorphic computing device 205. Multiple different neuromodulatory signals may be defined to cause various changes to an SNN implemented by the neuromorphic computing device. Such signals may be provided by a controller (e.g., 224) internal or external to the neuromorphic computing device (e.g., in connection with a particular application or algorithm utilizing the SNN). An external interface 260 may be provided through which external systems may receive, inspect, or otherwise access data (e.g., traffic on routers of the neuromorphic computing device describing spike messaging between neurons implemented using the neuromorphic computing device). As an example, outputs of an SNN (e.g., from neurons in an output layer of the SNN or specific neurons connected to a controller of a consumer system) may be provided to an outside system via external interfaces 260 of the neuromorphic computing device. In some cases, a neuromorphic computing device 205 may advantageously interface with and interoperate with other devices, including general purpose computing devices, to realize certain applications and use cases. Accordingly, external interface logic 260 may be provided in some cases to communicate (e.g., over one or more defined communication protocols) with one or more other devices, among other example features and uses.

Figure 2B:
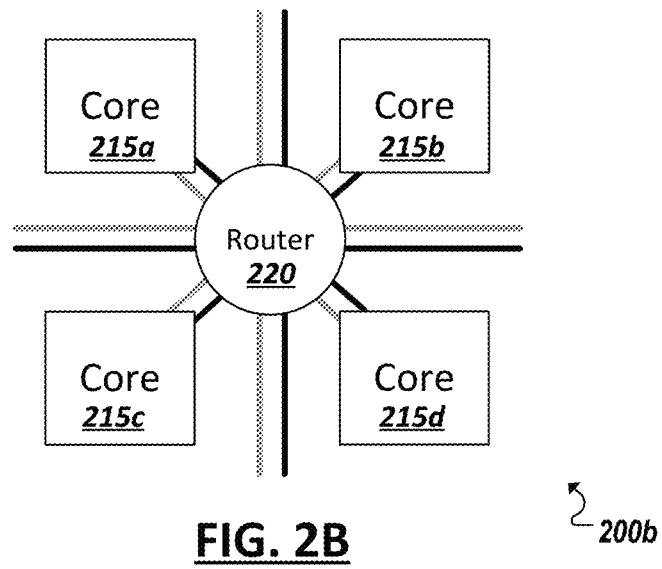
FIG. 2B illustrates a simplified block diagram illustrating a portion of a network of neuromorphic cores interconnected by one or more routers.

As shown in FIG. 2B, a block diagram 200b is shown illustrating a portion of a network fabric interconnecting multiple neuromorphic cores (e.g., 215a-d). For instance, a number of neuromorphic cores (e.g., 215a-d) may be provided in a mesh, with each core being interconnected by a network including a number of routers (e.g., 250). In one implementation, each neuromorphic core (e.g., 215a-d) may be connected to a single one of the routers (e.g., 250) and each of the routers may be connected to at least one other router (as shown at 210 in FIG. 2A). As an example, in one particular implementation, four neuromorphic cores (e.g., 215a-d) may be connected to a single router (e.g., 250) and each of the routers may be connected to two or more other routers to form a manycore mesh, allowing each of the neuromorphic cores to interconnect with each other neuromorphic core in the device. Moreover, as each neuromorphic core may be configured to implement multiple distinct neurons, the router network of the device may similarly enable connections, or artificial synapses (or, simply, "synapses"), to be defined between any two of the potentially many (e.g., 30,000+) neurons defined using the network of neuromorphic cores provided in a neuromorphic computing device.

Figure 2C:
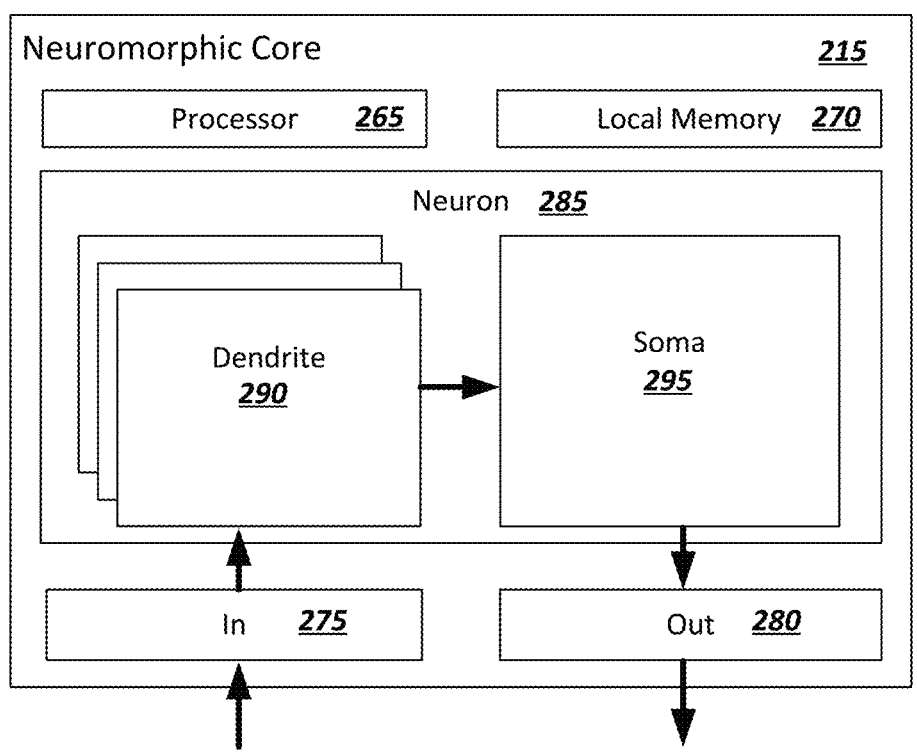
FIG. 2C illustrates a simplified block diagram of an example one of the number of neuromorphic cores implemented in an example neuromorphic computing device.

FIG. 2C shows a block diagram 200c illustrating internal components of one example implementation of a neuromorphic core 215. In one example, a single neuromorphic core may implement some number of neurons (e.g. 1024) that share architectural resources of the neuromorphic core in a time-multiplexed manner. In one example, each neuromorphic core 215 may include a processor block 255 capable of performing arithmetic functions and routing in connection with the realization of a digitally implemented artificial neuron, such as explained herein. Each neuromorphic core 215 may additionally provide local memory in which a routing table may be stored and accessed for a neural network, accumulated potential of each soma of each neuron implemented using the core may be tracked, parameters of each neuron implemented by the core may be recorded, among other data and usage. Components, or architectural resources, of a neuromorphic core 215 may further include an input interface 265 to accept input spike messages generated by other neurons on other neuromorphic cores and an output interface 270 to send spike messages to other neuromorphic cores over the mesh network. In some instances, routing logic for the neuromorphic core 215 may be at least partially implemented using the output interface 270.

Each neuromorphic core may additionally include logic to implement, for each neuron 275, an artificial dendrite 280 and an artificial soma 185 (referred to herein, simply, as "dendrite" and "soma" respectively). The dendrite 280 may be a hardware-implemented process that receives spikes from the network. The soma 285 may be a hardware-implemented process that receives each dendrite's accumulated neurotransmitter amounts for the current time and evolves each dendrite and soma's potential state to generate outgoing spike messages at the appropriate times. A dendrite 280 may be defined for each connection receiving inputs from another source (e.g., another neuron). In one implementation, the dendrite process 280 may receive and handle spike messages as they serially arrive in time-multiplexed fashion from the network. As spikes are received, the neuron's activation (tracked using the soma 285 (and local memory 260)) may increase. When the neuron's activation exceeds a threshold set for the neuron 275, the neuron may generate a spike message that is propagated to a fixed set of fanout neurons via the output interface 270. The network distributes the spike messages to all destination neurons, and in response those neurons, in turn. update their activations in a transient, time-dependent manner, and so on, potentially causing the activation of some of these destination neurons to also surpass corresponding thresholds and trigger further spike messages, as in real biological neural networks.

As noted above, a neuromorphic computing device may reliably implement a spike-based model of neural computation. Such models may also be referred to as Spiking Neural Networks (SNNs). In addition to neuronal and synaptic state, SNNs also incorporate the concept of time. For instance, in an SNN, communication occurs over event-driven action potentials, or spikes, that convey no explicit information other than the spike time as well as an implicit source and destination neuron pair corresponding to the transmission of the spike. Computation occurs in each neuron as a result of the dynamic, nonlinear integration of weighted spike input. In some implementations, recurrence and dynamic feedback may be incorporated within an SNN computational model. Further, a variety of network connectivity models may be adopted to model various real world networks or relationships, including fully connected (all-to-all) networks, feed-forward trees, fully random projections, "small world" networks, among other examples. A homogeneous, two-dimensional network of neuromorphic cores, such as shown in the example of FIGS. 2A-C may advantageously supports all of these network models. As all cores of the device are connected, all neurons defined in the cores are therefore also fully connected through some number of router hops. The device may further include fully configurable routing tables to define a variety of different neural networks by allowing each core's neurons to distribute their spikes to any number of cores in the mesh to realize fully arbitrary connectivity graphs.

In an improved implementation of a system capable of supporting SNNs, such as the very large scale integration (VLSI) hardware device illustrated in the example of FIGS. 2A-C, high speed and reliable circuits may be provided to implement SNNs to model the information processing algorithms as employed by the brain, but in a more programmable manner. For instance, while a biological brain can only implement a specific set of defined behaviors, as conditioned by years of development, a neuromorphic processor device may provide the capability to rapidly reprogram all neural parameters. Accordingly, a single neuromorphic processor may be utilized to realize a broader range of behaviors than those provided by a single slice of biological brain tissue. This distinction may be realized by adopting a neuromorphic processor with neuromorphic design realizations that differ markedly from those of the neural circuits found in nature.

As an example, a neuromorphic processor may utilize time-multiplexed computation in both the spike communication network and the neuron machinery of the device to implement SNNs. Accordingly, the same physical circuitry of the processor device may be shared among many neurons to realize higher neuron density. With time multiplexing, the network can connect N cores with $O(N)$ total wiring length, whereas discrete point-to-point wiring would scale as $O(N2)$, realizing a significant reduction in wiring resources to accommodate planar and non-plastic VLSI wiring technologies, among other examples. In the neuromorphic cores, time multiplexing may be implemented through dense memory allocation, for instance, using Static Random Access Memory (SRAM), with shared busses, address decoding logic, and other multiplexed logic elements. State of each neuron may be stored in the processor's memory, with data describing each neuron state including state of each neuron's collective synapses, all currents and voltages over its membrane, among other example information (such as configuration and other information).

In one example implementation, a neuromorphic processor may adopt a "digital" implementation that diverts from other processors adopting more "analog" or "isomorphic" neuromorphic approaches. For instance, a digital implementation may implement the integration of synaptic current using digital adder and multiplier circuits, as opposed to the analog isomorphic neuromorphic approaches that accumulate charge on capacitors in an electrically analogous manner to how neurons accumulate synaptic charge on their lipid membranes. The accumulated synaptic charge may be stored, for instance, for each neuron in local memory of the corresponding core. Further, at the architectural level of an example digital neuromorphic processor, reliable and deterministic operation may be realized by synchronizing time across the network of cores such that any two executions of the design, given the same initial conditions and configuration, will produce identical results. Asynchrony may be preserved at the circuit level to allow individual cores to operate as fast and freely as possible, while maintaining determinism at the system level. Accordingly, the notion of time as a temporal variable may be abstracted away in the neural computations, separating it from the "wall clock" time that the hardware utilized to perform the computation. Accordingly, in some implementation, a time synchronization mechanism may be provided that globally synchronizes the neuromorphic cores at discrete time intervals. The synchronization mechanism allows the system to complete a neural computation as fast as the circuitry allows, with a divergence between run time and the biological time that the neuromorphic system models.

In operation, the neuromorphic mesh device may begin in an idle state with all neuromorphic cores inactive. As each core asynchronously cycles through its neurons, it generates spike messages that the mesh interconnect routes to the appropriate destination cores containing all destination neurons. As the implementation of multiple neurons on a single neuromorphic core may be time-multiplexed, a time step may be defined in which all spikes involving the multiple neurons may be processed and considered using the shared resources of a corresponding core. As each core finishes servicing its neurons for a respective time step, the cores may, in some implementations, communicate (e.g., using a handshake) with neighboring cores using synchronization messages to flush the mesh of all spike messages in flight, allowing the cores to safely determine that all spikes have been serviced for the time step. At that point all cores may be considered synchronized, allowing them to advance their time step and return to the initial state and begin the next time step.

Given this context, and as introduced above, a device (e.g., 205) implementing a mesh 210 of interconnected neuromorphic cores may be provided, with the core implementing potentially multiple artificial neurons capable of being interconnected to implement an SNN. Each neuromorphic core (e.g., 215) may provide two loosely coupled asynchronous processes: an input dendrite process (e.g., 280) that receives spikes from the network and applies them to the appropriate destination dendrite compartments at the appropriate future times, and an output soma process (e.g., 285) that receives each dendrite compartment's accumulated neurotransmitter amounts for the current time and evolves each dendrite and soma's membrane potential state, generating outgoing spike messages at the appropriate times (e.g., when a threshold potential of the soma has been reached). Note that, from a biological perspective, the dendrite and soma names used here only approximate the role of these functions and should not be interpreted too literally.

Spike messages may identify a particular distribution set of dendrites within the core. Each element of the distribution set may represent a synapse of the modeled neuron, defined by a dendrite number, a connection strength (e.g., weight W), a delay offset D, and a synapse type, among potentially other attributes. In some instances, each weight $W_i$ may be added to the destination dendrite's $\delta_i$ total neurotransmitter amount (WeightSum) scheduled for servicing at time step $T+D_i$ in the future. While not handling input spikes, the dendrite process may serially service all dendrites $\delta_i$ sequentially, passing the total accumulated neurotransmitter amounts for time T to the soma stage. The soma process, at each time step, receives an accumulation of the total spike weight received (WeightSum) via synapses mapped to specific dendritic compartments of the soma. In the simplest case, each dendritic compartment maps to a single neuron soma. In other instances, a neuromorphic core mesh architecture may additionally support multi-compartment neuron models. Core memory may store the configured attributes of the soma and the state of the soma, the total accumulated potential at the soma, etc. In some instances, synaptic input responses may be modeled in the core with single-time-step current impulses, low state variable resolution with linear decay, and zero-time axon delays, among other example features. In some instances, neuron models of the core may be more complex and implement higher resolution state variables with exponential decay, multiple resting potentials per ion channel type, additional neuron state variables for richer spiking dynamics, dynamic thresholds implementing homeostasis effects, and multiple output spike timer state for accurate burst modeling and large axonal delays, among other example features. In one example, the soma process implemented by each of the neuromorphic cores may implement a simple current-based Leaky Integrate-and-Fire (LIF) neuron model.

Figure 3A:
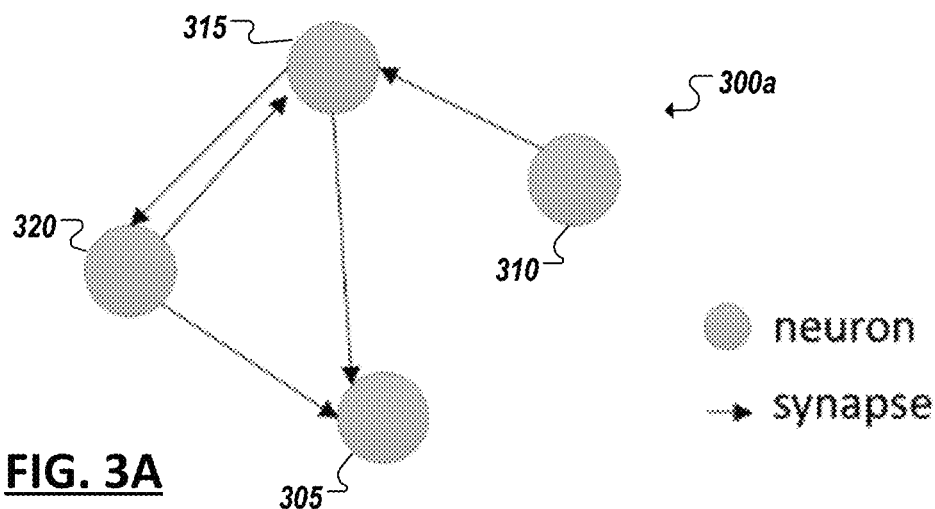
FIGS. 3A-3B are simplified block diagrams of portions of example neural networks capable of being implemented using an example neuromorphic computing device.

A neuromorphic computing device, such as introduced in the examples above, may be provided to define a spiking neural network architecture abstraction that can efficiently solve a class of sparse coding problems. As noted above, the basic computation units in the architecture may be neurons and the neurons may be connected by synapses, which define the topology of the neural network. Synapses are directional, and neurons are able to communicate to each other if a synapse exists. FIG. 3A is a simplified block diagram 300a illustrating a simple example neural network, including neurons 305, 310, 315, 320 connected by synapses. The synapses allow spike messages to be transmitted between the neurons. For instance, neuron 305 may receive spike messages generated by neurons 315, 320. As neuron 305 receives spike messages from the other neurons it is connected to, the potential of the neuron 305 may exceed a threshold defined for the neuron 305 (e.g., defined in its soma process) to cause the neuron 305 itself to generate and transmit a spike message. As noted, synapses may be directional. In some cases, a network and corresponding synapses may be defined such that a neuron (e.g., 315) only receives or transmits to some of the other neuron (e.g., 305), while in synapses may be defined which connect the neuron bi-directionally with other neurons (e.g., between neurons 315, 320) to create a feedback loop, among other examples.

An example neuromorphic computing device may adopt leaky integrate-and-fire neurons and conductance-based synapses. Accordingly, the dynamics of the network may be driven by the evolution of the state variables in each neuron. In one example, each neuron has two types of state variables: one membrane potential v(t), and one or more dendritic current(s) $u^1(t), \ldots$ to $u^s(t)$. An individual neuron's dynamics may be defined by the following continuous-time differential equations (1)-(3).

$$\frac{du^k(t)}{dt} = \frac{-1}{\tau_s^k} u^k(t), k = 1, 2, \ldots, s \tag{1}$$

$$\frac{dv(t)}{dt} = \frac{-1}{\tau_m} v(t) + \sum_{k=1}^{s} u^k(t) + I^{bias} \tag{2}$$

$$\text{if } v(t^-) \geq \theta, \text{ Spike, and } v(t^+) = 0 \tag{3}$$

Equation (1) depicts the dynamics of dendritic current. Each dendritic current variable may be defined to decay exponentially over time, according to its respective decay time constant $\tau_s^k$. The dendritic current may be linearly summed to control the integration of the membrane potential (as shown in Equation (2)). Similar to dendritic current, the membrane potential may also be subject to exponential decay with a separate membrane potential time constant $\tau_m$.

Equation (3) may define the spiking event of a neuron. When a neuron's membrane potential reaches a particular threshold potential θ defined for the neuron, the neuron (e.g., through its soma process) resets the membrane potential to zero, and sends out a spike to neighboring neurons connected by corresponding synapses. The dendrite process of each neuron can be defined such that a spike arrival causes a change in the dendritic current. Such interactions between neurons lead to the complex dynamics of the network. Spikes are transmitted along synapses and the incoming synapse may be defined to be associated with one dendritic current variable, e.g., using the dendritic compartment. In such implementations, each spike arrival changes only one dendritic current $u^k(t)$. The change may be defined to manifest as an instantaneous jump in $u^k(t)$, such as defined in Equation (4), based on the magnitude of the synaptic weight $w_{ij}$.

$$u_k(t^+) = u_k(t^-) \quad (4)$$

Accordingly, in some implementations, in addition to the state variables of a neuron, there are several other configurable parameters, including the time constant of individual dendritic compartment $\tau_s^1, \ldots, \tau_s^s$, a single $\tau_m$, θ, $I^{bias}$ for each neuron, and a configurable weight value $w_{ij}$ for each synapse from neuron j to i, which may be defined and configured to model particular networks.

Figure 3B:
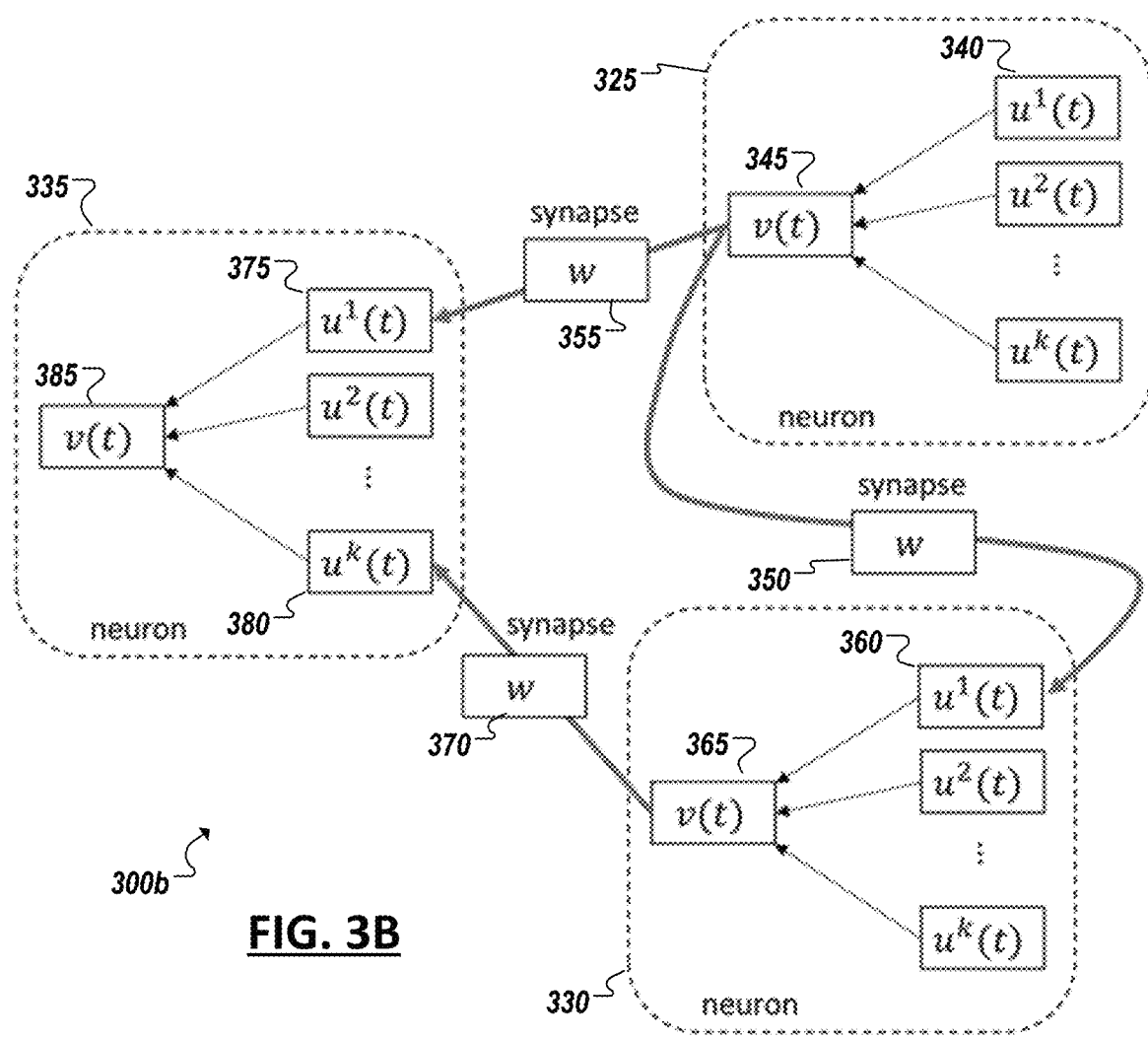

For instance, FIG. 3B shows an example illustrating synaptic connections between individual dendrites of neurons in a network, and the parameters that may be defined for these neurons and synapses. As an example, in FIG. 3B, neurons 325, 330, 335 implemented by cores of an example neuromorphic computing device are shown, together with synapses defined (e.g., using a routing table) for interconnections within a neural network implemented using the neurons 325, 330, 335. Each neuron may include one or more dendrite (processes) (e.g., 340, 360, 375, 380) and a respective soma (process) (e.g., 345, 365, 385). Spike messages received at each of the dendrites of a respective neuron may contribute to the activation potential of the soma, with the soma firing a spike message when the soma-specific potential threshold is reached. A synapse connects two neurons. The synapse may effectively connect the soma of a sending neuron to one of the dendrites of the receiving neuron. Further, each synapse may be assigned a respective weight (e.g., 350, 355, 370). In the example of FIG. 3B, a synapse with a first weight 350 may connect soma 345 of neuron 325 with dendrite 360 of neuron 330. Soma 345 of neuron 325 may additionally connect to neuron 380 via another synapse (with potentially a different weight 355). Soma 365 of neuron 330 may also connect to neuron 380 via a respective synapse 370. In some cases, multiple neurons may connect to a particular neuron at the same dendrite of the particular neuron. In such instances, the parameters defined for this one dendrite will govern the effect of the incoming spike messages from each of the connected neurons. In other cases, such as shown in FIG. 3B, different neurons (e.g., 325, 330) may connect to the same neuron (e.g., 335) but at different dendrites (e.g., 375 and 380 respectively), allowing different parameters (defined for each of these dendrites (e.g., 375, 380)) to affect the respective spikes arriving from each of these different neurons (e.g., 325, 330). Likewise, parameters may be defined for each of the somas (e.g., 345, 365, 385) of each of the various neurons (e.g., 325, 330, 335) defined in the network, allowing these parameters to likewise contribute to the overall configurability of the neural network implemented using the neuromorphic computing device, among other examples.

As a summary, neuron parameters may include such examples as a synaptic decay time constant $\tau_s$, bias current $I_b$, firing potential threshold θ, and synaptic weight $w_{ij}$ from neuron to neuron (i.e., from neuron j to neuron i). These parameters may be set by a programmer of the neural network, for instance, to configure the network to model a real network, matrix, or other entity. Further, neuron state variables may be defined to include time-varying current u(t) and potential, or voltage, v(t) and represented by corresponding ordinary differential equations.

As noted above, Equations (1)-(4) defines spiking neural network dynamics in continuous time. In a digital neuromorphic computing device, a network of neuromorphic cores is provided (such as shown and discussed in connection with FIGS. 2A-2C), with each of the neuromorphic cores possessing processor resources and logic executable to solve the continuous network dynamics using first-order techniques, such as by approximating SNN dynamics using discrete time steps. In one example, a virtual global clock is provided in the neuromorphic computing device to coordinate the time-stepped updates of individual neurons at each core. Within a time step, every neuron implemented by the network of cores can adjust (e.g., in a time-multiplexed manner) its respective state variables, and will do so no more than once per time step. Further, each spike message generated by a neuron in the SNN may be guaranteed to be delivered within a corresponding time step. Such a digital approximation may be realized as follows. Given the values of state variables at time $t_1$, the state variable values at $t_2$ after a fixed time interval Δt, $t_2 = t_1 + \Delta t$, can be obtained using Equations (5)-(8):

$$u^k(t_2^-) = u^k(t_1) e^{\frac{-\Delta t}{\tau_s^k}}, k = 1, 2, \ldots, s \quad (5)$$

$$v(t_2^-) = v(t_1) e^{\frac{-\Delta t}{\tau_m}} + \sum_{k=1}^{s} \tau_s^k [u^k(t_1) - u^k(t_2^-)] + I^{bias} \Delta t \quad (6)$$

$$\begin{cases} \text{if } v(t_2^-) \geq \theta \quad \text{Spike, and } v(t_2) = 0 \\ \text{otherwise,} \quad v(t_2) = v(t_2^-) \end{cases} \quad (7)$$

$$u^k(t_2) = u^k(t_2^-) + \sum_j w_{ij}, \text{ for all spike arrivals to neuron } i \quad (8)$$

In summary, based on the parameters of a given neuron and weights of the various synapses connecting other neurons in an SNN to the given neuron, as spike messages are received by the neuron, the current introduced through each spike may increase the membrane potential of the given neuron until a spiking threshold set for the neuron is met, causing the neuron to send an outgoing spike message to one or more other neighboring neurons in the SNN. When STDP is configured to be applied within a particular SNN (or configured to only be applied to certain synapses within the STDP), additional parameters may be provided to dictate how various spike messages affect the synaptic weight of corresponding synapses on which the spike message is sent. In one model, STDP within a neuromorphic computing device may be implemented such that whenever there is a spike in the presynaptic neuron or the postsynaptic neuron, the weight at the associated synapse is changed according to Equation (9)

$$\Delta w = \begin{cases} \delta_1 & \text{if } 0 < t_{post} - t_{pre} < d \\ \delta_2 & \text{if } -d < t_{post} - t_{pre} < 0 \end{cases} \quad (9)$$

where Δw is the change in weight applied to a synapse between a presynaptic neuron and a postsynaptic neuron, $t_{post}$ is the latest time of spike of the postsynaptic neuron, $t_{pre}$ is the latest time of spike of the presynaptic neuron, $\delta_1$ and $\delta_2$ are tunable parameters that set the rate and direction of learning, and d is another tunable parameter that sets a time window in which co-occurring pre- and post-synaptic spikes may lead to a change in the synaptic weight. If $t_{post}-t_{pre}$ do not meet either of the two criteria in Equation (9), the weight is not changed, i.e. Δw=0.

Figure 4A:
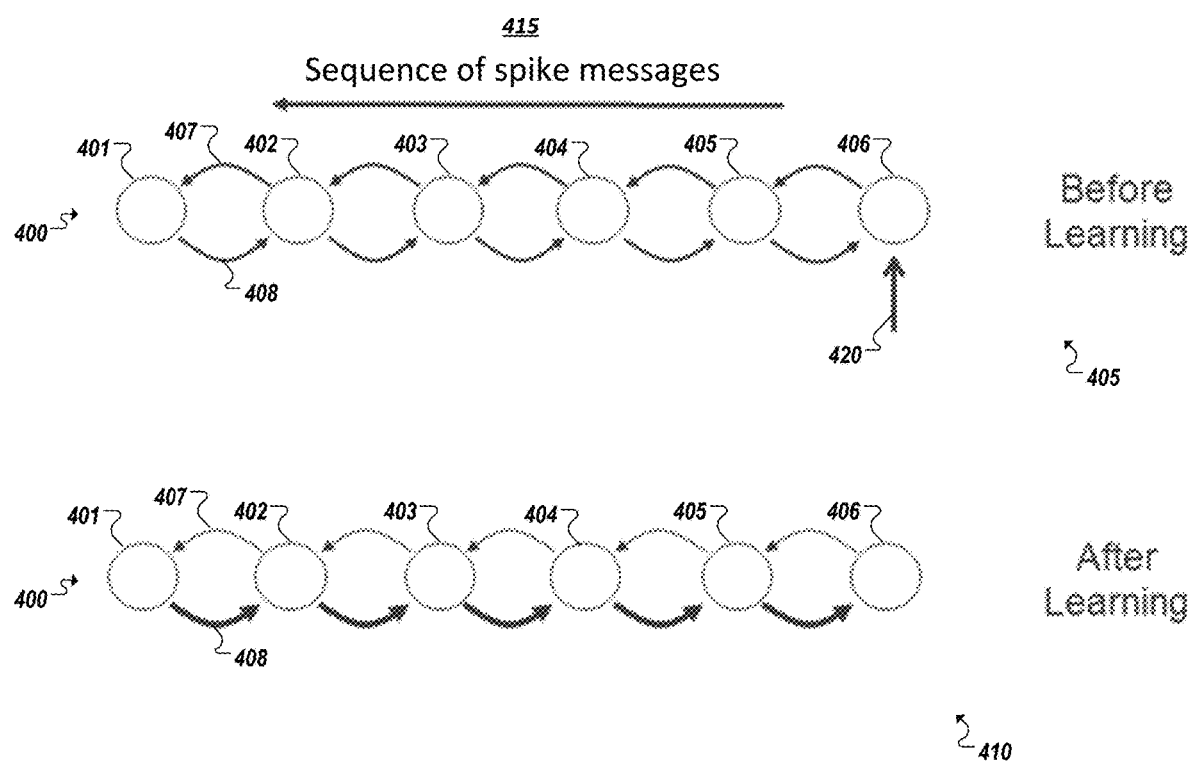
FIGS. 4A-4B are simplified block diagrams illustrating spike propagation and spike timing dependent plasticity (STDP) in portions of example spiking neural networks (SNN).

In some implementations, STDP implemented in an example neuromorphic computing device may be leveraged to perform various applications using SNNs implemented using the neuromorphic computing device. For instance, in the examples of FIGS. 4A-4B, a portion 400 of an example SNN is illustrated in FIG. 4A that is defined and implemented to include a number of artificial neurons (e.g., 401-406) that are connected according to a particular graph or network topology. Each neuron may correspond to a node in the network topology. Further, at least this portion of the example SNN may be defined and implemented such that each connection between neighboring neurons is bidirectional, such that each connection is implemented with both a synapse (e.g., 407) to support spikes from a first neuron (e.g., 401) to a second neuron (e.g., 402) and a synapse (e.g., 408) to support spikes from the second neuron (e.g., 402) to the first neuron (e.g., 401), and so on. In an SNN with bi-directionally connected neurons and supporting STDP, as in the example of FIG. 4A, the neurons (e.g., 401-406) and synapses (e.g., 407, 408, etc.) may be configured (e.g., with spiking thresholds and synaptic weights) that initially allow any spike to cause a subsequent spike by the receiving neuron. Such an SNN may allow for a single activation at a single neuron to cause a wave, chain, or sequence of spikes to be sent throughout this portion (or the entirety) of the SNN in response. For instance, in representation 405, a sequence of spike messages 415 may be sent beginning at neuron 406 and propagating to neurons 405, 404, 403, 402, and 401 (in that order). The sequence of spike messages 415 may result from one of the neurons (e.g., 406) being activated by a signal (e.g., 420), such as a current or spike message (e.g., received from a controller or another neuron, etc.).

Figure 4B:
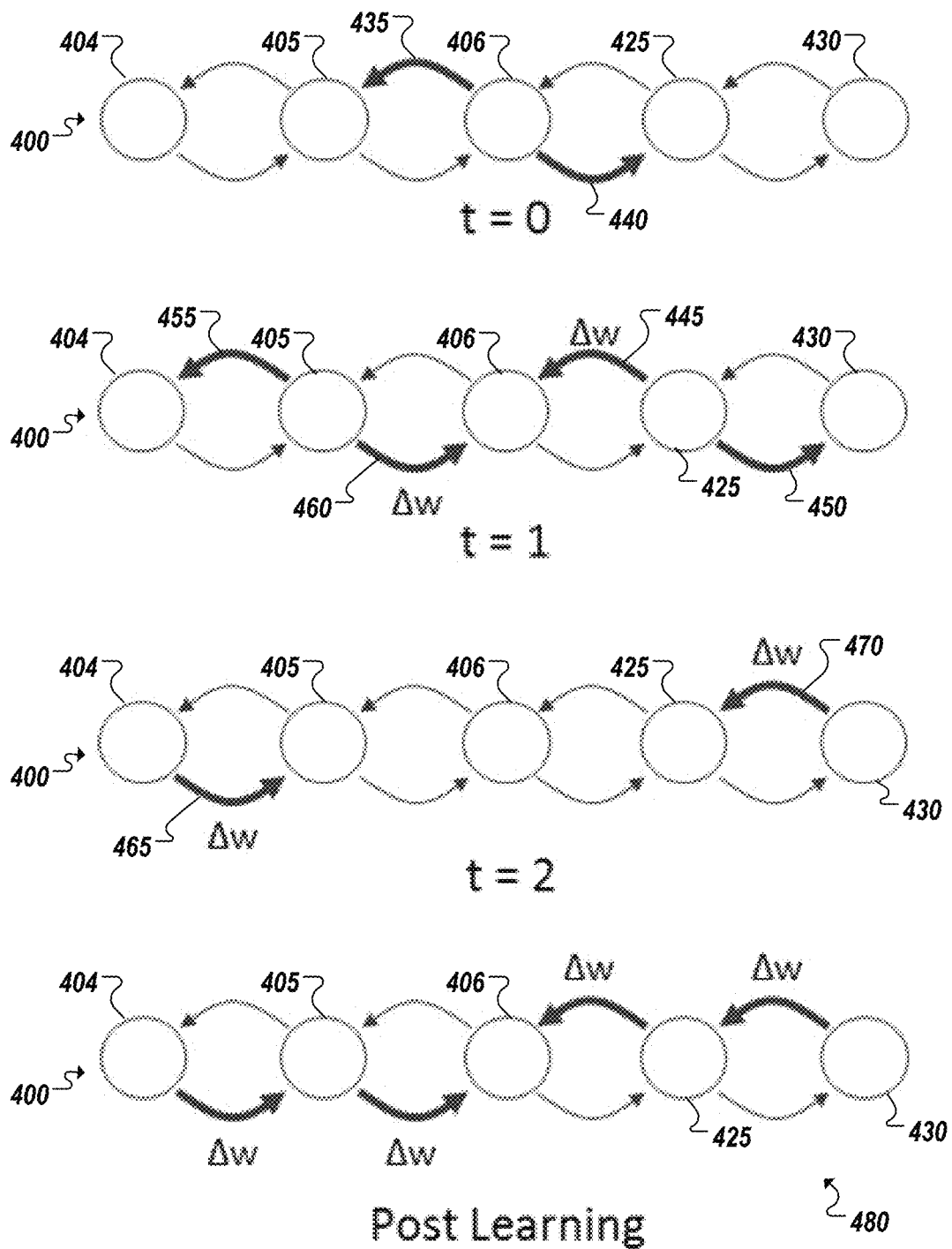

Continuing with the example of FIGS. 4A-4B, a neuromorphic computing device may support implementation of an SNN modeling STDP. In some implementations, a programmer of the SNN may programmatically define attributes governing how STDP will be implemented in a given SNN. For instance, STDP behavior may be defined by setting one or more of the parameters $\delta_1$, $\delta_2$ and d as utilized in the example of Equation (9). In the example of FIG. 4A, as shown in the block diagram 410, STDP modeling for the SNN may be defined such that the synaptic weights of those synapses which carried a spike in the sequence of spike messages 415 will decrease, while the other synapses, which did not carry a spike message in the sequence will have their respective synaptic weights increased, as represented in 410 For instance, this behavior can be achieved by setting $\delta_1$ to a negative value and $\delta_2$ to a positive value. Such a configuration of the STDP modeling in this SNN may provide for synaptic weights to be increased based on a negative correlation between input and output spikes. Using such a configuration, STDP may be leveraged to induce weight asymmetry in one of the two directions connecting any two neurons in this portion of an example SNN. Accordingly, should a spike or activation occur at a neuron (e.g., 401-405) upstream from the neuron (e.g., 406) that triggered the initial sequence of spike messages 415, the weight asymmetry may bias the sending neurons to propagate a sequence of spikes back up the chain in a direction opposite that of the initial sequence of spike messages 415.

Turning to FIG. 4B, a set of block diagrams are shown illustrating one example implementation of the STDP mechanism introduced in FIG. 4A. In one example, a STDP learning rule may be configured for a particular SNN such that the synapses changes the synaptic weight of a given synapse increases if a presynaptic spike is sent on that synapse by a neuron within 1 unit of time (e.g., 1 time step, 1 ms, etc.) of that neuron receiving a postsynaptic spike (e.g., from another neuron). In other words, the SNN may be configured to identify a correlation between a presynaptic spike and preceding postsynaptic spike and increase the weight of the correlated presynaptic spike that follows the postsynaptic spike to realize the STDP effect illustrated in FIG. 4A. FIG. 4B illustrates an example of how this may develop within an SNN. For instance, neuron 406 may be activated causing the neuron 406 to send spikes on its outbound synapses (435, 440) to neurons 405 and 425 at time t=0. The spikes received at neurons 405 and 425 may cause neurons 405 and 425 to in turn send spikes on all of their outbound synapses (e.g., 445, 450, 455, 460) at t=1. Of note is that neurons 405 and 425, by virtue of their bidirectional connection to neuron 406, echo back a spike (on synapses 445, 460, respectively) to neuron 406 at t=1. In that the presynaptic spikes sent by neurons 405, 425 on synapses 445, 460 at t=1 followed the postsynaptic spike sent by neuron 406 at t=0, the STDP rule for this SNN has been satisfied for synapses 445, 460 and their respective weights may be increased (e.g., by a value Δw). The spike wave may continue at t=2, with neurons 404 and 430 responding to the spikes received from neurons 405 and 425 at t=1, with presynaptic spikes sent by neurons 404 and 430 at t=2 using synapses 465, 470 respectively. Neuron 406 does not send another spike at t=2 in response to the spikes echoed back by neurons 405 and 425 at t=1 given a refractory period enforced at neuron 406 (and all neurons in at least this portion of the example SNN) that prevents the neuron from sending any subsequent spikes for a defined period following the sending of a preceding outbound spike. Further, as the presynaptic spikes sent on synapses 465, 470 by neurons 404 and 430 at t=2 to neurons 405, 425 followed the post-synaptic spikes sent by neurons 405, 425 at t=1, the synaptic weights of synapses 465, 470 may likewise be adjusted based on the STDP learning rule, resulting in an SNN with the enhanced post-learning weights represented by diagram 480.

Building upon the principles introduced in the example shown in FIGS. 4A-4B, a shortest or most efficient path may be determined between any two nodes in a network topology utilizing the principles and STDP learning rules introduced in the example of FIGS. 4A-4B as applied to an SNN modeling the network topology. An SNN may be configured and implemented on an example neuromorphic computing device (such as described herein) to model complex networks with arbitrary structure, such as regular networks (e.g., ring, lattice, etc.), random network, small-world networks, scale-free networks, hierarchical networks, among other examples. Complex networks may exist in connection with a variety of use cases and examples. Table 1 provides examples of real world networks and their respective network structure, which may be among the example networks that may be implemented using an example SNN (among potentially many other examples).

TABLE 1

Example Real-World Networks

| Network | Nodes | Links | Characteristic Structure |
|---|---|---|---|
| Internet | Routers | Wireless connections | Scale-Free |
| World Wide Web | Webpages | Web-links | Scale-Free |
| Brain network of a roundworm | Neurons | Synapses | Small-World |
| Cerebral cortical networks of the macaque monkey | Neurons | Synapses | Exponential Distance Rule (EDR) |
| Hollywood actor network | Actors | Co-appearance in movies | Small-World |
| Dolphin social network | Dolphins | Frequent social interactions | Caveman |

It may be desirable to determine a path between any two nodes in a network, including those example networks described above. Additionally, it may be desirable to compute a shortest, most efficient, or most preferred path between two nodes. In large complex networks, determining such paths may be a non-trivial and difficult problem. For instance, it may desirable to determine a shortest path between two persons in a social network numbering hundreds of thousands or millions of nodes. As another example, a physical environment may be modeled as a network (e.g., a lattice grid network of two- or three-dimensional physical space), and a shortest path may be determined (e.g., for use by a robot or a drone), among other examples.

Figure 5A:
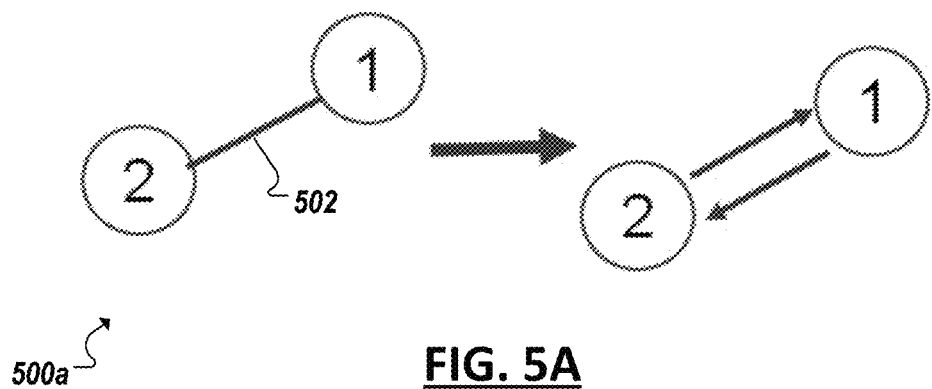
FIGS. 5A-5H are block diagrams illustrating use of an example SNN to determine paths within a network.
Figure 5B:
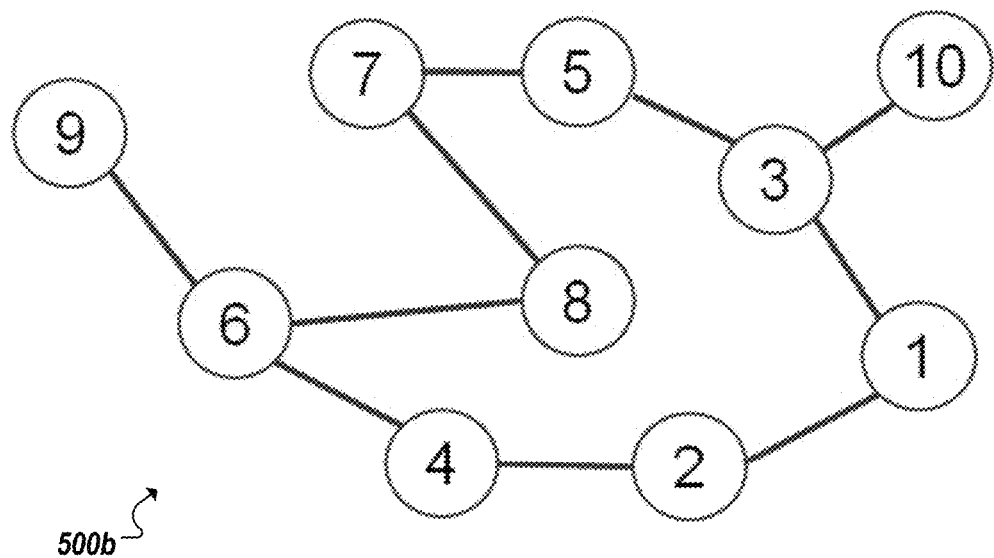

FIGS. 5A-5G show simplified block diagrams 500a-g illustrating an example utilizing STDP in an example SNN to determine a shortest path between any two nodes in a network modeled by the SNN. As shown in FIG. 5A, each connection element (e.g., 502) graphically represented in the example of FIGS. 5B-5G represents a bidirectional connection defined between neurons in an SNN (e.g., implemented through two oppositely directed artificial synapses). The block diagram 500b of FIG. 5B illustrates a simplified SNN including ten bi-directionally connected neurons, each neuron representing a respective node in a particular network. Neighboring nodes or connections between nodes in the particular network may be modeled through connections, or synapses, between the artificial neurons modeling the nodes in the SNN. To solve for a shortest path between any two nodes in the particular network, the SNN may be configured to model STDP similar to the configuration introduced above in FIG. 4A.

Figure 5C:
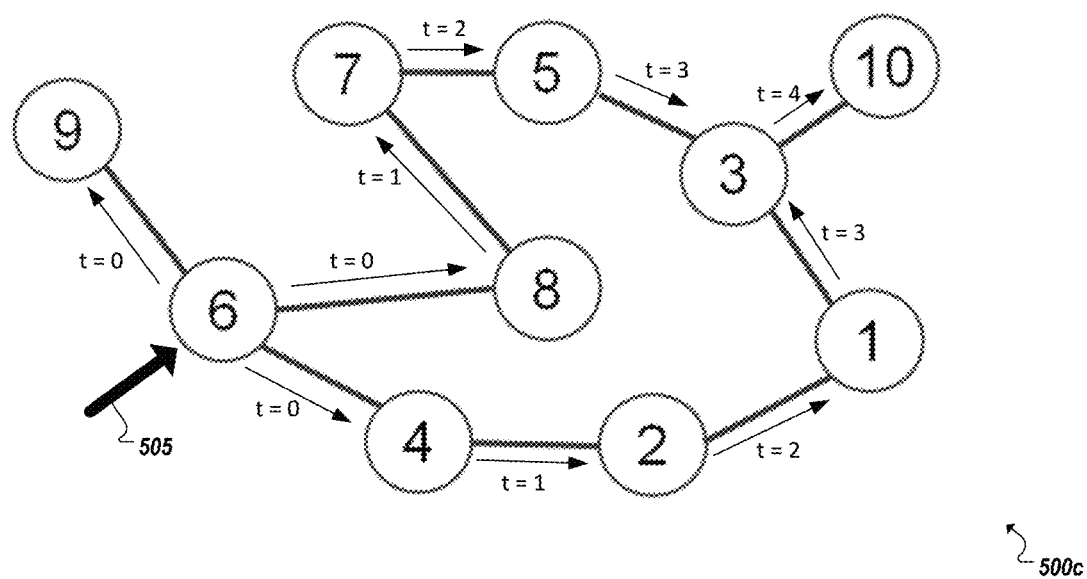

Further, the SNN may be initialized such that the weights of each of the synapses in the SNN and the spiking thresholds of each of the neurons is equal. This may allow any spike received at a neuron to cause the neuron to send an outbound spike in response. Further, the SNN may be configured such that each neuron is modeled (by the neuromorphic computing device and it constituent neuromorphic cores) to send spikes according to a refractory period. Specifically, each neuron in the example SNN may be configured such that it is not allowed to send an outbound spike and/or process an incoming spike for some period (i.e., the refractory period) following the sending of its last outbound spike. Turning to FIG. 5C, a certain one of the neurons in the SNN (e.g., Neuron 6) may be activated 505 (e.g., by providing an input to the neuron or externally driving the neuron (through a controller internal or external to the neuromorphic computing device)) to cause the neuron to send a spike to its neighboring neurons (e.g., Neurons 4, 8, and 9). Indeed, in the example of FIG. 5C, Neuron 6 may be activated (at 505) and in a first time or time step (i.e., t=0) will send a spike message to Neurons 4, 8, and 9 on the outbound synapses respectively connecting Neuron 6 to Neurons 4, 8, and 9.

Given the initial configuration of the SNN, the spike sent from Neuron 6 to Neurons 4, 8, and 9 at t=0, will cause Neurons 4, 8, and 9 to send spikes on all of their outbound synapses. In this example, Neurons 4 and 8 will send spikes along to Neurons 2 and 7 respectively at time t=1. However, as Neurons 4, 8, and 9 also each possess outbound synaptic connections to Neuron 6, they will also send spikes back to Neuron 6 at t=1, such as in the example discussed and illustrated in FIG. 4B. These "echo" spikes are not included in the illustration of FIG. 5C, for simplicity in representing the concepts discussed in connection with this example. Instead, FIG. 5C illustrates how an SNN may be configured such that activation of a single neuron (e.g., Neuron 6) may cause a wave of spikes to propagate outward from the activated neuron throughout the network in response. Such outward propagation of a spike wave may include not only the spikes sent by Neurons 4, 8, and 9 at t=1, but also Neurons 2 and 7 sending responsive spikes at t=2 to Neurons 1 and 5, Neurons 1 and 5 sending responsive spikes at t=3 to Neuron 3, and Neuron 3 sending a responsive spike at t=4 to Neuron 10.

Figure 5D:
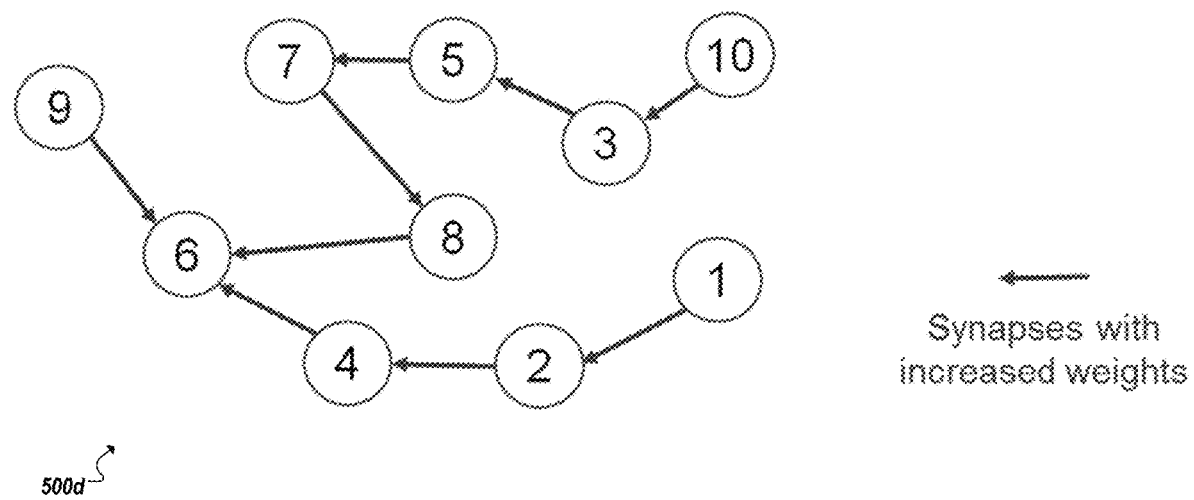
Figure 5E:
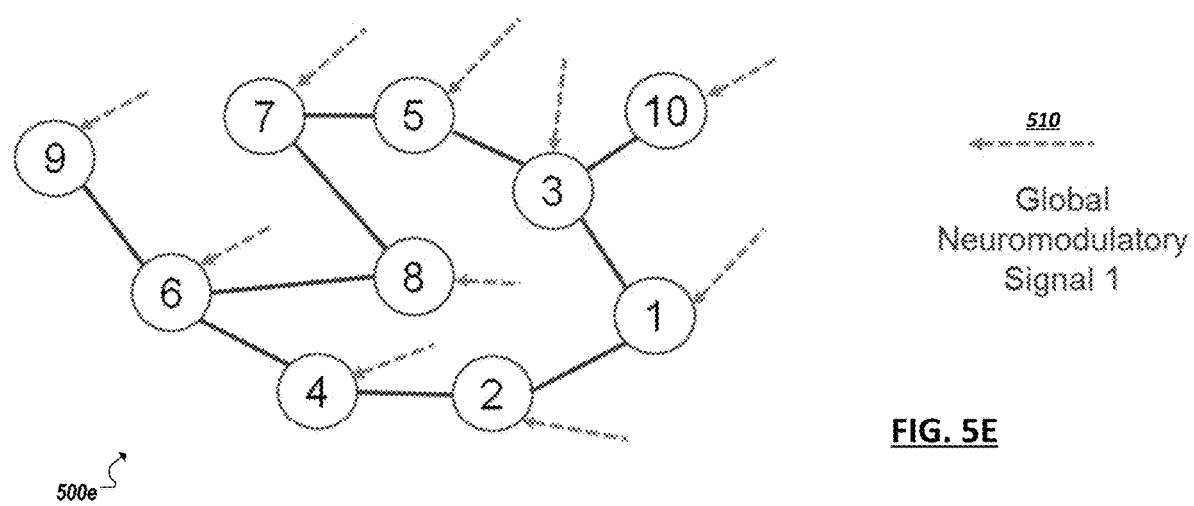

As in the examples discussed in FIGS. 4A-4B, a STDP rule may be defined within the SNN of FIGS. 5B-5G such that the weight of a neuron's inbound synapse changes in response to receiving a presynaptic spike (from a neighboring neuron) within a window of time (e.g., a single time step) following the sending of a postsynaptic spike on the neuron. Given the echo spikes that a receiving neuron (e.g., Neuron 4) will send back (e.g., at t=1) to the neuron (e.g., Neuron 6) from which an immediately preceding spike was sent (e.g., at t=0), an STDP rule of the example SNN may cause strengthening of synapses (in the bidirectional connections between neurons) in the direction opposite the wave proceeding outward from the activated neuron (e.g., Neuron 6), similar to the example shown and described in the connection with FIG. 4B. FIG. 5D illustrates a representation of the individual synapses in the example SNN, which have had their weights strengthened according to STDP based on the spike wave illustrated in FIG. 5C. The resulting strengthening of the synaptic weights in the example of FIG. 5D, may be triggered by echo spikes and may be further realized based on the enforcement of a refractory period modeled in the neurons of the example SNN. For instance, as shown in FIG. 5C, Neuron 2, may receive a spike from Neuron 4 at time t=1, and Neuron 2 may, in turn, send a spike to propagate the spike wave to Neuron 1 and also send an echo spike in a direction upstream from the propagation of the spike wave to Neuron 4, all at time t=2. As Neuron 4 receives the echo spike one time step removed from Neuron 4 sending a spike (e.g., at t=1 to Neuron 2), Neuron 4 causes the weight of the synapse from Neuron 2 to Neuron 4 to be strengthened, among additional examples. Indeed, alternative mechanisms and STDP rules may be utilized to realize this same effect in a bi-directionally connected SNN.

As noted above, neurons may be configured to strengthen (or alternatively weaken) synaptic weights of their synapses based on received and/or sent spikes on the synapses. In some implementations of an SNN, a neuron may only strengthen a single one of its synapses in a given time step or other unit interval. Neurons may be configured to enforce such a rule to address the corner case of a neuron simultaneously receiving multiple presynaptic spikes, each sufficient to satisfy an STDP rule based on the correspondence of these received spiked with a postsynaptic spike (either following or preceding the received spike, depending on the specific STDP rule). For instance, as shown in FIG. 5C, a single neuron (e.g., Neuron 3) may simultaneously receive two (or more) spikes in a wave of spikes created by activating a single one of the neurons (e.g., Neuron 6). In some examples, neurons implemented by a neuromorphic computing device may implement STDP by enforcing exclusive selection such that the neuron selects (e.g., arbitrarily) only one of the simultaneously received spike messages as corresponding to an outgoing spike message sent by the receiving neuron, leading to the unselected one of the spikes being ignored and resulting in the weight of only one of the incoming synaptic paths being adjusted according to STDP. Accordingly, as shown in the example of FIG. 5D, only the synapse from Neuron 3 (to Neuron 5) is strengthened in response to the example spike wave shown in FIG. 5C.

In the parlance of machine learning, the example of FIG. 5C may correspond to a training phase of an example SNN modeling a particular network topography and FIG. 5D may reflect the resulting trained SNN. With the synaptic weights of the bi-directionally connected neurons strengthened in a direction opposite to the direction of the spike wave generated by one of the neurons (e.g., Neuron 6) according to an STDP rule defined for the SNN, the adjusted synaptic weights may be leveraged to determine a shortest path from any one of the neurons to the neuron (e.g., Neuron 6), from which the spike wave originated. In some implementations, illustrated in FIG. 5E, the SNN may be further augmented to facilitate network traversal calculations by adjusting one or more other parameters of the neurons in the SNN. For instance, neuromodulatory signals (e.g., 510) may be sent to globally instruct the neuromorphic computing device (and/or each of the neuromorphic cores implementing the neurons in the SNN) to apply a change to all of the neurons (or a particular subset of the neurons) in the SNN. For example, in FIG. 5E, a neuromodulatory signal 510 may be sent following the initial spike wave and resulting adjustment of synaptic weights in the SNN (as introduced in FIGS. 5C-5D) to cause the membrane or spiking threshold potential (e.g., 0) of each neuron to be increased to a value that ensures that a single presynaptic spike may only trigger a postsynaptic spike if the presynaptic spike was sent on one of the synapses with the increased weight. Other neuron parameters may also (or alternatively) be adjusted based on a particular global neuromodulatory signal, to assist in training, or preparing, the SNN for use in determining paths between a particular neuron (e.g., Neuron 6) and any other neuron in the SNN.

Figure 5F:
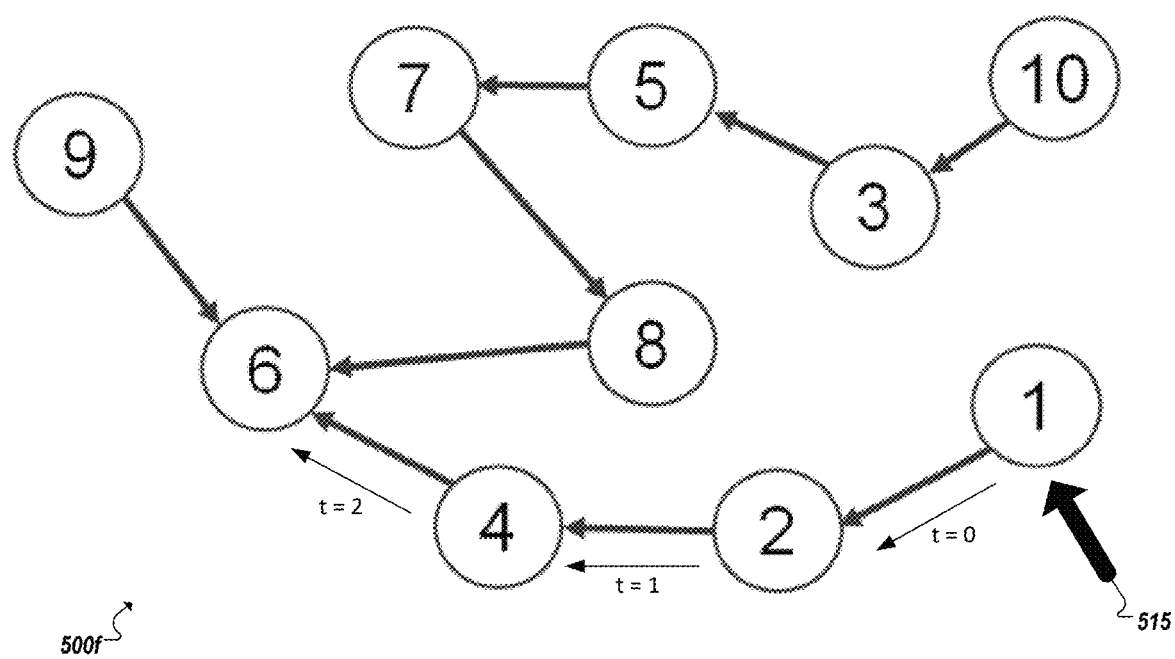

Turning to FIG. 5F, a representation of an SNN is shown with synaptic weights adjusted based on an STDP rule and in response to a spike wave generated by Neuron 6. The SNN represented in the example of FIG. 5F may also reflect the SNN following the reception and processing of a neuromodulatory signal, which increased the spiking threshold potential beyond a value used during the propagation of the spike wave (in FIG. 5C). The activation of a particular neuron (e.g., Neuron 6) to generate the initial spike wave may be based on a designation of the particular neuron as a destination node in a particular network traversal path to be determined using the SNN. Further, another one of the neurons in the SNN may be selected corresponding to a source node in the network, with the source node representing the start of the network traversal path and the destination node representing the end. In the example of FIG. 5F, Neuron 1 is selected to designate a corresponding node as the source node and define the problem statement: determining a path in a particular network from a node represented by Neuron 1 and a destination node represented (in this example) by Neuron 6. In other transactions, a different one of the neurons (i.e., other than Neuron 6) may be designated as the destination and other neurons may designated as the source, and so on. To designate the source neuron (e.g., Neuron 1) following training of the SNN (e.g., through the initial spike wave and corresponding STDP adjustment and increase in spiking threshold within the SNN (as discussed in FIGS. 5C-5E)), the designated source neuron may be activated (e.g., at 515) in a manner similar to the activation (e.g., 510) of the destination neuron (e.g., in FIG. 5C). Given the changes to some of the synaptic weights and the neurons' spiking threshold potential, the effect of the activation 515 of the source neuron (e.g., Neuron 1) may be much more limited. For instance, as shown in the example of FIG. 5F, Neuron 1 may be activated following training of the SNN causing a spike to be sent from Neuron 1 to Neuron 2 at time t=0. A spike may also be sent by Neuron 1 to other neighboring neurons (e.g., Neuron 3), but due to the increased threshold potential applied across the SNN, if the synapse connecting Neuron 1 to these other neighboring neurons (e.g., Neuron 3) was not strengthened according to the STDP during training, the spike will be insufficient to meet the newly increased spiking threshold potential of the receiving neuron and that spike will not propagate further. Indeed, in the representation of FIG. 5F, only those spikes which act to trigger subsequent spikes in a chain of spikes resulting from the activation 515 of the source neuron are illustrated (although it should be appreciated that the other spikes not shown are still, in fact, sent within the flow illustrated in FIG. 5F).

Continuing with the example of FIG. 5F, at time t=1, given that the weight of the synapse from Neuron 1 to Neuron 2 was strengthened during training (e.g., as shown in FIGS. 5C-5D), reception of the spike from Neuron 1 causes Neuron 2 to also fire, sending spikes to its neighboring neurons. For instance, at time t=1, Neuron 2 may send spikes to Neurons 1 and 4, although only the synapse connecting Neuron 2 and Neuron 4 has been sufficiently strengthened (through STDP) to cause a postsynaptic spike (e.g., by Neuron 4 at t=2). In this example, Neuron 4 sends spikes at time t=2 to Neurons 2 and 6, with the spike to Neuron 2 being sent on a "weak" synapse, and the spike to Neuron 6 (the destination neuron) sent on a "strengthened" synapse. While the spike sent to Neuron 6 may be sufficient to cause Neuron 6 to send additional spikes to its neighboring neurons, because training of the SNN was based on Neuron 6 being the destination and synapses in the bidirectional SNN were strengthened only in the direction "toward", or into, Neuron 6, none of the outbound synapses of Neuron 6 were strengthened during training and the propagation of the spike chain originating through the activation 515 of Neuron 1 in this example, ends at Neuron 6.

Figure 5G:
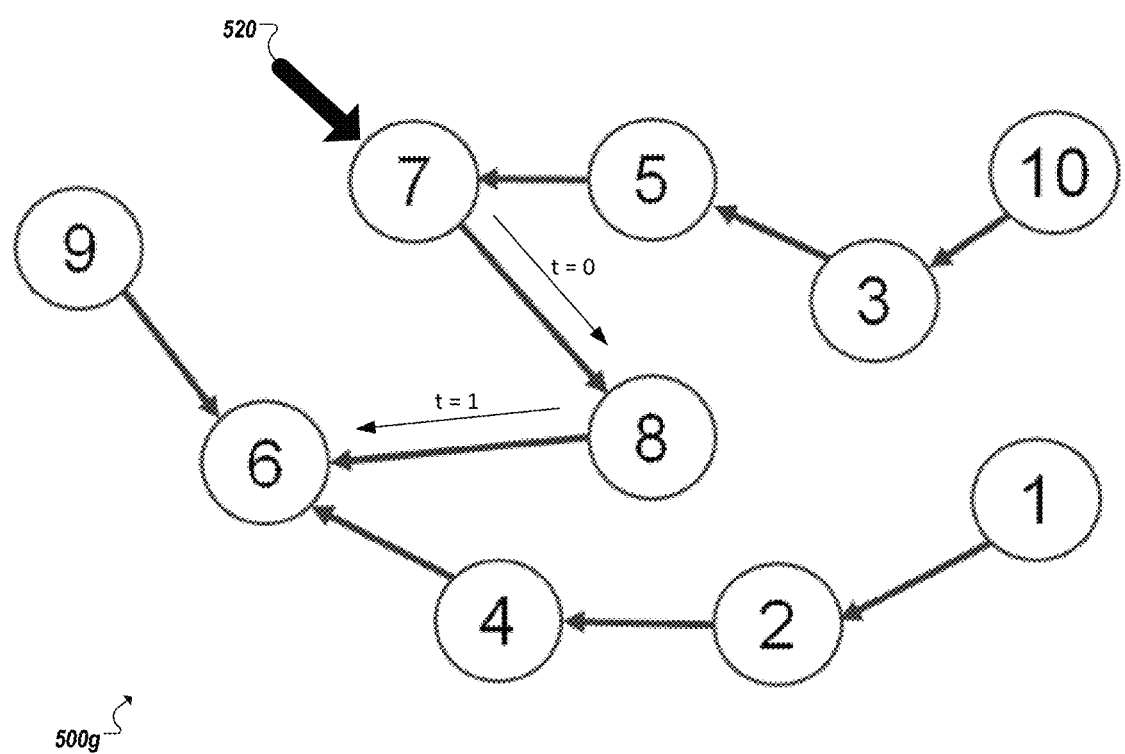

Continuing with this example, the spike chain from source Neuron 1 to Neuron 2 to Neuron 4 to the destination Neuron 6, may be interpreted to represent the shortest path between the source Neuron 1 and the destination Neuron 6. Monitoring and/or reporting logic may be provided to identify the order ad source of spikes sent in this chain of spikes. For instance, routers of a neuromorphic computing device may be monitored to identify traffic between (or within) one or more neuromorphic cores that identifies the spike messages that result from activating Neuron 1 following training of the SNN to determine shortest paths across a network to a designated destination node. A controller utility (internal or external to the neuromorphic computing device) may be associated with the monitoring of traffic in the SNN, such that the monitoring is orchestrated in connection with the training of the SNN and activation of the designated source neuron (as well as the activation of the designated destination neuron during training). Further, following training the SNN to determine shortest paths to a particular node (and corresponding neuron) in a network, additional, alternative source nodes may also be tested to determine shortest paths from these other source nodes (effectively reusing the training of the SNN corresponding to the designation of the particular node (e.g., Neuron 6) as the destination node). For instance, as shown in FIG. 5G, following the performance of the example procedure in FIG. 5F to determine a path between Neuron 1 and Neuron 6 (and allowing observation, recording, reporting, etc. of the results of this procedure (i.e., the identification of the path based on a spike chain propagated across the SNN from Neuron 1 to Neuron 6 based on the training)), another one of the neurons (e.g., Neuron 7) maybe designated as a source in a second path calculation using the trained SNN by activating 520 Neuron 7. As in the example of FIG. 5F, this may result in a chain of spikes being sent from Neuron 7 to the destination neuron, Neuron 6. In this example, the chain of spikes may correspond to a shortest path over the network from Neuron 7 over Neuron 8 and ending at Neuron 6. This spike chain may also be observed or recorded and used to represent a path in a network topology from the node represented by Neuron 7 to the node represented by Neuron 6, and so on. Turning on the neuromodulatory signal turns off STDP such that the sequence of spikes that represent the shortest path (and that are recorded/monitored) do not end up changing the weights through STDP again.

Figure 5H:
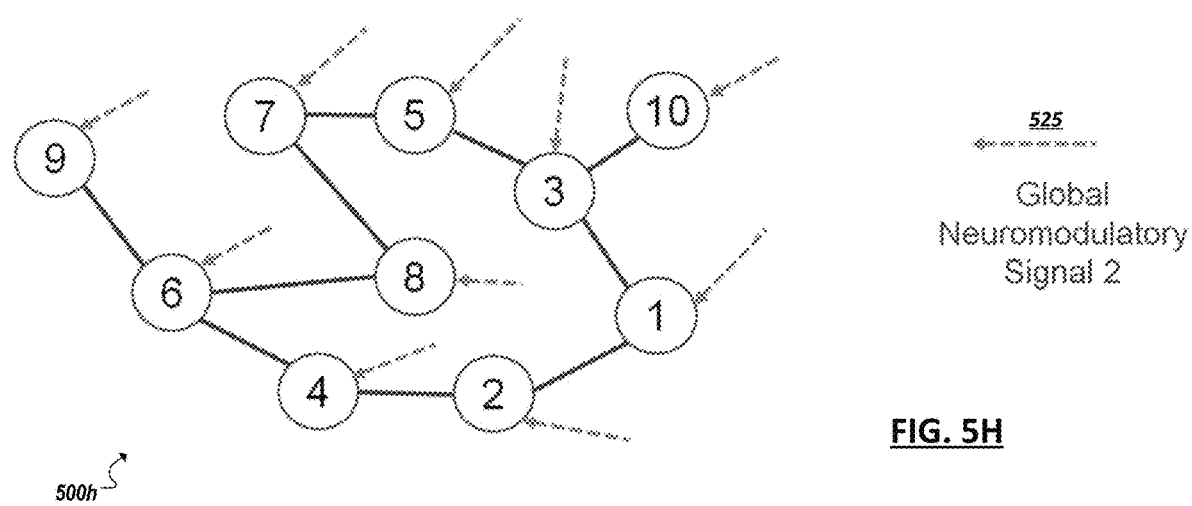

In some implementations, it may be desirable to use an SNN implemented to model a particular network topology to determine shortest paths from one or more source nodes to another destination node. For instance, a user may desire the calculation of a network path from a node represented by Neuron 4 to a destination node represented by Neuron 10, among any other example path within the modeled network. To facilitate a designation of a different neuron as the destination neuron in such path calculations, the SNN may need to be retrained according to the new destination neuron. This may first involve resetting the SNN to its initial parameters and characteristics. For instance, as shown in the example of FIG. 5H, another neuromodulatory signal 525 may be sent to cause the settings of each of the neurons and synapses defined in the SNN to their initial values (e.g., with all synaptic weights and spiking threshold potential values set equally across the SNN). Upon resetting the SNN, another neuron may be designated as the destination neuron by activating the neuron (as in the example of FIG. 5C) to cause a spike wave that may cause (through a STDP rule) the relative strengthening and weakening of synapses in the SNN based on the propagation of the spike wave (e.g., as in the example of 5D). The spiking threshold potential values of the neurons may then again be increased (as in the example of FIG. 5E) and a source node designated by activating the neuron to cause another spike chain to be sent from the source neuron to the destination based on the new training of the SNN, with this spike chain representing a shortest path from the source to the destination, and so on.

Network traversal path results derived from training and interaction with an example SNN (such as in the examples above) may be utilized by consumer systems to realize further actions, computations, and results. Turning to the simplified block diagram 600a of FIG. 6A, in one particular example, a management system 224 may be provided that interfaces with a programmable neuromorphic computing device (e.g., 205) capable of being used (as discussed above) in modeling various network topologies and deriving shortest paths between nodes in the network. The management system 224 may additionally interface with an example consumer system 605, which may make use of network path results generated using SNNs implemented by the neuromorphic computing device 205. For instance, a network manager 610 of the management system 224 may provide a network definition 625 to the neuromorphic computing device 205 to instruct the neuromorphic computing device 205 to implement a particular SNN that corresponds to one or more activities involving the consumer system 605. In some implementations, the network definition data 625 may be in response to a request or other information provided to the management system 224 by the consumer system 605. In some implementations, the management system 224 may be implemented on and integrated with the consumer system 605, which may in turn interact with (or even incorporate) the neuromorphic computing device 205, among other example implementations.

Figure 6A:
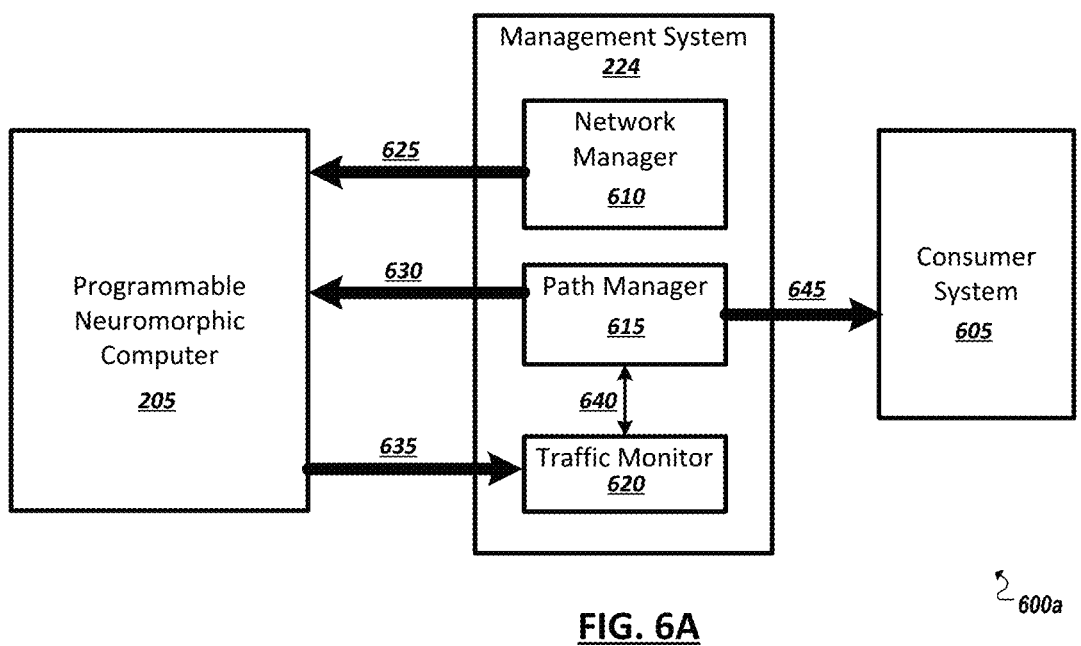
FIGS. 6A-6B are simplified block diagrams illustrating example implementations of systems including neuromorphic computing devices.

Continuing with the example of FIG. 6A, network definition data 625 may request the neuromorphic computing device 205 to implement a bi-directionally connected SNN corresponding to a particular network topology, and may further request that the SNN be configured for use in determining paths between neurons in the SNN. For instance, the network definition data 625 may indicate that SNN be implemented such that the neurons are bi-directionally connected (in that synapses are implemented to and from each neighboring neuron), a particular STDP rule is applied, and that all neurons have a particular spiking threshold potential value and all synaptic weights be set to the same value such that that any spike initially sent in the network will propagate throughout the network.

In some implementations, a path manager 615 of the management system 224 may include logic to identify source and destination nodes in a particular network for which a path is to be determined using the SNN implemented on the neuromorphic computing device 205. In some instances, the consumer system 605 may provide identifiers of one or both of the source and destination nodes. In other instances, the path manager 615 may determine one or both of the source and destination nodes on behalf of the consumer system (e.g., in cases where the consumer system lacks the functionality or resources to make such a determination itself), among other example implementations. In one implementation, the path manager 615 may indicate the destination node to the neuromorphic computing device 205 by sending a signal to the neuromorphic computing device 205 that causes a particular neuron in the SNN modeling the destination node to be activated. As detailed in the example of FIGS. 5B-5H, activating a destination neuron causes a spike wave to propagate from the destination neuron throughout the rest of the network. Further, a STDP rule set in the SNN may cause synapses in the direction opposite the spike wave's propagation to be adjusted upward (while weights of the synapses carrying the spike wave outward from the activated neuron (i.e., not including the echo spikes) are either not increased or decreased). In some implementations, the path manager 615 may further cause the neuromorphic computing device to send a neuromodulatory signal to globally change (e.g., increase) the spiking threshold potential of all neurons in the SNN and finish training of the SNN in preparation for determining paths to the designated destination node in a network. In some implementations, the neuromorphic computing device may include pins or another interface on which an example management system 224 may send a particular neuromodulatory signal, which will be distributed to all neuromorphic cores and their neurons within the neuromorphic computing device 205.

Upon training the SNN, an example path manager 615 may then send a signal to the neuromorphic computing device 205 to cause another one of the neurons to be activated corresponding to the source, or start, node in the desired network path calculation. Activating the source neuron may cause the source neuron in the neuromorphic computing device to send out a spike to its neighboring neurons, which based on the training of the SNN will propagate through a chain of spike messages sent along a path from the source neuron to the destination neuron. In connection with the activating the source neuron, the path manager 615, in one example, may communicate 640 with a traffic monitor 620 to initiate monitoring 634 of traffic on the neuromorphic computing device 205 associated with the activation of the source neuron. The monitored traffic may correspond to spike messages in the spike chain sent between neuromorphic cores for the neurons implemented on the neuromorphic computing device 205. In one example, the traffic monitor 620 may report 640 the observed traffic on the neuromorphic computing device to the path manager 615. The path manager 615 (or another module or subsystem of the management system 224) may generate network path data corresponding to the monitored traffic that represents a shortest path in the particular network from the source node to the destination node. This network path data may then be communicated 645 to the consumer system 605 for further use and processing by the consumer system (e.g., in connection with the specific functionality of the consumer system). For instance, the consumer system may be a social networking platform that utilizes the neuromorphic computing device to identify a shortest path between two members of the social network and provide one or more services or actions based on the shortest path. As another example, the consumer system may be a computing system adapted to perform biological or neurological analytics based on a shortest network path determined within a biological or neurologic network, among other examples.

Figure 6B:
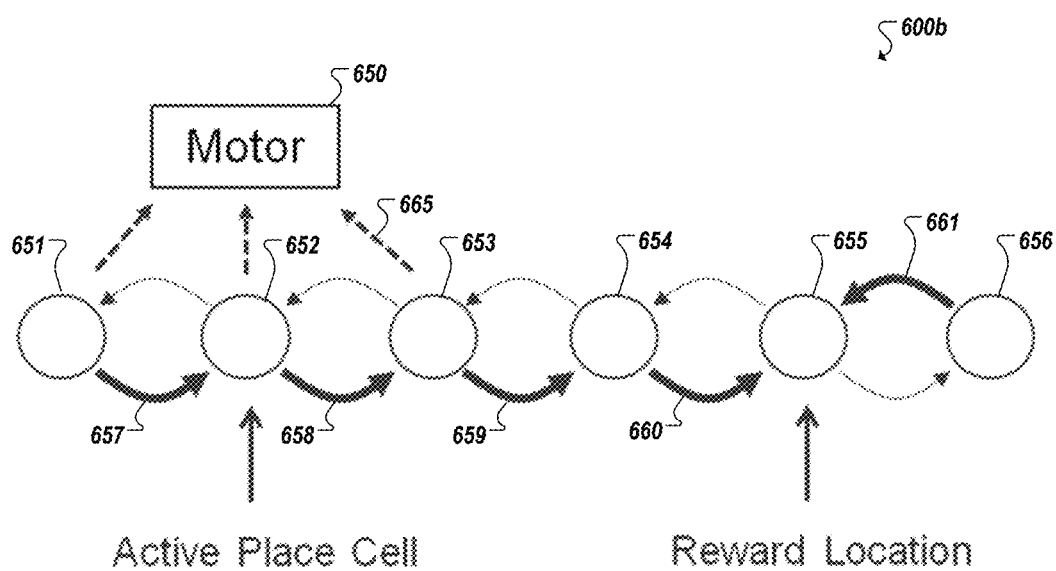

Turning to the example of FIG. 6B, as noted above, management system logic (such as discussed in the example of FIG. 6A) may be implemented on the neuromorphic computing device 205 and allow the orchestration of the implementation, training, and path determination using an SNN to occur entirely (or at least partially) on the neuromorphic computing device 205. Further, in some instances, the neuromorphic computing device 205 may interface directly with a consumer system or logic configured to use network path results generated through the use of an SNN implemented on the neuromorphic computing device. As an example, FIG. 6B shows a simplified block diagram 600b illustrating a representation of a portion of an SNN implemented to model a particular network. In this example, the "network" may itself model a physical environment, and determination of a path between nodes in the network may correspond to a determination of an optimized path between two points in two- or three-dimensional physical space. The example of FIG. 6B illustrates an instance of a neuromorphic computing device interfacing directly with logic (e.g., 650) to consume path data generated using the neuromorphic computing device. In this example, neurons (e.g., 651-656) of the SNN used to model a path between points in a network (through a spike chain generated through activation of a source neuron (e.g., 652) on synapses (e.g., 657-661) strengthened through previous training of the SNN)) may include further synapses to send output spikes (e.g., 665) to motor control logic 650 to direct an autonomous passenger vehicle, drone, robot, etc. to navigate the physical space corresponding to the SNN. For example, the spike chain may cause a receiving neuron (e.g., 653) to not only propagate the spike chain to the next neuron (e.g., 654) in the path (e.g., on synapse 659), but may also cause an output spike 665 to the motor control 650, which the motor control may interpret to indicate a direction in which the motor control is to direct a device (e.g., drone, robot, etc.) along the corresponding path, among other examples.

Figure 7:
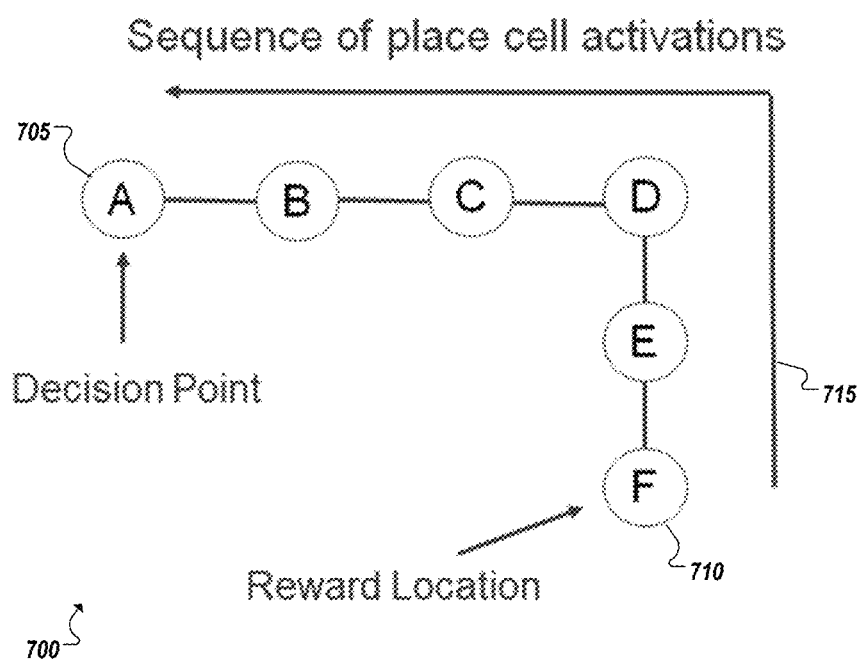
FIG. 7 is a simplified block diagram illustrating modeling physical path planning using an example SNN.

Building upon the example of FIG. 6B, using a configurable SNN to determine paths between nodes in a particular network topology may be leveraged to implement SNNs to realize hardware-based path planning in physical space. For instance, as shown in the simplified block diagram 700 of FIG. 7, path planning may involve making a navigation decision at a particular starting point (e.g., 705) in a physical environment, where the goal of the navigation is to find an optimized path to a desired destination, or reward location (e.g., 710). In such examples, a SNN may be implemented using a neuromorphic computing device, with each neuron in the SNN assigned to correspond to a point within the physical environment. As in the examples of FIGS. 4A-5H, a destination neuron (corresponding to a physical destination) may be selected and activated to train the SNN to bias subsequent spike chains to be directed along a shortest path toward the destination. For instance, a destination neuron may be activated that corresponds to a reward location (e.g., a destination of a delivery drone's flight, a charging station for a robotic device, a location of an object to be retrieved by an autonomous tool, etc.), resulting in a spike wave (e.g., 715) that propagates from the destination neuron 710 to all other neurons in the SNN. As in the examples of FIGS. 5B-5H, an STDP rule may be applied in the SNN to cause synapses directed toward the destination neuron to be strengthened based on the spike wave. Further, a spiking threshold potential may be adjusted to further bias the trained SNN. A current location of a device (or individual wearing or carrying the device) may be determined and this location may be the basis of activating another one of the neurons in the SNN as the source neuron in the path. As described above, activating the source neuron in the trained SNN may cause a spike chain to propagate along a shortest path through the SNN to the destination. A corresponding physical location may be determined for each neuron sending a spike in the spike chain to determine a shortest path to the physical destination environment (e.g., by navigating, in order, through each one of the locations corresponding to the neurons (e.g., Neurons A-F) in the spike chain).

In some cases, during navigation of a device, multiple source neurons may be activated before the device reaches the destination. By activating a particular neuron and training the SNN to solve for the particular neuron as the destination, the trained SNN may be used multiple times to determine the shortest path to the particular destination neuron from any other neuron in the SNN. In one example, a robot may incorporate a neuromorphic computing device and may periodically determine its current location using technologies such as visual computing, global positioning, positioning by third party systems tracking the location of the robot, etc. When the robot determines its current location, it may cause a corresponding neuron in the trained SNN of the neuromorphic computing device to be activated to determine an updated path to a particular destination. From the path result returned based on a spike chain generated from the activation of the source neuron, the robot may adjust or continue its movement along a corresponding path. Some time later the robot may recalculate its location and activate a neuron corresponding to the latest calculated location to determine whether the robot remains on the previously calculated path, has reached the destination, or needs to adjust its direction based on the path determined from activation of the neuron corresponding to the new location. The robot may continue to recalculate its location and cause the neuromorphic computing device to provide an updated shortest path to the destination until the robot reaches the destination.

Figure 8A:
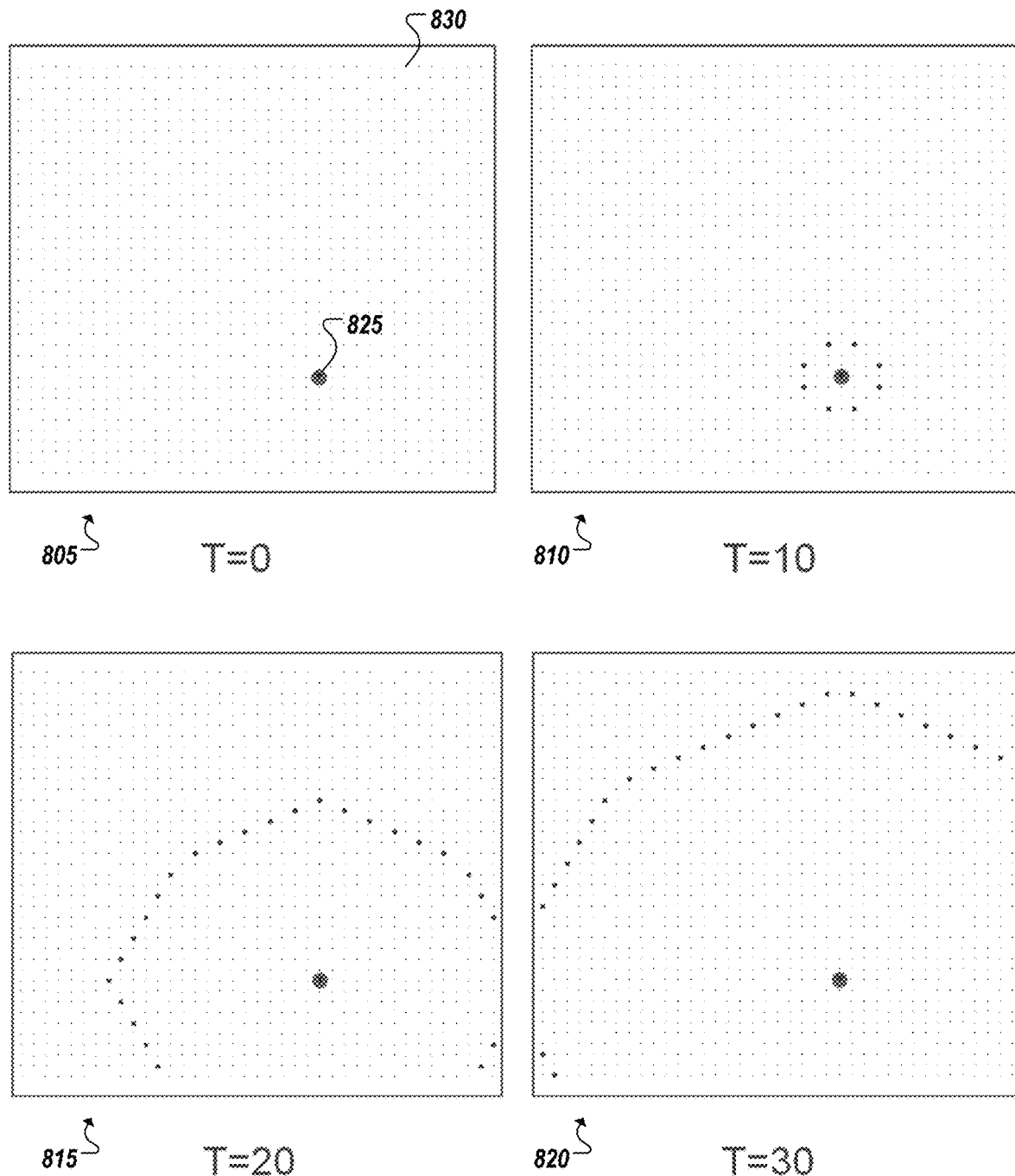
FIGS. 8A-8B are block diagrams illustrating effects of an example spike wave within an example SNN.

Turning to FIG. 8A, diagrams 805, 810, 815, 820 illustrate propagation of a spike wave generated from the activation of a destination neuron 825 in an SNN modeling a two-dimensional (2D) physical environment. Each of the diagrams 805, 810, 815, 820 includes lattice of points representing nodes in a lattice network, with each node mapped to a point (e.g., a coordinate, latitude/longitude, etc.) in the physical environment. In one example, each node in the lattice network may be bi-directionally connected to its immediate vertical and horizontal neighbor node. In other implementations, each node may be additionally bi-directionally connected to its immediate horizontal neighbors. Three-dimensional (3D) physical spaces may be similarly modeled using 3D lattice networks, and other examples.

In diagram 805, a particular neuron is activated at time (e.g., time step) t=0 corresponding to the designation of a corresponding location as a destination or reward destination. Activation of the particular neuron causes a wave of outbound spike signals, causing a first subset of the neurons (representing a portion of the nodes (e.g., 830) positioned radially outward from the destination node 825) to be activated upon receiving spike messages in the spike wave at time t=10. Diagrams 815 and 820 likewise illustrate progress of the spike wave's propagation through neurons representing the nodes extending radially from the destination node in physical space. It should be appreciated that the physical orientation or architecture of neuromorphic cores need not correspond to the physical locations represented by the neurons implemented by the neuromorphic core. Indeed, a neuromorphic core may concurrently implement multiple (or many) neurons in the SNN, including two or more neurons representing physical locations far removed from each other in physical space. However, in some implementations, neurons may be implemented on respective neuromorphic cores so as to optimize inter-nodal traffic based on the likelihood that some neurons are more likely to communicate with other neurons (i.e., through spike messages). For instance, neurons representing nearby locations may be implemented on cores that are in close proximity within the manycore network of the neuromorphic computing device, among other examples.

Figure 8B:
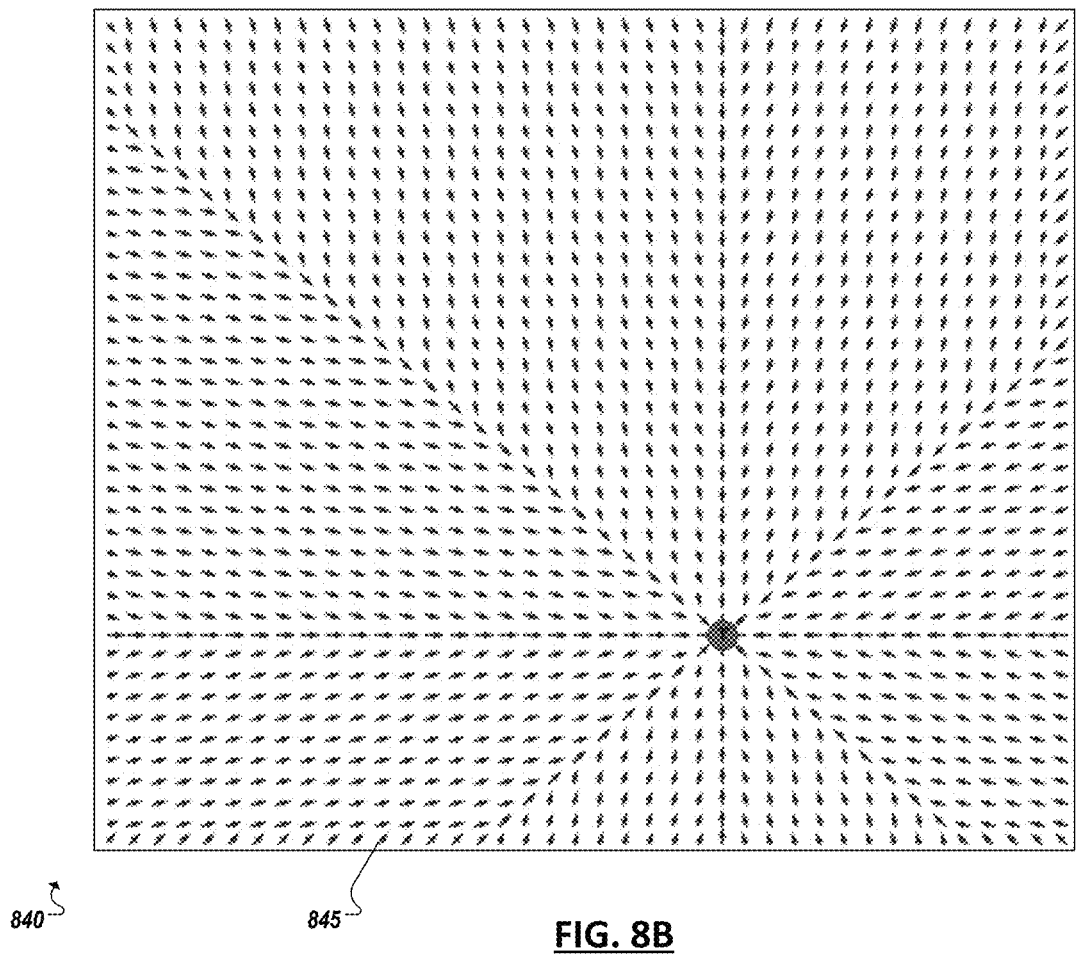

As shown in FIG. 8A, a spike wave may propagate through a network of neurons. Further, as introduced above, a STDP rule applied to the SNN may cause weights of synapses directed opposite to the direction of the outward propagation of the wave to be increased to train the SNN for calculating paths to a selected destination node. FIG. 8B is a representation 840 of a vector field representing the generalized direction of a shortest path from each node in a lattice network to a destination node based on the wave propagated from a designated destination node 825 in the example of FIG. 8A. The direction indicated by the vector, or arrow graphic (e.g., 845) corresponding to each node, illustrates the direction in which synapses of various nodes in the network have been strengthened toward the target node. As a result, selecting a source node will result in a path being determined (as corresponding to a spike chain generated by activating a source neuron) that tracks directions shown by the arrow graphics in the representation of the trained SNN shown in FIG. 8B. FIGS. 9B, 10A, 10C, and 11B-11E utilize similar representations based on their respective examples.

Figure 9A:
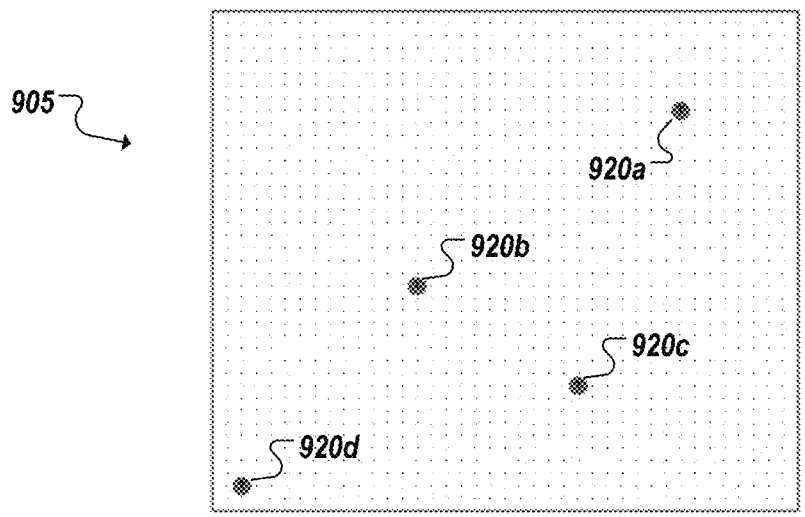
FIGS. 9A-9B are block diagrams illustrating effects of an example spike wave initiated by two or more destination neurons in an example SNN.
Figure 9A:
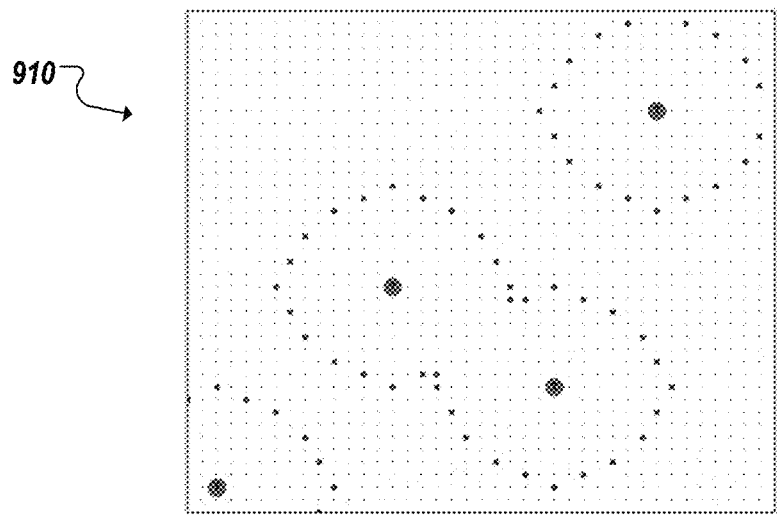
Figure 9A:
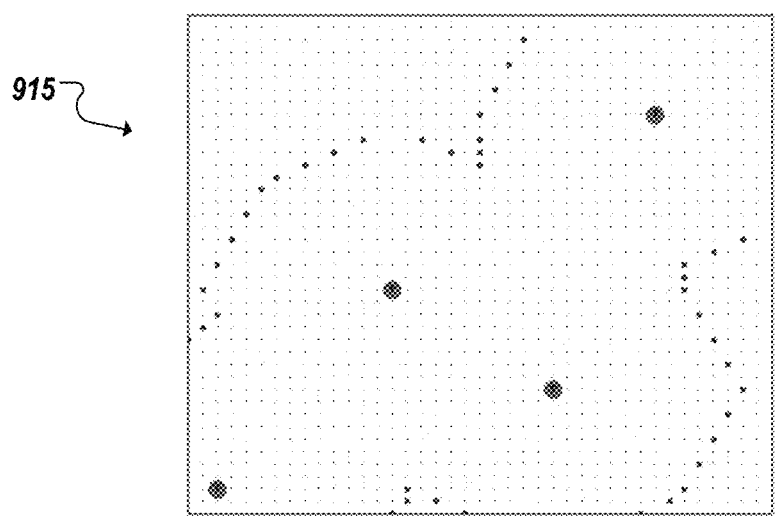
Figure 9B:
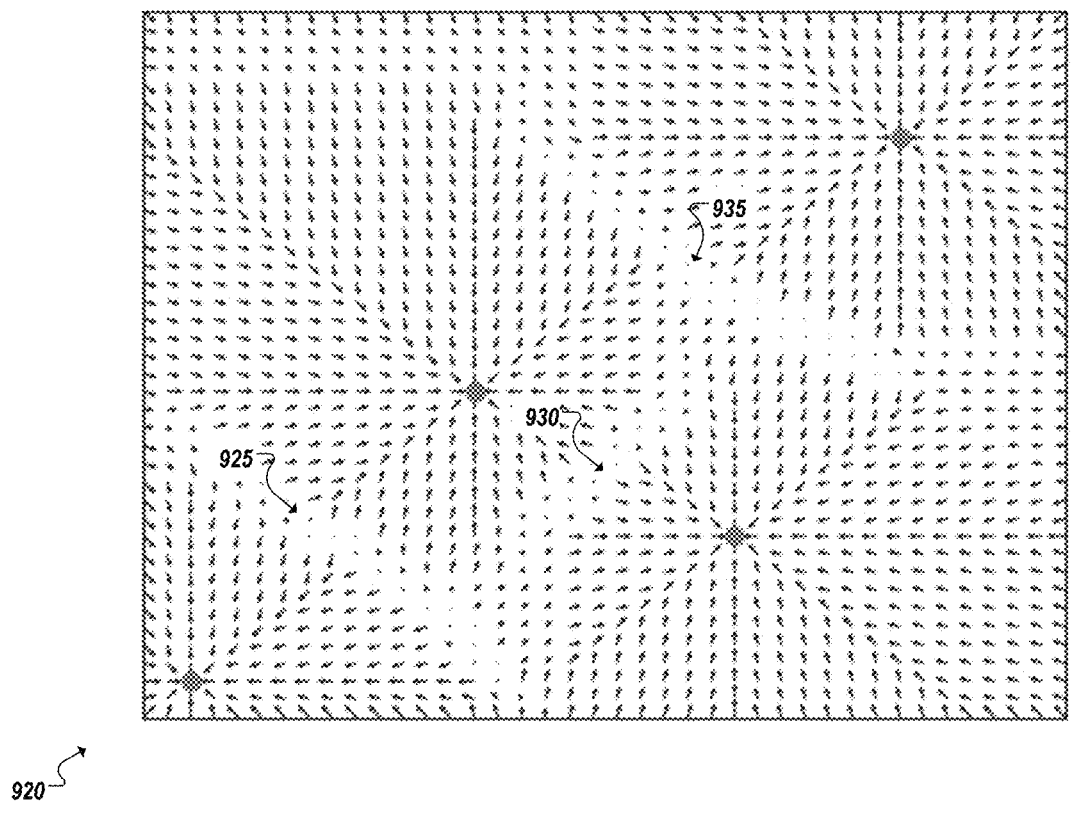

In the preceding examples, a single destination node is selected and a corresponding neuron activated to train an SNN for determining paths to the selected node. In other examples, such as shown in FIGS. 9A-9B, multiple alternative destinations may be selected and corresponding neurons in the SNN may be activated to train the SNN for use in determining a path to one of the multiple nodes. Such instances may be relevant to use cases where an autonomous device is to navigate to any one of multiple targets (e.g., a drone navigating to any one of multiple charging stations in response to detecting a low battery condition). For instance, diagram 905 shows a lattice network of nodes (e.g., corresponding to coordinates in a physical environment), four of which (e.g., 920a-d) have been designated as targets or destinations within the network. The neurons of the four destination nodes may be simultaneously activated, causing corresponding spike waves to propagate from each of the four neurons. In implementations where a digital SNN is formed and synchronization is accomplished through discrete time steps or windows (in which all outgoing and incoming spikes are to be processed), the spikes and spike waves generated by the multiple destination neurons may not fire simultaneously in temporal time, but may be considered simultaneous because they are processed by the neuromorphic computing device within the same time step defined for the SNN.

Continuing with the example of FIG. 9A, diagrams 910-915 shows how the multiple spike waves generated by multiple destination neurons may eventually converge and propagate as a single wave to some of the neurons in the SNN. FIG. 9B shows a vector field demonstrating the resulting path directions for each of the potential source nodes in the network based on the spike wave training illustrated in FIG. 9A. Where multiple destination neurons initiate spike waves, it is possible that at least one other neuron will receive waves initiated by two different destination neurons at the same time (e.g., in the same time step). Such instances may form boundaries between the multiple destinations, such that a potential source neuron that receives two different spike waves at the same time is effectively located equidistant from the two destination neurons initiating the spike, based on the modeling of the location by the SNN. As introduced above, exclusive selection may be utilized to allow a node to select, which of the spike waves to recognize and which to ignore, thus driving which path will be selected when that source node is selected in a path determination. Such boundary nodes are illustrated in FIG. 9B, for instance, in regions 925, 930, 935, where no definitive direction is identified for potential source nodes in these regions toward a particular one of the designated destination nodes, based on the training in the example of FIG. 9A.

Figure 10A:
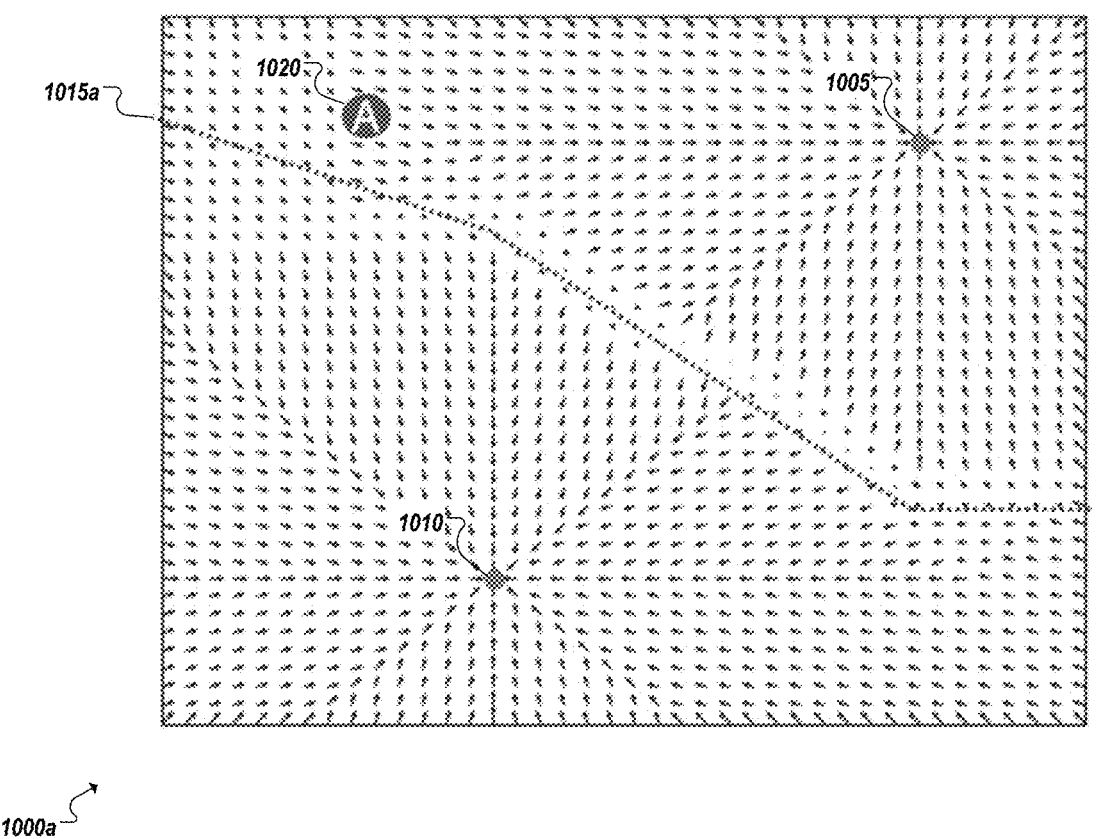
FIGS. 10A-10C are block diagrams illustrating effects of differential rewards of multiple destination neurons in spike waves initiated by the multiple destination neurons in an example SNN.

In examples where multiple destination neurons are designated and activated to cause training of a corresponding SNN using multiple spike waves, boundaries may be formed, such as discussed above in connection with FIG. 9B. Such boundaries, in some cases, may be used to determine which source nodes will be directed to which of the multiple possible destinations when selected. For instance, turning to FIG. 10A, a vector diagram 1000a of another example of a network with multiple potential destination nodes (e.g., 1005, 1010) is shown, representing the effect of an STDP rule on a corresponding SNN during training of the SNN by activating the neurons corresponding to nodes 1005 and 1010 resulting in the propagation of two separate spike waves. A line 1015a is superimposed on the vector representation to indicate a boundary defined in the training of the multi-destination network. If a node is selected that falls on one side of the boundary 1015a or the other, it may be predicted that a spike chain will result (from activation of a corresponding source neuron) defining a path to a corresponding one of the destination neurons. For instance, in the example of FIG. 10A, a source node A (1020) is selected and a corresponding neuron is fired following training of the SNN (e.g., increasing weights of synapses directed toward one of the destination neurons (in a direction opposite the spike wave first received by a corresponding neuron) and increasing the spiking threshold of neurons in the SNN). The activated source neuron will send a spike that will be sent to all of its neighboring neurons, but as in other examples, will only be strong enough to cause further spiking when sent on a synapse that has been enhanced through STDP based on the spike waves generated by the multiple destination neurons. In the example of FIG. 10A, the neuron corresponding to source node A (1020) received a spike in a spike wave originating from the activation of the neuron corresponding to destination node 1005 before the spike wave of another destination reached node A's neuron. Accordingly, synapses leading from node A (1020) to node 1005 were strengthened, which would cause a subsequent spike sent by node A 1020 to start a chain of spikes on synapses that would ultimately culminate with a spike being sent to node 1005, thereby defining a path from node A to a nearest one of the multiple designated destinations in the network.

In the example of FIGS. 9A, 9B, and 10A, it was assumed that the multiple destinations designated within a given network were to be considered equally. In other words, the designated destination nodes may model real world networks where the destinations are fungible, or equally good. In other cases, some destinations may be more desirable than others, with the desirability of a destination node being weighed against the distance to reach the destination, in determining whether a path from a source should culminate at that destination node or another. As an example, when using an SNN to model a path in a physical environment, a delivery drone may be tasked with picking up one of multiple packages for delivery. However, one of the packages may be higher priority. To model a preference for one target over another, path planning using an SNN may be augmented to model such a preference.

Figure 10B:
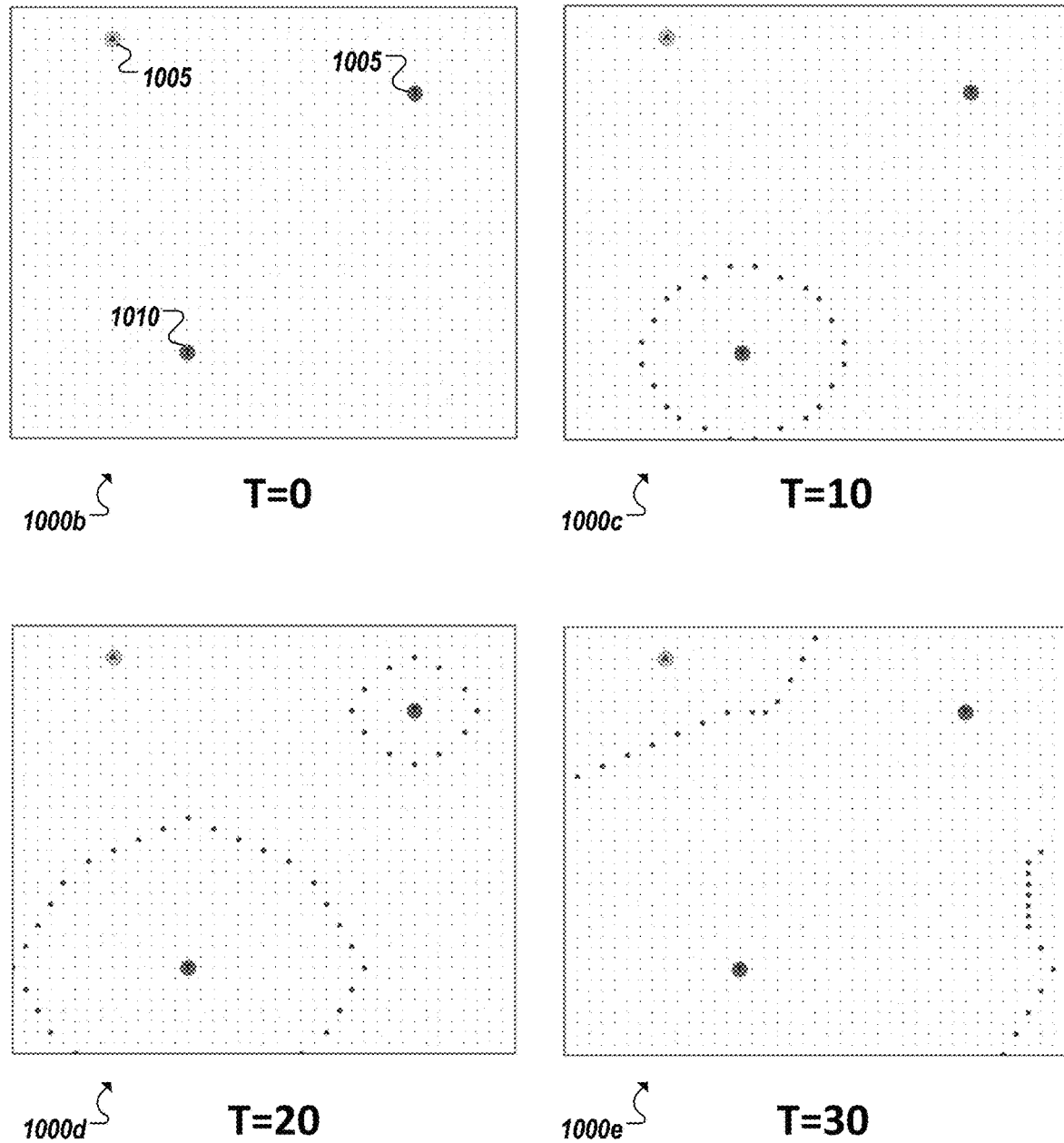

For example, turning to the diagrams 1000b-e shown in FIG. 10B, the example of FIG. 10A is augmented such that one of the designated destination nodes (e.g., 1010) is favored or biased relative to the other destination node(s) (e.g., 1005). To model a preferred destination node, the SNN may be configured to cause the neuron associated with the favored node to start its spike wave some time (e.g., some number of time steps) ahead of the start of spike waves initiated through activation of the other (less favored) destination neurons (e.g., 1005). For instance, as shown in diagram 1000c of FIG. 10B, a neuron associated with a preferred node (e.g., representing a location) may fire and begin the sending of a spike wave through the network prior to spikes being sent by the other neurons. Some time later (e.g., at T=20), other nodes representing lesser preferred destination nodes may send spikes to cause additional spike waves to propagate in the network. In some examples, STDP and refractory periods may be applied to the SNN such that synaptic weights are adjusted to correspond with the first spike wave sent between bi-directionally connected neurons. Accordingly, as shown in diagram 1000e, the two spike waves may eventually merge to propagate spikes to those nodes, which have not been stimulated. However, a spike wave that is sent ahead of other spike waves during training of the SNN may cause this spike wave to be received by more other neurons than would occur if the spike wave were sent concurrently with other spike waves during training. The resulting trained SNN may thus be biased toward determining paths that terminate at the preferred destination.

Figure 10C:
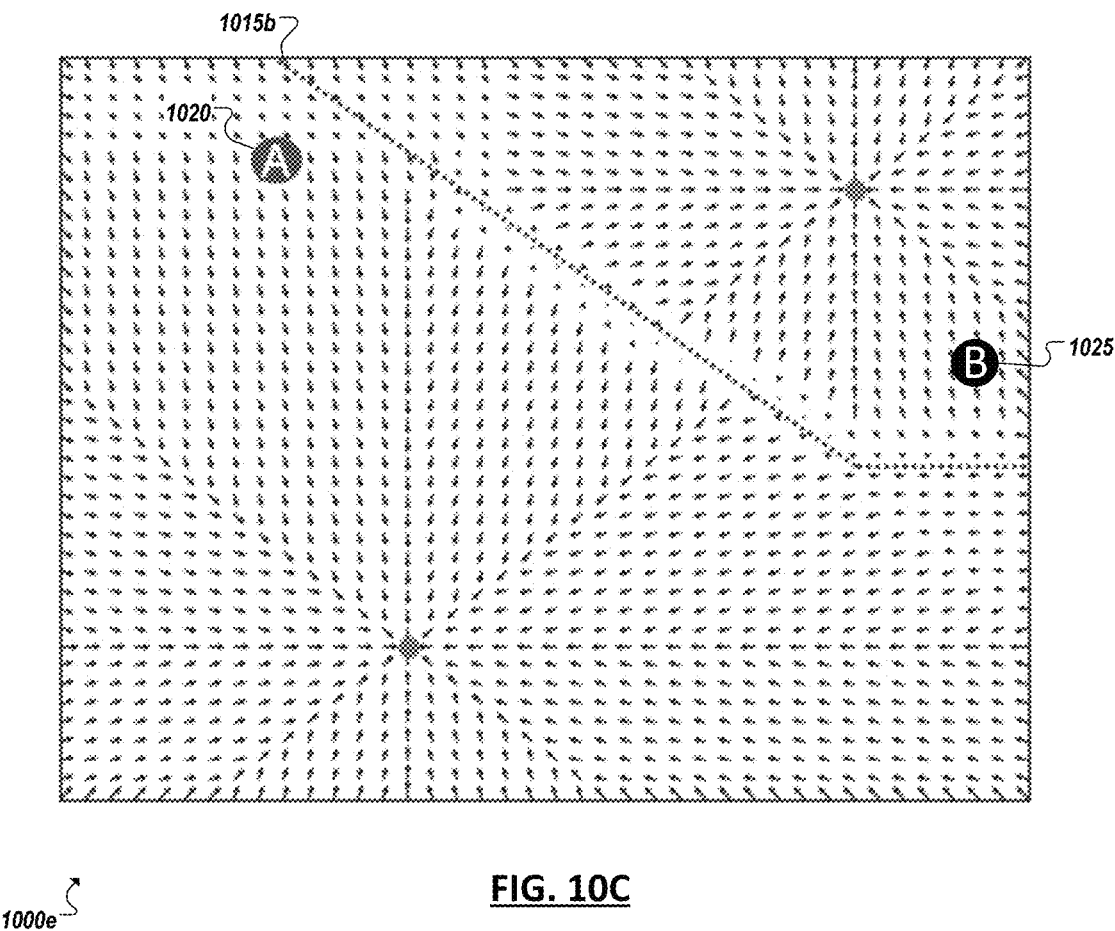

For instance, diagram 1000f of FIG. 10C illustrates a resulting vector field representation of an SNN trained by the spike waves illustrated in FIG. 10B. When compared with the vector field illustrated in FIG. 10A corresponding to a training stage where spike waves are sent concurrently by neurons 1005 and 1010, the vector field shown in FIG. 10C demonstrates the effect of sending a spike wave on neuron 1010 some time ahead of the spike wave sent by neuron 1005. Further, when compared with the representation in FIG. 10A, a different boundary (e.g., 1015b) may manifest from biasing one destination node over the other. For instance, the same source node 1020 may now fall on the side of the boundary 1015b corresponding to destination node 1010 causing a path to be determined from the source node 1020 to destination node 1010 instead of destination node 1005, as in the example of FIG. 10A. Even though the destination node 1005 is closer to the source node 1020 than destination node 1010 in the network, the preference afforded destination node 1010 in this example causes the trained SNN to bias path planning toward destination 1010. For other source nodes (e.g., 1025) positioned even closer to destination node 1005, the proximity to destination node 1005 may overpower the bias toward preferred destination node 1010, resulting in the determination of a path from the other source node 1025 to destination node 1005 instead of destination node 1010, among other examples.

In some implementations, to implement modeling of differential desirability, or reward, of multiple designated destination nodes, activation of the multiple destination nodes may be timed to model the relative desirability of each node. For instance, a first neuron corresponding to a first one of the destination nodes may be activated at t=0, while a second one of the destination nodes is later activated at time $t=t_1$. The delay in activation may be orchestrated using logic resident on the neuromorphic computing device or may be orchestrated by a system manager timing signals sent to the neuromorphic computing device to cause delays between the activations of multiple neurons designated as destination neurons in the training of a particular SNN. In other implementations, a spike delay used to model the relative desirability of multiple designated nodes may be configured at the neuron level, such that all of the destination neurons are activated simultaneously, with parameters of neurons modeling less desirable nodes adjusted to cause these neurons to delay the sending of their spikes and realize the desired delay between spike waves.

The amount of delay between the sending of spike waves by first and second destination neurons to model desirability of a first destination node over a second destination node may correspond to the relative degree of preference or desirability of the first node over the second node. In other words, a longer delay between the initiation of a first spike wave by a first neuron and the initiation of a second spike wave by a second neuron indicates a higher relative desirability of the network node represented by the first neuron over the second node represented by the second neuron. Likewise, a shorter delay indicates a smaller relative desirability of one node over another.

As a practical example, multiple network nodes representing physical space may be simultaneously designated as destination nodes (as in the examples of FIGS. 9A-10C) and correspond to the location of multiple recharging or refueling stations, which a drone or autonomous vehicle is to navigate towards in a low power or fuel condition. One of the refueling stations may be identified as more "expensive" than the others in that it has higher financial costs associated with recharging/refueling, is a station in higher demand, is a station that charges more slowly or inefficiently, is a station not controlled or owned by a particular autonomous device manager, etc. In some cases, conditions making one station more expensive than others may be dynamic and may change. As a result, the relative desirability of one station over the other may likewise change over time. Based on the relative desirability of each station, a desirability metric may be defined and spike messages sent during training of a corresponding SNN may be timed to reflect the relative values of the current desirability metric. If the desirability metric should change, the SNN may be retrained accordingly by resending the spike waves timed according to the new differences in the desirability metric. After training, the autonomous device may identify its current location and send a spike on a neuron corresponding to the device's current location. With the SNN trained to bias in favor of the more desirable locations, the path determined from the current location to a particular one of the multiple destinations may be based on not only the relative proximity of the device to any one of the destination locations, but also the desirability of the destination, among other examples.

Figure 11A:
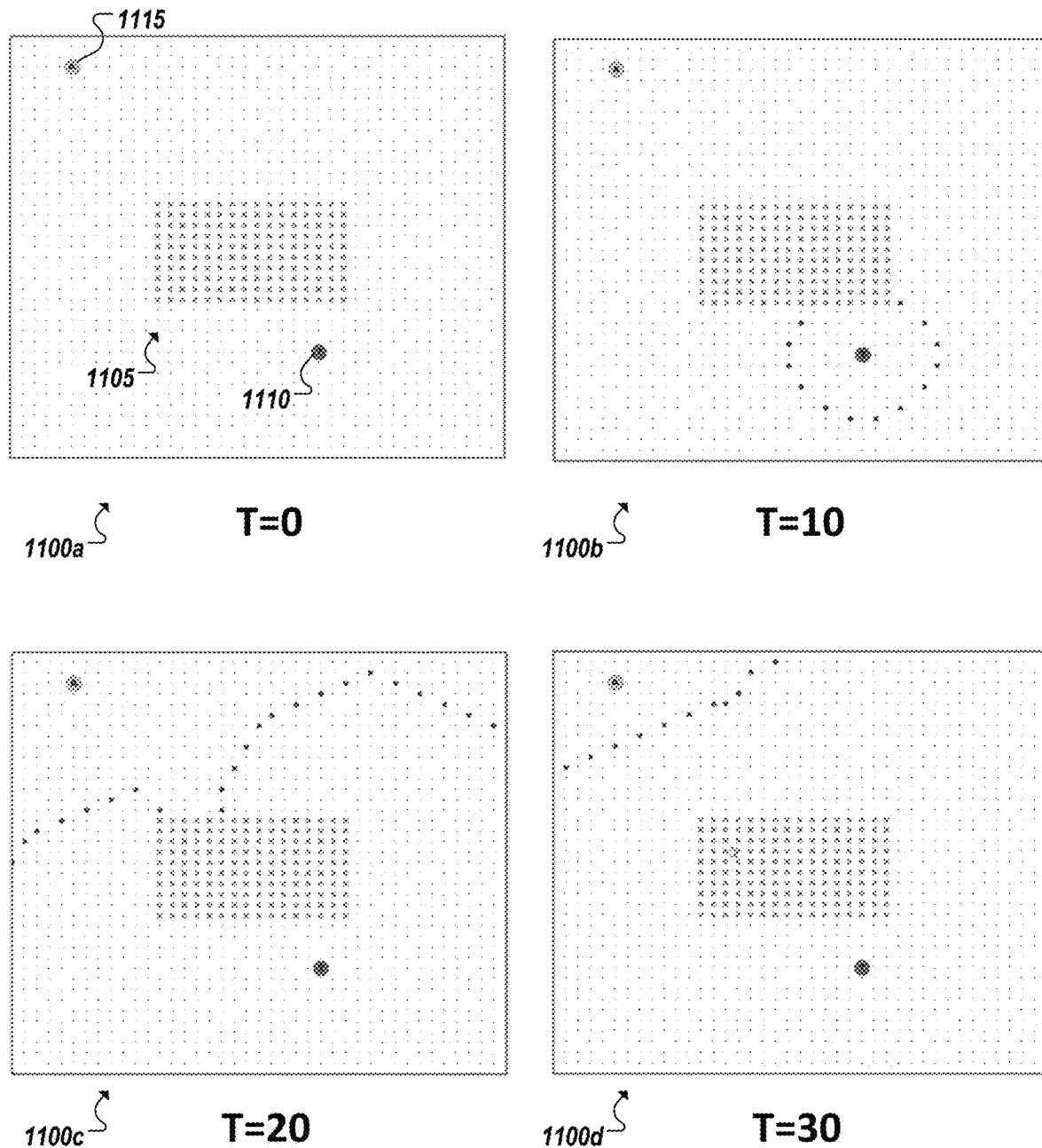
FIGS. 11A-11F are block diagrams illustrating definition and effect of hazard neurons within an example SNN.

In addition to some destination nodes being more desirable than others (i.e., having a higher degree of "reward") some paths may be discouraged by the presence of network nodes designated as "hazards." In some cases, a node may be designated as an absolute or impassible hazard, such that no network paths should be determined that traverse the hazard node. In other cases, a node may be designated as a hazard with a hazard rating falling below absolute, such that paths may be discouraged but not forbidden from traversing over the node. Turning to FIG. 11A, diagrams 1100a-d are shown illustrating the introduction of a collection of hazard nodes 1105 in a network. In some implementations, the network may model coordinates within a physical environment and the hazard nodes may correspond to the location of a physical hazard (e.g., a wall, body of water, piece of furniture, a region off-limits to a particular device, etc.).

In the example of FIG. 11A, a single destination node 1110 is designated for the network (although multiple destination nodes (including multiple destination nodes with different levels of desirability) may be designated in other examples). As in other examples, activation of a neuron corresponding to the destination node 1110 (e.g., at time T=0) may cause a spike wave to propagate and activate neighboring neurons radially disposed from the activated neuron 1110 (e.g., as shown in diagram 1100b). In this example, the hazard nodes 1105 may be configured to be absolute hazard nodes, meaning that the spike wave originating from the destination neuron (corresponding to node 1110) does not activate the neurons corresponding to these nodes. The spike wave will thus progress, as shown in diagrams 1100c, 1100d to propagate around the hazard nodes to the extent possible and eventually propagate to all nodes' neurons in the SNN. As in other examples, neurons activated by the spike wave may adjust one of their synapses (in the direction opposite the propagation of the spike wave) according to an STDP rule and to train the SNN. In some cases, training may additionally include adjusting spiking threshold potentials of all of the neurons in the SNN. In some cases, adjustment of the spiking threshold potentials may also be limited to non-hazard neurons or may be tuned based on the level of hazard of a neuron's node.

Figure 11B:
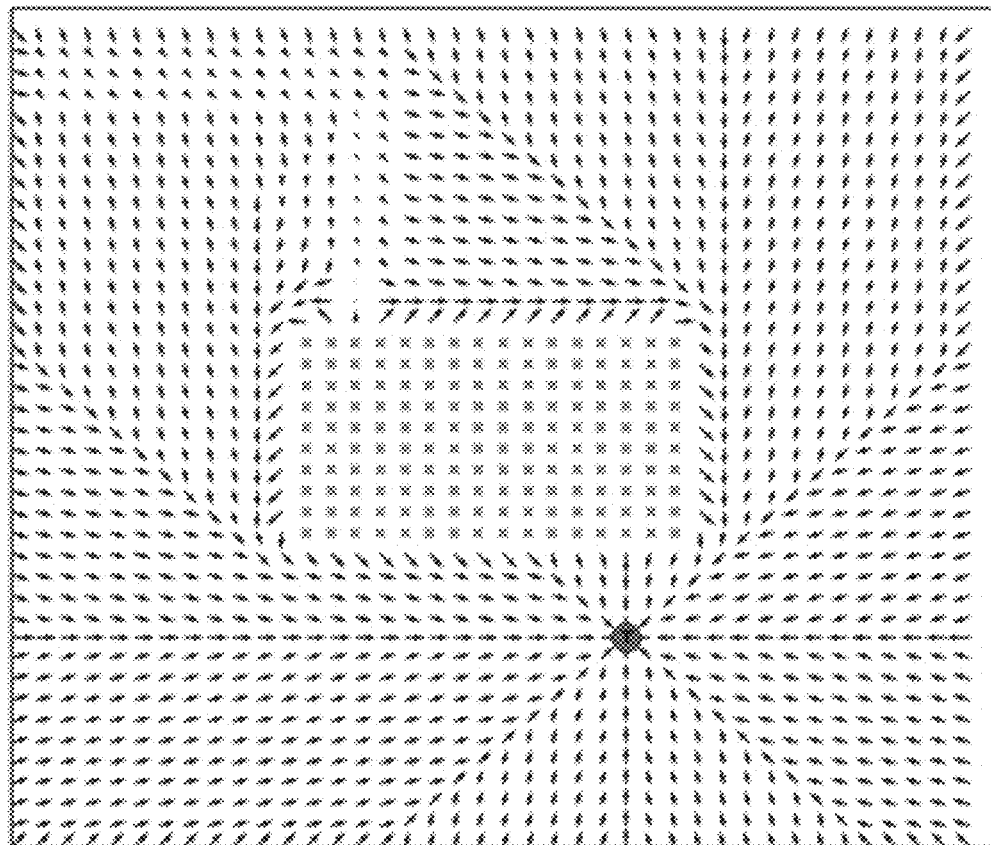

FIG. 11B shows a vector field diagram 1100e illustrating the directions in which any potential source node is likely to travel toward the destination node 1110 (and around the hazard node field 1105) based on the spike wave illustrated in the example of FIG. 11A. As shown in the example of FIG. 11B, training of the SNN may cause paths determined from source nodes next to or near hazard nodes to be directed away from and around the hazard before being directed toward the designated destination node 1110.

Figure 11C:
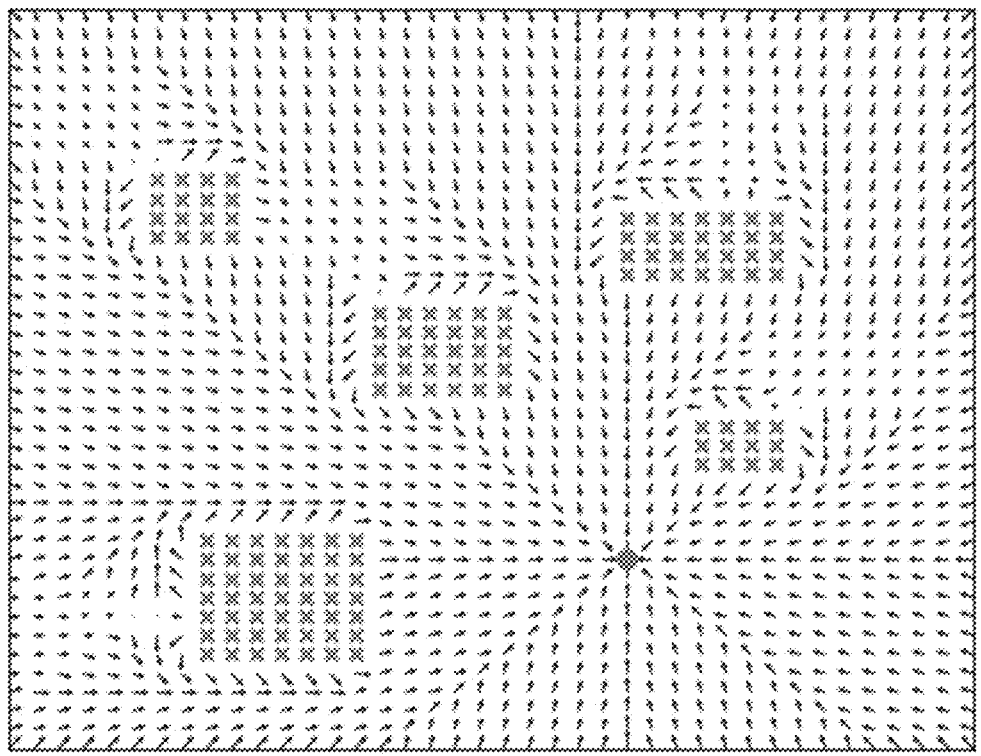

While the example of FIGS. 11A-11B, show the definition of a single rectangular hazard in a network, it should be appreciated that an SNN may be configurable to model potential any hazard of varying sizes, shape, and number. For instance, the example of FIG. 11C illustrates an example lattice network with five different-sized hazard node fields. Diagram 1100f of FIG. 11C further illustrates the vector field that would result from the training of an SNN modeling a network possessing such hazards, given a spike wave triggered from a destination node 1120 and the application of an STDP rule such as discussed elsewhere herein. It should be appreciated that hazard nodes may be non-rectangular and may correspond to the dimensions of physical objects (e.g., in networks modeling a physical environment). Indeed, hazard nodes may be designated in isolation, such that a single node may be designated as a hazard, while all of its neighbors are not designated as hazards, among a myriad of other examples.

Figure 11D:
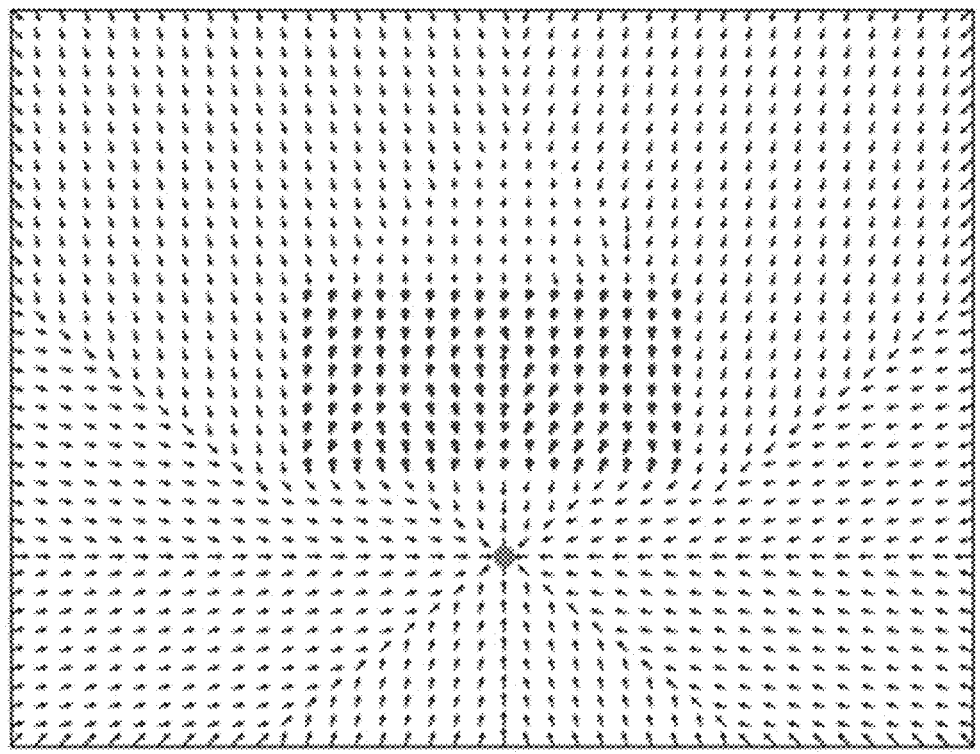
Figure 11E:
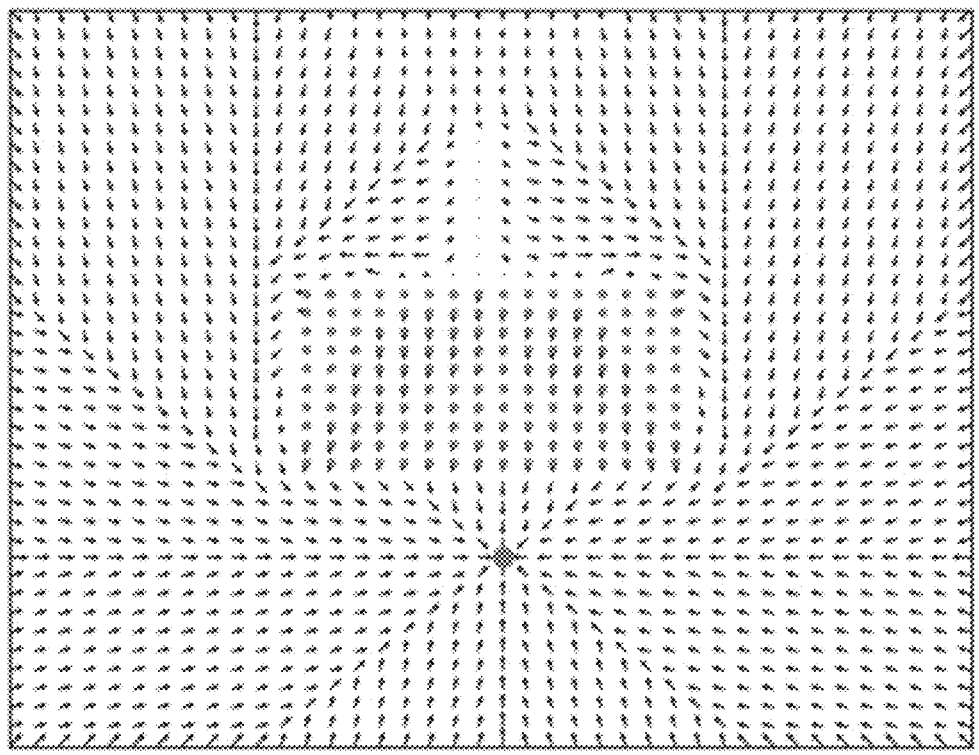

As introduced above, hazard nodes may be configured to model various degrees of hazard. Turning to FIGS. 11D-11E, examples are shown of networks where less-than-absolute-hazard nodes are defined. For instance, in the example of FIG. 11D, a diagram 1100g is shown illustrating a collection of hazard nodes that have been configured with low hazard characteristics. A low hazard node may be configured to allow a spike wave to activate and propagate through the hazard node, but the hazard node may impede the propagation of the spike wave by causing the spike wave to propagate slower over the hazard node than over a non-hazard node. FIG. 11D illustrates a vector field diagram 1100g based on a spike wave initiated at a neuron corresponding to a destination node, which propagated slower over the low hazard nodes. The vector field diagram suggests that some paths determined using the trained SNN may result in a path that incorporates the hazard nodes (e.g., paths of potential source nodes located near the hazard nodes), however the presence of the hazard nodes biases paths to attempt to avoid or minimize traversal over the hazard nodes.

Turning to FIG. 11E, an example of high hazard nodes are shown. High hazard nodes may differ from low hazard nodes in that high hazard nodes cause a training spike wave to traverse even slower over the high hazard nodes. As a result, as shown in the vector field diagram 1100h, the higher hazard a node is configured to have, the more it causes paths to avoid the hazard (as it would an absolute hazard node). It should be appreciated that different hazard nodes in a network may be assigned different degrees of hazard. In examples where the network models a physical environment, nodes may be assigned degrees of hazard to designate the degree of hazard associated with those physical coordinates, with some obstacles or hazards being more serious than others. The degree of hazard assigned may influence how much paths are biased to avoid the hazard, with convenient paths over or through the hazard being enabled for lower level hazards but more strongly discouraged by assigning higher hazard levels to the corresponding nodes.

In one practical example, a ground-based robot may utilize an SNN modeling the robot's physical environment. As hazards are detected within the physical environment, neurons corresponding to the coordinates of the hazards may be configured to represent the hazard, such that path determinations made using the SNN account for the hazards. In some cases, a robot may determine both its current location and may additionally identify nearby hazards (e.g., using visual computing, radar, communications received from a third party system (e.g., other robots who have encountered the hazard, a visual computing system monitoring the environment and recognizing various hazards, etc.) and signal a neuromorphic computing device implementing the SNN to cause corresponding neurons to be configured to represent the detected hazards (including the respective degree or seriousness of the hazard (e.g., low, high, absolute, etc.)). By modeling discovered or known (e.g., permanent or static)) hazards in the SNN, path determinations to a designated destination, based on the robot's currently determined location, may be based on an SNN trained to account for the presence of the hazard(s).

Depending on the network modeled by the SNN (and/or a physical environment modeled by the network), the nature, number, and severity of hazards may be modeled by configuring neurons in the SNN corresponding to the hazards. In one implementation, modeling a hazard through a corresponding artificial neuron may involve adjusting one or more parameters of the neuron to cause the neuron to respond to a presynaptic spike in a delayed manner. Non-hazard neurons within an SNN configured for path finding and planning within a particular network may be configured such that, prior to training, any spike received at the neuron will result in the neuron's spiking threshold potential being met and the neuron sending additional spikes to its neighbors (i.e., to propagate the spike wave used to train the SNN). The response of a non-hazard neuron may be configured to occur in direct response to any received spike (provided the neuron is not in its refractory period after sending a spike in response to a previously received spike). For instance, non-hazard neurons may send postsynaptic spikes in the time step immediately following a time step in which a presynaptic spike is received. Neurons designated as corresponding to hazard nodes (or "hazard neurons") may be configured instead to send postsynaptic spikes on a delay (or not at all) in response to presynaptic spikes received (in spike waves) at the hazard neuron.

In the case of an absolute hazard, the neuron modeling the hazard or the synapses leading to the neuron may be disabled to effectively disconnect the neuron from the rest of the SNN, restricting activation of the disabled neuron by incoming spikes and forcing spike waves to circumvent the disabled neuron(s) to propagate along less direct paths to the remaining neurons in the SNN. In the case of less-than-absolute hazards, parameters of the neuron may be adjusted to correlate with a relative level of hazard of a corresponding node (or location). The parameters may be adjusted such that the larger the level of hazard, the longer the corresponding neuron delays its postsynaptic response to an incoming spike. In other words, the longer the neuron takes to send an outgoing spike in response to an incoming spike (e.g., included in a spike wave), the higher the level of hazard associated with the corresponding node.

In one example, a neuron response delay may be configured by adjusting an axonal delay parameter of synapses providing incoming spikes to the neuron. The axonal delay parameter may be tuned to cause a delay in the neuron processing an incoming spike (e.g., using its soma process), thereby leading to a corresponding delay in the response of the neuron to incoming spikes. The parameter may be adjusted to correspond to the relative hazard level of the respective neuron, with the axonal delay parameter being increased to model high hazard with longer delays in responding to received spikes, and lower axonal delay values corresponding to hazards of lower severity.

In another example, hazards of varying levels may be additionally or alternatively implemented by adjusting parameters to introduce neural inhibition within neurons modeling hazard nodes in a network (or physical environment). In some cases, neural inhibition can also cause an additional delay between the time a spike arrives at a neuron and the amount of time this incoming spike takes to cause the neuron's membrane or spiking threshold potential to be reached to initiate the sending of outbound postsynaptic spikes by the neuron. In one example, each hazard neuron may be associated with an additional inhibitory neuron. The hazard neuron and its associated inhibitory neuron may share the same presynaptic neuron(s) such that when that presynaptic neuron(s) fires a spike, it is transmitted to both the hazard neuron and its associated inhibitory interneuron. The synaptic weight between this presynaptic neuron(s) and the hazard neuron may be configured to be lower compared to the synaptic weight between the presynaptic neuron(s) and the inhibitory interneuron. As a result, the inhibitory interneuron will fire a spike before its associated hazard neuron can fire a spike. A spike in the inhibitory interneuron may be transmitted to its associated hazard neuron. The weight at this synaptic connection is configured to have a negative (inhibitory) value, such that a spike arriving at this synapse will decrease the membrane voltage in the hazard neuron. Accordingly, the hazard neuron at this point has two incoming synaptic currents, one positive (resulting from the spike in the presynaptic neuron(s) shared by both the hazard neuron and its associated inhibitory interneuron) and one negative (resulting from the spike from the inhibitory interneuron). At any given time, the negative synaptic current is smaller than the positive synaptic current, but its effect is to slow down the integration of the positive synaptic current by the hazard node such that the hazard node reaches spiking threshold at a delayed time. This delay (induced by inhibition) may thus provide the basis of delay for the propagation of spikes in neurons representing hazardous nodes.

Figure 11F:
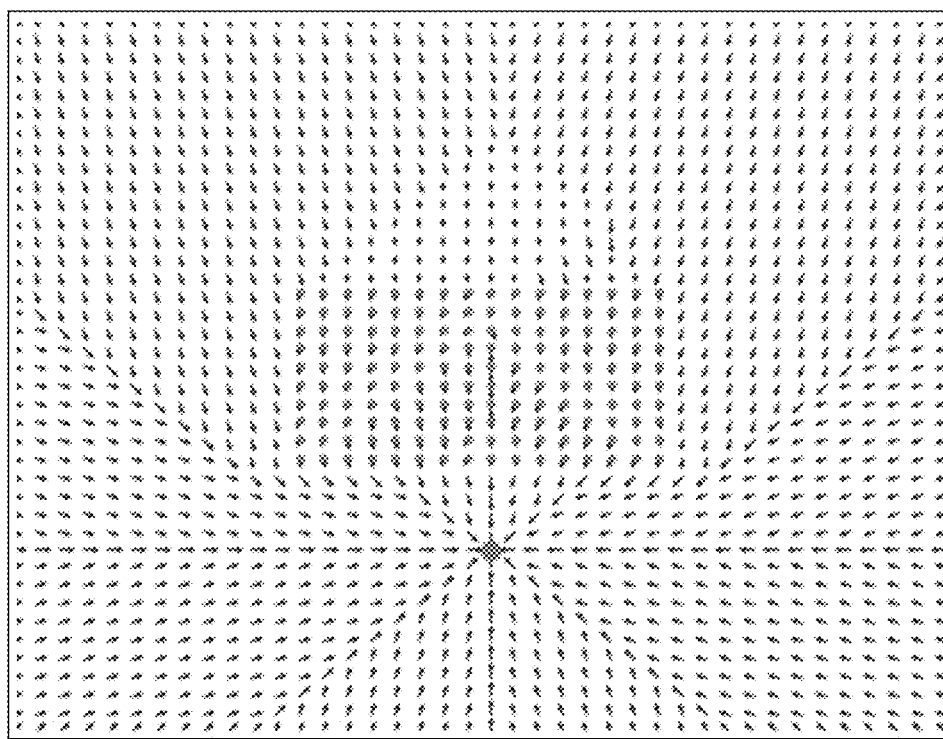

In some implementations, hazard levels of hazard neurons may be modulated using a neuromodulatory signal. This may allow an autonomous agent (e.g., a robot) navigating a corresponding physical location (modeled by the SNN) to provide feedback and influence the path planned based on its internal behavioral state. For example, a robot running very low on charge may correspond to a very "urgent" behavioral state. This state could lower the hazard levels in all the hazard nodes in the network and bias the path planning process to choose shorter paths instead of longer ones even if the shorter path goes through highly hazardous regions. In the axonal delay implementation of hazards, the global neuromodulatory signal would be used to increase or decrease the axonal delay in all the hazard nodes in the network. In the inhibitory interneuron based implementation of hazards, the global neuromodulatory signal would be sent to all the inhibitory interneurons in the network. The inhibitory interneurons, upon receipt of the neuromodulatory signal, will modulate a parameter (internal to each neuron) that represents their excitabilities. This excitability parameter configures how many spikes an interneuron transmits to its corresponding hazard neuron when the interneuron crosses spiking threshold. Thus the neuromodulatory signal can change the number of spikes sent by an inhibitory interneuron to its associated hazard neuron, thereby modulating the amount of delay in the spike generation of the hazard neuron. Accordingly, an autonomous agent may be provide signals to indicate a heightened urgency, thereby changing the vector field associated with the hazard (as illustrated in the diagram 1100i of FIG. 11F). Indeed, the example of FIG. 11F illustrates the effect of a change in urgency (modeled by an excitability parameter of inhibitory interneurons paired with hazard neuron), as compared to a lower urgency modeled in the vector field shown in the example of FIG. 11E. Whereas the vector field biases almost all paths around the hazard locations, the higher urgency modeled in the example of FIG. 11F may permit more of the paths to take a course through the hazard locations, among other examples.

By defining neurons, which may model destinations of potentially varying desirability (such as discussed in the examples of FIGS. 10A-10C) and defining other neurons with potentially varying levels of hazard, SNNs may be defined and implemented (e.g., using a neuromorphic computing device with features similar to those described herein) to model complex networks, including networks modeling coordinates in physical space. For instance, landscapes may be modeled by combining features (e.g., relative reward locations and hazards) shown and described in the examples of FIGS. 10B-11E in a single network or physical space, and developing an SNN which models the various reward destinations and hazards in the physical space. Further, the configurability of the neuromorphic computing device may further allow adjustments to be made to neurons in an SNN modeling an environment to account for changes in the environment (in some cases, in real time). For instance, destination neurons may be defined and the relative desirability of corresponding destinations may be adjusted based on information suggesting a change in the relative desirability of the destinations (e.g., based on information collected from the environment, or from the device, drone, or robot using the neuromorphic computing device to perform path planning in the environment). For instance, neuromorphic signals may be sent within a neuromorphic computing device (e.g., based on a request or signal sent to the neuromorphic computing device) to cause parameters of one or more of the destination neurons modeling relative reward location to be changed to reflect the change in conditions.

Likewise, neurons in an example SNN may be dynamically configured and their parameters adjusted to cause the neurons to model a hazard location or to adjust the level of hazard associated with a location based on additional information acquired by the system. For instance, neurons modeling locations corresponding to a known pathway (e.g., for a ground-based drone or robot) may be configured as non-hazard neurons, while other neurons modeling coordinates off the pathway are modeled as low hazard neurons and neurons modeling locations where walls, trees, or other impediments may be found may be configured as high or absolute hazard neurons. If a hazard is removed, relocated, or introduced into the environment, neurons modeling the corresponding locations may be augmented (e.g., using a neuromodulatory signal) to change the parameters of the neuron to have it more appropriately model the hazard conditions (or lack thereof) at the corresponding location.

As noted above, upon training a particular SNN for path finding toward a particular destination node, paths may be found between a particular source node and the destination node by activating a neuron associated with the particular source node. If conditions of the network do not change and the destination(s) remain the same, the trained SNN may be reused to find the path from any source to the designated destinations. In some instances, if a path has been determined from a particular source to a particular destination using the trained SNN, the results of the path determination may be cached, such that the determined path may be retrieved from cache the next time the path is requested (i.e., rather than rerunning the path simulation in the SNN). As changes are made to the SNN and its neurons (e.g., a change in hazard level, changes to destinations and their relative desirability, etc.), the SNN may be retrained following the adjustments to neuron parameters by reactivating the designated destination neurons and causing new spike waves to propagate through the SNN in accordance with the changes to the SNN, among other examples.

Paths determined using an SNN modeling a physical environment may be cause controllers to direct the movement of an autonomous agent device, such as a vehicle, toy, robot, drone, etc. within the physical environment. As noted above, network traversal may utilize an SNN to generate and read out a path in the SNN corresponding to a path within a corresponding network. For instance, a neuron representing a target node may be stimulated to initiate a spike wave that spreads through the network, thereby causing changes in synaptic weights of synapses negatively correlated to a direction of the spike wave propagation. Neuron thresholds may then be increased through a neuromodulatory signal, and a neuron corresponding to a source node in the network may be stimulated to generate a spike chain from the source neuron to the target. In some implementations, an SNN may model a physical environment and path planning may correspond to planning a path in the physical environment. This path planning may be utilized, in some contexts, to facilitate autonomous navigation. Accordingly, control logic may be provided that is capable of using or translating the path found in the SNN to real motor and/or steering commands that would guide an autonomous agent through a corresponding path. One method of doing so is to use a device (e.g. a path manager) external to the neuromorphic system.

In one example, control logic may be provided that is capable of accepting data describing the path identified through the SNN. For instance, control logic may store and access a mapping of the direction of travel (e.g. North, South, East, West, etc.) between any two location nodes modeled in the SNN. Accordingly, the control logic can receive path data describing a path identified through the SNN and process the path data to determine the corresponding physical path and generate the associated sequence of motor commands to go from the source node to the destination node.

Figure 12:
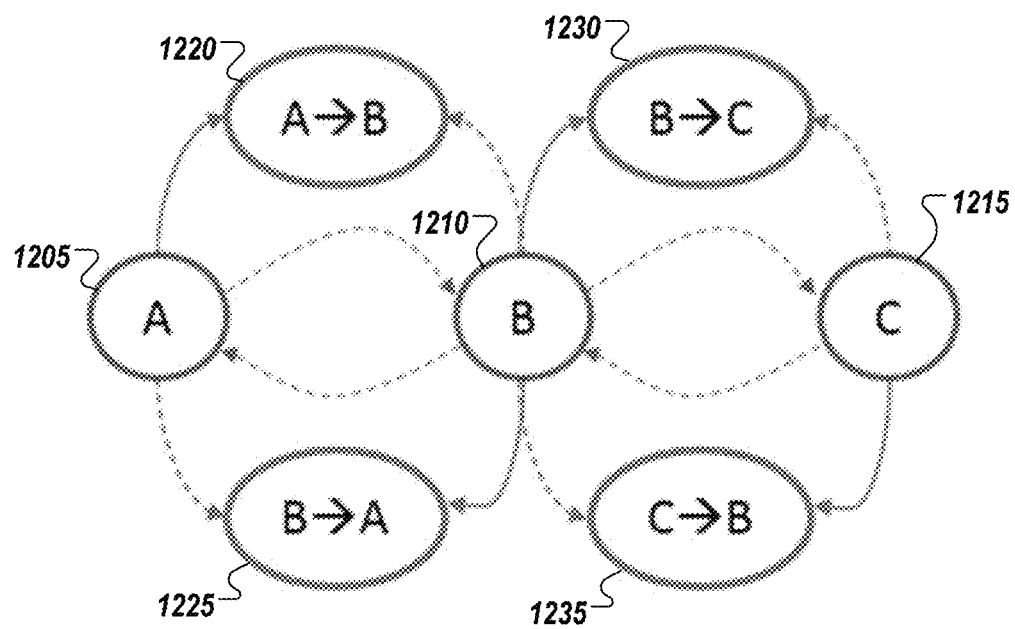
FIG. 12 is a simplified block diagram illustrating example control of an autonomous agent using an example SNN modeling a physical environment.

In other examples, real-time sensor-motor interaction may be provided by implementing motor neurons directly into the SNN. The motor neurons may be in addition to the location neurons representing points within a physical environment. Turning to FIG. 12, a simplified block diagram 1200 is shown illustrating a simplified example of such a network. In this example, location neurons A (1205), B (1210) and C (1215) are providing, which each model a respective point in physical space. As in preceding examples discussed herein, the location neurons (e.g., 1205, 1210, 1215) represent physical points in space (e.g., locations A, B, C, D, etc.) and are bi-directionally connected and configured to facilitate training for path planning to a particular target node. For instance, each of the location neurons may be initially configured to spike in response to a single presynaptic spike. The motor neurons (e.g., 1220, 1225, 1230, 1235) may map generically to particular directions (e.g., right, left, forward, backward, up, down, East, West, North, South, etc.), or in some cases, the relative directions corresponding to travel or movement between any two locations. For instance, travel from location A to location B may be represented by neuron 1220, travel from location B to location A by neuron 1225, travel from location B to location C by neuron 1230, and travel from location C to location B by neuron 1235, etc. Each motor neuron (e.g., 1220, 1225, 1230, 1235) may be configured to generate an output spike to directly cause a corresponding drive or steering mechanism to direct an autonomous agent according to a path determining using the location neurons (e.g., 1205, 1210, 1215) of the SNN. For example, a spike in the neuron B→A (1225) could be interpreted by the system as "go west" (and cause the agent to be automatically directed eastward) while a spike in the neuron B→C (1230) could be interpreted as "go east" (and cause the agent to be automatically directed westward), and so on.

In one example, the SNN may be configured, such that any one of the motor neurons (e.g., 1220, 1225, 1230, 1235) will only be activated (and fire an output spike to control an autonomous agent) upon receiving two presynaptic spikes (e.g., at the same time or in sequence) to reach the spiking threshold configured for the motor neurons. Further, the SNN may be configured such that the motor neurons (e.g., 1220, 1225, 1230, 1235) may be activated (or connected to location neurons of the SNN) and deactivated (or connected to location neurons), for instance, through a neuromodulatory signal. Consequently, in one example, during training of the subnetwork of location neurons, motor neurons may be deactivated such that the spike wave emitted during training (i.e., from activation of a destination neuron) does not affect the motor neurons. With the subnetwork of location neurons trained based on the spike wave, the motor neurons may be reactivated (e.g., through another neuromodulatory signal), such that when a source location neuron is activated, and a spike chain generated, activation of location neurons along a path may also result in spike messages being sent to corresponding motor neurons.

As one example, illustrated in FIG. 12, a node C (represented by neuron 1215) may be designated as a target location and activated at time t=0. The following activity pattern may then be generated:

| | |
|---|---|
| T = 1 | location neuron C spikes |
| T = 2 | location neuron B spikes; |
| T = 3 | motor neuron B->C spikes; A spikes |
| T = 4 | A->B spikes |

In this example, motor neurons C→B and B→A do not spike because the configured axonal delay prevents them from receiving two presynaptic spikes at the same time. Further, in this example, STDP may be selectively enable and disabled for certain synapses. For example, as shown in FIG. 12, STDP may be turned on only at certain synapses in the network. Accordingly, weights will change based on the STDP learning rule only at those synapses that have STDP turned on. In the particular example of FIG. 12, the pattern of activity above increases the weight (via STDP) at the synapse from neuron B 1210 to neuron B→C 1230 and at the synapse from neuron A 1205 to neuron A→B 1220. In subsequent steps, this increase in weight will enable a spike from neuron B 1210 to drive neuron B→C 1230 beyond spiking threshold without the need of a co-occurring spike in neuron C 1215. Similarly, neuron A→B 1220 can be driven beyond spiking threshold by a spike from neuron A 1205 alone without a co-occurring spike from neuron B 1210.

Continuing with this example, in some implementations, a neuromodulatory signal may be sent to raise the spiking threshold of all location neurons in the SNN. Once this signal is turned on, the location neurons (e.g., 1205, 1210, 1215) may be no longer driven beyond spiking threshold by presynaptic spikes in neighboring place neurons. Following, the training of the SNN to find paths to a designated target location, an autonomous agent coupled to the neuromorphic computing device may determine its present location, for instance, by taking continuous measurements of the environment through some localization logic, such as a GPS module, a visual scene recognition engine, etc. These measurements may be used by the system to continuously keep track of its present location. As an example, the autonomous agent (i.e., device) may determine that it is in a particular location represented by a location neuron A 1205. For as long as the agent is in that particular location, neuron A 1205 may receive stimulation (e.g., from the localization logic) driving it beyond spiking threshold. As in previous examples discussed herein, stimulation of neuron A may activate A and cause spike chains to be sent from neuron A to the destination neuron (e.g., neuron C). In this example, every spike from neuron A (based on its simulation) will be followed by a spike in neuron A→B 1220. As neuron A→B 1220 corresponds to a preconfigured direction of travel (e.g., towards the east), activation of neuron A→B 1220 may cause an output spike to be fired directly to the motor or other directional controller of the autonomous agent. For instance, the controller may receive spike signals from neuron A→B 1220 and the controller will generate corresponding motor commands based on this direction of travel and the present orientation of the agent (as measured e.g. by a compass). The agent will keep moving in this direction, until it reaches the place represented by neuron B 1210. At this point neuron B 1210 may be stimulated by an external signal (e.g., from the localization logic) instead of neuron A 1205 causing neuron B→C 1230 to be activated and send signals to the directional control logic. Accordingly, the autonomous agent may be caused to move from the place represented by neuron B towards the place represented by neuron C. This sequence, driven by the spike chain defining the path within the physical environment using the location subnet of the SNN, may be repeated until the localization logic determines that it is presently located within a location corresponding to the destination neuron (e.g., neuron C in this example). Upon determining that the autonomous agent has reached the destination, localization logic may prompt the neuromorphic computing device to cause a second neuromodulatory signal to be sent to return all spiking thresholds and all synaptic weights to their initial values. The neuromodulatory signals may be disabled and the system reset for another physical path calculation (and corresponding travel by the autonomous agent device), among other examples.

Figure 13C:
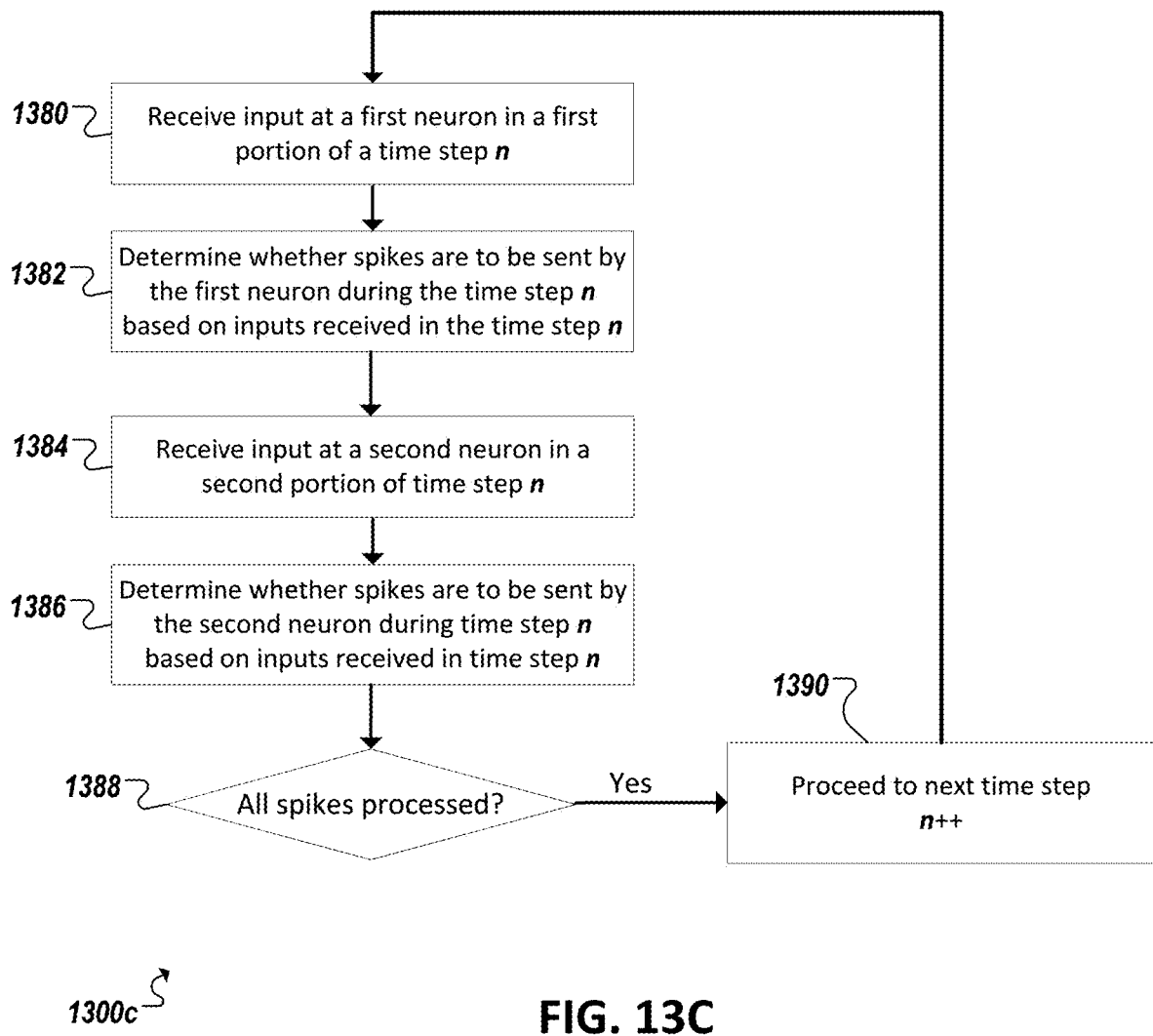

FIGS. 13A-13C are flowcharts 1300a-c illustrating example techniques involving spiking neural networks (SNNs) to determine paths within networks of various topologies. For instance, in the example of FIG. 13A, a technique is shown for determining an optimal path traversing a given network topology using an SNN. For instance, a particular SNN may be implemented 1305 (e.g., by programming a configurable neuromorphic computing device capable of implementing any one of a variety of SNNs with configurable neuron parameters and spike timing dependent plasticity (STDP) rules). The SNN may be implemented to model a particular network topology. Further, configuration and parameters of the SNN may be set to adapt the SNN for use in determining shortest or optimal paths between nodes in the network topology. For instance, each connection between two nodes may be implemented using a respective pair of synapses, one in each direction between the neurons modeling the nodes. Further, each of the weights of the synapses interconnecting the neurons in the SNN may be set to the same weight and the weight may initially permit any incoming (presynaptic) spike to cause the receiving neuron to generate an outgoing (postsynaptic) spike in response. An STDP rule may be defined together with a parameter enforcing a refractory period for sending spikes at each neuron. The combination of STDP rule and refractory period may cause a spike wave to propagate in a particular direction (e.g., radially) outward from the originating neuron and train the SNN by increasing weights of those synapses in each synapse pair which were not the first to carry spikes in the spike wave, according to the STDP rule.

Continuing with the example of FIG. 13A, a first one of the neurons in the SNN may be activated 1310 to designate a network node modeled by the first neuron as a destination node. The activation of the first neuron can cause the first neuron to send spikes to all of its immediate neighboring neurons, which will in turn cause further spikes to be sent, forming a spike wave that may propagate until all neurons connected in the SNN (e.g., neurons connected to another neuron in the SNN (e.g., excluding disconnected neurons, such as those modeling absolute hazard nodes)). Per the configuration of the SNN, an STDP rule may cause synaptic weights of a portion of the SNN's synapses to be adjusted 1315, such that the weights of those synapses directed in a direction opposite to the propagation of the spike wave (i.e., the synapse other than that which carried spikes of the spike wave in the direction of the propagation of the spike wave) are increased. This may cause the SNN to be "trained" to find paths to the designated destination node (and its corresponding neuron). The SNN may be further trained by sending 1320 a neuromodulatory signal to affect all of the neurons in the SNN by increasing the spiking threshold parameter value of each neuron. As a result of the increase in spiking potential, only spikes sent on a synapses with an increased synaptic weight may provide sufficient potential to cause the increased spiking threshold of the receiving neuron to be met, thereby causing the neuron to propagate the spike by sending a spike of its own.

With the SNN trained, a second neuron may be activated 1325, the second neuron corresponding to a network node to represent a source node. Activation of the second neuron can initiate a calculation of a path from the source node to the destination node as modeled by a resulting spike chain in the SNN. Specifically, activating 1325 the source neuron will cause spikes to be sent on the trained SNN, with the spikes causing the propagation of a spike chain along a path of synapses (and neurons) from the source neuron to the destination neuron. The path of the spike chain may represent a shortest path to traverse the modeled network (with the path crossing the nodes modeled by the neurons participating in the propagation of the spike chain initiated by the activation 1325 of the second neuron). In some examples, data may be generated 1330 to describe the network path based on detection of the path of the spike chain. Following the determination of a given path, a different path to the same destination node may be determined simply by activating a different neuron corresponding to a different source node. If it is desired to determine a path to a different destination, the SNN modeling the network may be retrained by first resetting the SNN (e.g., by sending one or more neuromodulatory signals to reset the synaptic weights to their common, default values, and resetting the firing thresholds of the neurons in the SNN). A new destination may be selected by activating another neuron corresponding to a different destination node, to thereby retrain the SNN for the determination of paths toward this new destination node, and so on.

In the example of FIG. 13B, an SNN may be implemented 1340 in a manner similar to the example of FIG. 13A, with the SNN configured for use in determining paths within a given network. In the example of FIG. 13B, however, the network modeled by the SNN may be a network that itself models a physical 2D or 3D environment. As in the example of FIG. 13A, a first neuron modeling one of the physical locations in the environment (e.g., a 2D or 3D coordinate within the environment) may be activated 1345 to designate the corresponding location as a desired destination and cause a spike wave to train the SNN for use in determining paths to the destination location. Synaptic weights may be adjusted 1350 for a portion of the SNN based on the direction of the spike wave's propagation and the STDP rule set during implementation 1340 of the SNN, as in the example of FIG. 13B. A neuromodulatory signal 1355 may also be set to increase spiking threshold potential parameters of the neurons in the SNN. The destination location may then be designated by activating 1360 a corresponding neuron to cause a spike chain to propagate along a path from the activated source neuron to the previously activated destination neuron. In some instances, data may be received that identified as current location of an autonomous device and this data may be used to identify and activate the source neuron that corresponds to this location. Path data may be generated 1365 and describe the path of the spike chain's propagation and map the neurons over which the spike chain propagated to physical locations modeled by the neurons. Alternatively, the path data may indicate the relative changes of location used to traverse the path. Path data may be sent 1370 to a controller for use by the controller in driving and directing the movement of an autonomous device through the physical environment along the path determined using the SNN.

In the example of FIG. 13C, a neuromorphic computing device may include a network of neuromorphic processing cores (e.g., each with a respective arithmetic processing unit and local memory) that may each be used to implement one or more artificial neurons and define synapses between the artificial neurons to construct an SNN. In the example of FIG. 13C, a single core of the neuromorphic computing device may implement multiple neurons within the SNN and may time multiplex access to the core's resources (e.g., processor resources) by the processes (e.g., dendritic and somatic modeling processes) used to implement each of the multiple neurons. Time steps may be defined and utilized with the neuromorphic computing device to synchronize the varied processes of the multiple core implementing the various neurons with an example SNN. For instance, to begin a time step, a neuromorphic core may provide for the neurons to send spikes that are to be sent (e.g., based on previously received presynaptic spikes). In some implementations, a time synchronization barrier process may be utilized by the neuromorphic computing device to guarantee that all spikes scheduled in the previous time step have been delivered before moving to the next time step. Spikes may arrive at neurons in the SNN in arbitrary sequential order, and cause subsequent dendrite and soma process at the receiving neurons (e.g., all in the same time step). For instance, a first one of multiple neurons concurrently implemented by the core may first send any spikes it is to send. Inputs (e.g., provided to the neuron as part of an input vector or as a spike message from another connected neuron) may then be received 1380 and processed. For instance, during a time step n=0, an input may be received 1380 at the first neuron and the corresponding neuromorphic core may determine 1382 (e.g., from previously received spikes, based on parameters configured for the first neuron) whether spikes are to be sent by the first neuron in response to inputs received during time step n=0 (e.g., if the firing potential threshold of the neuron has increased and been met during the time step). The core may then use time multiplexing to turn to another, second one of the neurons implemented by the core during the same time step n=0 (i.e., but in another portion of the time step), process 1384 any inputs (e.g., external input currents or spike messages from other neurons in the SNN) and determine whether any such inputs caused the potential of the neuron to meet or exceed its firing threshold (and cause a spike to be sent (either in the same or an immediately subsequent time step, depending on the configuration of the SNN)). The core can continue dividing the time step and time multiplexing its processing resources until all of the neurons it implements in the SNN have been processed to identify any received presynaptic spikes and determine any resulting postsynaptic spikes. In some instances, processing of spikes may include determining whether an STDP rule applied in the SNN dictates that weights of associated synapses should be adjusted. Adjustment of synaptic weights according to one or more STDP rules may be performed at the neuron level by the neuromorphic computing device at the neuromorphic core implementing a neuron connected within the SNN by the affected synapse. In other cases, synaptic weight changes may be determined globally by centralized logic on the neuromorphic computing device at each time step. When all spikes are determined to be processed (e.g., 1388) and either sent or received (and synaptic weights adjusted where applicable), a virtual clock of the neuromorphic computing device may close a preceding time step and open or proceed 1390 to a next time step (e.g., n++, or n=1 in this example). As in the preceding time step, the cores of the neuromorphic computing device may send and receive spikes for each of the neurons implemented by the neuromorphic computing device, time-multiplexing core resources within each of these time steps, until running of the SNN is concluded.

Figure 14:
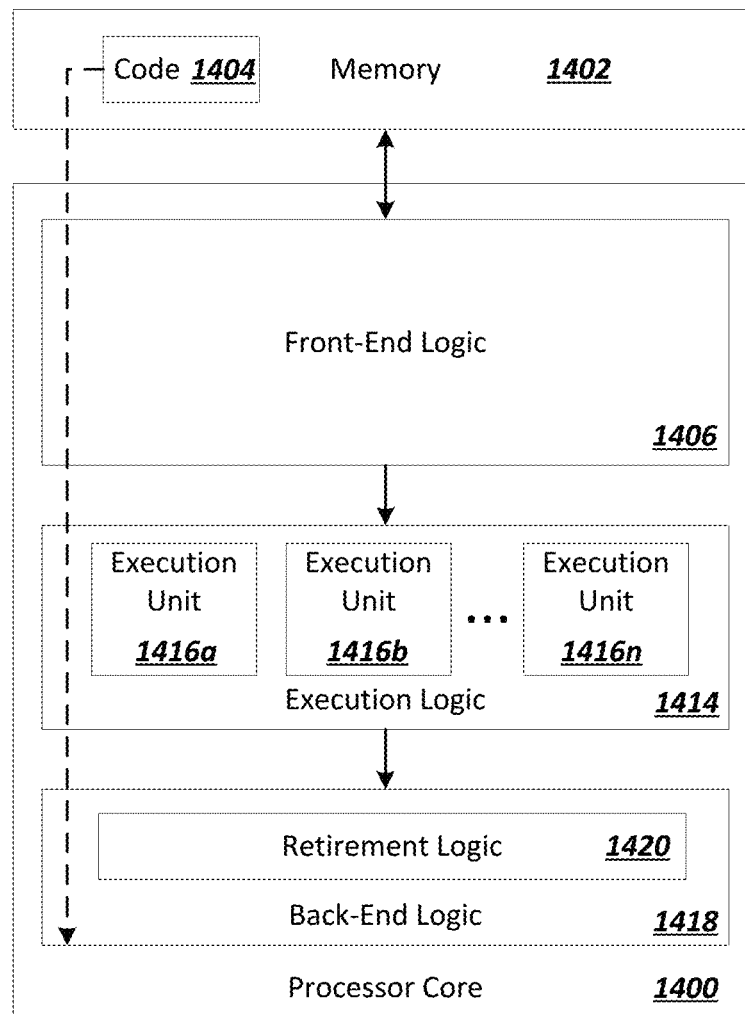
FIG. 14 is a block diagram of an exemplary processor in accordance with one embodiment.
Figure 15:
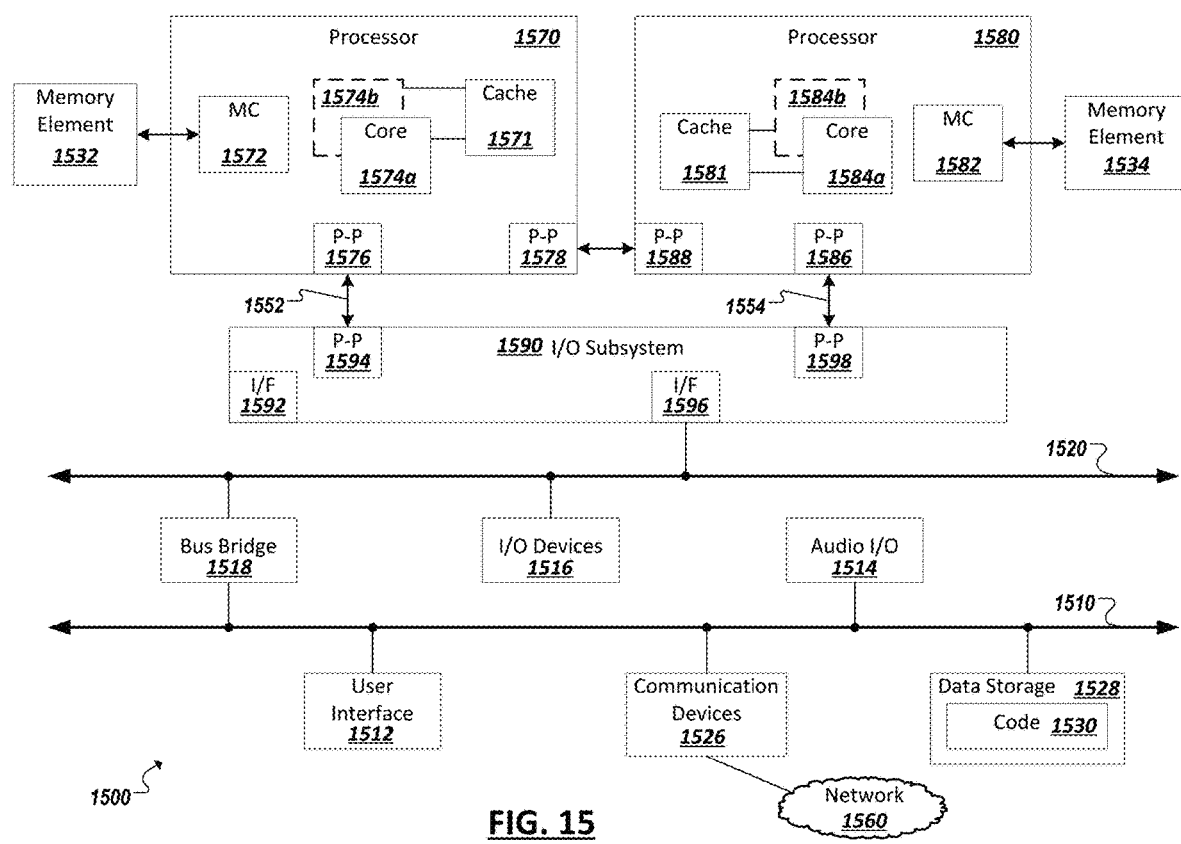
FIG. 15 is a block diagram of an exemplary computing system in accordance with one embodiment.

FIGS. 14-15 are block diagrams of exemplary computer architectures that may be used in accordance with embodiments disclosed herein. Other computer architecture designs known in the art for processors and computing systems may also be used. Generally, suitable computer architectures for embodiments disclosed herein can include, but are not limited to, configurations illustrated in FIGS. 14-15.

FIG. 14 is an example illustration of a processor according to an embodiment. Processor 1400 is an example of a type of hardware device that can be used in connection with the implementations above. Processor 1400 may be any type of processor, such as a microprocessor, an embedded processor, a digital signal processor (DSP), a network processor, a multi-core processor, a single core processor, or other device to execute code. Although only one processor 1400 is illustrated in FIG. 14, a processing element may alternatively include more than one of processor 1400 illustrated in FIG. 14. Processor 1400 may be a single-threaded core or, for at least one embodiment, the processor 1400 may be multi-threaded in that it may include more than one hardware thread context (or "logical processor") per core.

FIG. 14 also illustrates a memory 1402 coupled to processor 1400 in accordance with an embodiment. Memory 1402 may be any of a wide variety of memories (including various layers of memory hierarchy) as are known or otherwise available to those of skill in the art. Such memory elements can include, but are not limited to, random access memory (RAM), read only memory (ROM), logic blocks of a field programmable gate array (FPGA), erasable programmable read only memory (EPROM), and electrically erasable programmable ROM (EEPROM).

Processor 1400 can execute any type of instructions associated with algorithms, processes, or operations detailed herein. Generally, processor 1400 can transform an element or an article (e.g., data) from one state or thing to another state or thing.

Code 1404, which may be one or more instructions to be executed by processor 1400, may be stored in memory 1402, or may be stored in software, hardware, firmware, or any suitable combination thereof, or in any other internal or external component, device, element, or object where appropriate and based on particular needs. In one example, processor 1400 can follow a program sequence of instructions indicated by code 1404. Each instruction enters a front-end logic 1406 and is processed by one or more decoders 1408. The decoder may generate, as its output, a micro operation such as a fixed width micro operation in a predefined format, or may generate other instructions, microinstructions, or control signals that reflect the original code instruction. Front-end logic 1406 also includes register renaming logic 1410 and scheduling logic 1412, which generally allocate resources and queue the operation corresponding to the instruction for execution.

Processor 1400 can also include execution logic 1414 having a set of execution units 1416*a*, 1416*b*, 1416*n*, etc. Some embodiments may include a number of execution units dedicated to specific functions or sets of functions. Other embodiments may include only one execution unit or one execution unit that can perform a particular function. Execution logic 1414 performs the operations specified by code instructions.

After completion of execution of the operations specified by the code instructions, back-end logic 1418 can retire the instructions of code 1404. In one embodiment, processor 1400 allows out of order execution but requires in order retirement of instructions. Retirement logic 1420 may take a variety of known forms (e.g., re-order buffers or the like). In this manner, processor 1400 is transformed during execution of code 1404, at least in terms of the output generated by the decoder, hardware registers and tables utilized by register renaming logic 1410, and any registers (not shown) modified by execution logic 1414.

Although not shown in FIG. 14, a processing element may include other elements on a chip with processor 1400. For example, a processing element may include memory control logic along with processor 1400. The processing element may include I/O control logic and/or may include I/O control logic integrated with memory control logic. The processing element may also include one or more caches. In some embodiments, non-volatile memory (such as flash memory or fuses) may also be included on the chip with processor 1400.

FIG. 15 illustrates a computing system 1500 that is arranged in a point-to-point (PtP) configuration according to an embodiment. In particular, FIG. 15 shows a system where processors, memory, and input/output devices are interconnected by a number of point-to-point interfaces. Generally, one or more of the computing systems described herein may be configured in the same or similar manner as computing system 1500.

Processors 1570 and 1580 may also each include integrated memory controller logic (MC) 1572 and 1582 to communicate with memory elements 1532 and 1534. In alternative embodiments, memory controller logic 1572 and 1582 may be discrete logic separate from processors 1570 and 1580. Memory elements 1532 and/or 1534 may store various data to be used by processors 1570 and 1580 in achieving operations and functionality outlined herein.

Processors 1570 and 1580 may be any type of processor, such as those discussed in connection with other figures. Processors 1570 and 1580 may exchange data via a point-to-point (PtP) interface 1550 using point-to-point interface circuits 1578 and 1588, respectively. Processors 1570 and 1580 may each exchange data with a chipset 1590 via individual point-to-point interfaces 1552 and 1554 using point-to-point interface circuits 1576, 1586, 1594, and 1598. Chipset 1590 may also exchange data with a high-performance graphics circuit 1538 via a high-performance graphics interface 1539, using an interface circuit 1592, which could be a PtP interface circuit. In alternative embodiments, any or all of the PtP links illustrated in FIG. 15 could be implemented as a multi-drop bus rather than a PtP link.

Chipset 1590 may be in communication with a bus 1520 via an interface circuit 1596. Bus 1520 may have one or more devices that communicate over it, such as a bus bridge 1518 and I/O devices 1516. Via a bus 1510, bus bridge 1518 may be in communication with other devices such as a user interface 1512 (such as a keyboard, mouse, touchscreen, or other input devices), communication devices 1526 (such as modems, network interface devices, or other types of communication devices that may communicate through a computer network 1560), audio I/O devices 1514, and/or a data storage device 1528. Data storage device 1528 may store code 1530, which may be executed by processors 1570 and/or 1580. In alternative embodiments, any portions of the bus architectures could be implemented with one or more PtP links.

The computer system depicted in FIG. 15 is a schematic illustration of an embodiment of a computing system that may be utilized to implement various embodiments discussed herein. It will be appreciated that various components of the system depicted in FIG. 15 may be combined in a system-on-a-chip (SoC) architecture or in any other suitable configuration capable of achieving the functionality and features of examples and implementations provided herein. For instance, such a system may include one or more neuromorphic computing devices interconnected with other elements on the system.

Although this disclosure has been described in terms of certain implementations and generally associated methods, alterations and permutations of these implementations and methods will be apparent to those skilled in the art. For example, the actions described herein can be performed in a different order than as described and still achieve the desirable results. As one example, the processes depicted in the accompanying figures do not necessarily require the particular order shown, or sequential order, to achieve the desired results. In certain implementations, multitasking and parallel processing may be advantageous. Additionally, other user interface layouts and functionality can be supported. Other variations are within the scope of the following claims.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

The following examples pertain to embodiments in accordance with this Specification. Example 1 is a machine accessible storage medium having instructions stored thereon, where the instructions when executed on a machine, cause the machine to: define a spiking neural network (SNN) to be implemented on a neuromorphic computing device, where the SNN includes a plurality of artificial neurons and a plurality of artificial synapses to bi-directionally connect the plurality of neurons to model a particular network; send a first signal to a first one of the plurality of neurons, where the first signal is to cause the first neuron to emit one or more first spikes to neighboring neurons in the SNN and cause a wave of spikes to propagate through the network, and weights of a portion of the plurality of synapses are to increase responsive to the wave of spikes based on a spike timing dependent plasticity (STDP) rule defined for the SNN; send a second signal to a second one of the plurality of neurons, where the second signal is to cause the second neuron to emit one or more second spike messages neighboring neurons in the network, the second spike message is to cause a chain of spike messages to propagate to the first neuron on a path including a subset of the portion of synapses based on the increase in the weights of the portion of synapses; and determine that the path includes a shortest path in the particular network from a first network node represented by the second neuron to a second network node represented by the first neuron.

Example 2 may include the subject matter of Example 1, where the instructions, when executed, further cause the machine to send a neuromodulatory signal to the plurality of neurons to increase a spike potential threshold of each of the plurality of neurons, where the neuromodulatory signal is to be sent after sending of the first signal, and propagation of the chain of spike messages on the subset of synapses is further based on the increase in the spike potential threshold.

Example 3 may include the subject matter of any one of Examples 1-2, where the subset of synapses are to transmit spikes in a direction opposite the propagation of the spike wave.

Example 4 may include the subject matter of any one of Examples 1-3, where each bidirectional connection between two neighboring neurons in the plurality of neurons includes a respective synapse pair, where each synapse pair connecting two neighboring neurons includes a respective first synapse from a first one of the neighboring neurons to a second one of the neighboring neurons and a respective second synapse from the second neighboring neuron to the first neighboring neuron.

Example 5 may include the subject matter of Example 4, where spikes in the spike wave are transmitted on at least one of the synapses in each synapse pair in the SNN, and the weight is increased according to the STDP rule only for the synapse in a synapse pair other than the synapse in the synapse pair that first transmitted one of the spikes in the spike wave.

Example 6 may include the subject matter of Example 5, where STDP rule specifies that the weight of a presynaptic synapse of a given neuron is to increase if a spike arrives on the presynaptic synapse within a time duration following a spike being sent on a postsynaptic synapse of the given neuron.

Example 7 may include the subject matter of any one of Examples 1-6, where weights of the plurality of synapses are set to a common value prior to initiation of the spike wave.

Example 8 may include the subject matter of Example 7, where receiving a spike in the spike wave is to cause any one of the plurality of neurons to be activated and send an outgoing spike to one or more respective neighboring neurons in the SNN unless the neuron is in a refractory period, and the refractory period is implemented for each of the plurality of neurons.

Example 9 may include the subject matter of any one of Examples 7-8, where the instructions, when executed, further cause the machine to send a neuromodulatory signal after propagation of the spike chain to reset weights of the plurality of synapses.

Example 10 may include the subject matter of Example 9, where the instructions, when executed, further cause the machine to send another signal to activate third one of the plurality of neurons, where activation of the third neuron causes propagation of another spike wave in the SNN outward from the third neuron, and weights of a different subset of the plurality of synapses are to be increased based on the propagation of the other spike wave.

Example 11 is a method including: defining a spiking neural network (SNN) to be implemented on a neuromorphic computing device, where the SNN includes a plurality of artificial neurons and a plurality of artificial synapses to bi-directionally connect the plurality of neurons to model a particular network; sending a first signal to a first one of the plurality of neurons, where the first signal is to cause the first neuron to emit one or more first spikes to neighboring neurons in the SNN and cause a wave of spikes to propagate through the network, and weights of a portion of the plurality of synapses are to increase responsive to the wave of spikes based on a spike timing dependent plasticity (STDP) rule defined for the SNN; sending a second signal to a second one of the plurality of neurons, where the second signal is to cause the second neuron to emit one or more second spike messages neighboring neurons in the network, the second spike message is to cause a chain of spike messages to propagate to the first neuron on a path including a subset of the portion of synapses based on the increase in the weights of the portion of synapses; and determining that the path includes a shortest path in the particular network from a first network node represented by the second neuron to a second network node represented by the first neuron.

Example 12 may include the subject matter of Example 11, further including sending a neuromodulatory signal to the plurality of neurons to increase a spike potential threshold of each of the plurality of neurons, where the neuromodulatory signal is to be sent after sending of the first signal, and propagation of the chain of spike messages on the subset of synapses is further based on the increase in the spike potential threshold.

Example 13 may include the subject matter of any one of Examples 11-12, where the subset of synapses are to transmit spikes in a direction opposite the propagation of the spike wave.

Example 14 may include the subject matter of any one of Examples 11-13, where each bidirectional connection between two neighboring neurons in the plurality of neurons includes a respective synapse pair, where each synapse pair connecting two neighboring neurons includes a respective first synapse from a first one of the neighboring neurons to a second one of the neighboring neurons and a respective second synapse from the second neighboring neuron to the first neighboring neuron.

Example 15 may include the subject matter of Example 14, where spikes in the spike wave are transmitted on at least one of the synapses in each synapse pair in the SNN, and the weight is increased according to the STDP rule only for the synapse in a synapse pair other than the synapse in the synapse pair that first transmitted one of the spikes in the spike wave.

Example 16 may include the subject matter of Example 15, where STDP rule specifies that the weight of a presynaptic synapse of a given neuron is to increase if a spike arrives on the presynaptic synapse within a time duration following a spike being sent on a postsynaptic synapse of the given neuron.

Example 17 may include the subject matter of any one of Examples 11-16, where weights of the plurality of synapses are set to a common value prior to initiation of the spike wave.

Example 18 may include the subject matter of Example 17, where receiving a spike in the spike wave is to cause any one of the plurality of neurons to be activated and send an outgoing spike to one or more respective neighboring neurons in the SNN unless the neuron is in a refractory period, and the refractory period is implemented for each of the plurality of neurons.

Example 19 may include the subject matter of any one of Examples 17-18, further including sending a neuromodulatory signal after propagation of the spike chain to reset weights of the plurality of synapses.

Example 20 may include the subject matter of Example 19, further including sending another signal to activate third one of the plurality of neurons, where activation of the third neuron causes propagation of another spike wave in the SNN outward from the third neuron, and weights of a different subset of the plurality of synapses are to be increased based on the propagation of the other spike wave.

Example 21 is an apparatus including a neuromorphic computing device including a routing fabric and a plurality of neuromorphic cores, where at least a subset of the plurality of neuromorphic cores are to respectively implement one or more of a plurality of artificial neurons in a spiking neural network (SNN) to model a particular network topology, and each neuron in the SNN models a respective one of a plurality of nodes within the particular network topology. The neuromorphic computing device is further to route a first signal to activate a first one of a plurality of neurons, where the first neuron corresponds to a first one of the plurality of nodes, generate a spike wave based on activation of the first neuron, where the spike wave is to propagate from the first neuron to propagate to other neurons in the plurality of neurons on a first subset of artificial synapses in the SNN, where the artificial synapses are implemented using the routing fabric, adjust synaptic weights of a second subset of the synapses based on propagation of the spike wave and a spike timing dependent plasticity (STDP) rule, and the second subset of synapses include synapses in the SNN other than the first subset of synapses, route a second signal to activate a second one of the plurality of artificial neurons, where the second neuron corresponds to a second one of the plurality of nodes, generate a spike chain originating from the second neuron based on the second signal, where the spike chain is to propagate along a path from the second neuron to the first neuron, and the path includes a portion of the second subset of synapses.

Example 22 may include the subject matter of Example 21, where the particular network topology is one of a random network topology, a small world network topology, a scale free network topology, a hierarchical network topology, and a spatially embedded network topology.

Example 23 may include the subject matter of any one of Examples 21-22, where the particular network topology models a physical environment.

Example 24 may include the subject matter of any one of Examples 21-23, where the neuromorphic computing device further includes logic to generate path data to describe the path.

Example 25 may include the subject matter of Example 24, where the neuromorphic computing device further includes an interface to output the path data to another system.

Example 26 may include the subject matter of any one of Examples 21-25, where the plurality of neuromorphic cores are interconnected by the routing fabric as a mesh of neuromorphic cores.

Example 27 may include the subject matter of any one of Examples 21-26, where the neuromorphic computing device includes one or more memory elements to store one or more routing tables and at least a portion of the synapses of the SNN are defined using the one or more routing tables.

Example 28 may include the subject matter of any one of Examples 21-27, where each neuromorphic core in the plurality of neuromorphic cores includes a respective processing resource and logic to implement one or more artificial neurons.

Example 29 may include the subject matter of Example 28, where the logic to implement one or more neurons in the SNN includes a soma process and one or more dendrite processes for each neuron to be implemented by the respective neuromorphic core.

Example 30 may include the subject matter of any one of Examples 28-29, where each neuromorphic core is to implement two or more of the plurality of artificial neurons.

Example 31 may include the subject matter of any one of Examples 30, where the neuromorphic cores time multiplexes access to the processing resources of the respective neuromorphic core to concurrently implement the two or more artificial neurons.

Example 32 is a system including means to perform the method of any one of Examples 11-20.

Example 33 is a machine accessible storage medium having instructions stored thereon, where the instructions when executed on a machine, cause the machine to: define a spike timing dependent plasticity (STDP) rule to be applied in a spiking neural network (SNN), where the SNN includes a plurality of artificial synapses to bi-directionally connect neurons in the plurality of neurons to model a plurality of locations within a physical environment; send a first signal to activate a first one of a plurality of artificial neurons, where the first signal is to designate a first location in the plurality of locations as a destination location, activating the first neuron causes a spike wave to propagate from the first neuron to other neurons in the plurality of neurons, propagation of the spike wave causes synaptic weights of a subset of the plurality of synapses to be increased based on the STDP rule, and the subset of synapses includes synapses to transmit spikes in a direction opposed to the propagation of the spike wave; send a second signal to activate a second one of the plurality of artificial neurons, where the second signal is to be sent after propagation of the spike wave and is to designate a second location in the plurality of locations as a starting location, and activation of the second neuron causes a spike chain to propagate along a path from the second neuron to the first neuron; and send a third signal to a controller of an autonomous device to cause the autonomous to navigate a physical path from the starting location to the destination location based on the path.

Example 34 may include the subject matter of Example 33, where each of the plurality of neurons corresponds to a respective one of the plurality of locations, the first neuron is defined to correspond to the first location, and the second neuron is defined to correspond to the second location.

Example 35 may include the subject matter of Example 34, where the spike chain propagates to a subset of the plurality of neurons on a portion of the subset of synapses, and the path includes a path over locations represented by the subset of neurons.

Example 36 may include the subject matter of any one of Examples 33-35, where the SNN is defined to model a lattice network corresponding coordinates in the physical environment.

Example 37 may include the subject matter of Example 36, where the lattice network includes one of a two-dimensional lattice to model a two-dimensional physical space or a three-dimensional lattice to model a three-dimensional physical space.

Example 38 may include the subject matter of any one of Examples 33-37, where the instructions, when executed, further cause a machine to send a neuromodulatory signal after propagation of the spike wave to cause an increase in a spiking threshold potential parameter of each of the plurality of neurons.

Example 39 may include the subject matter of any one of Examples 33-38, where the instructions, when executed, further cause a machine to: send a fourth signal after the first and second signals, where the fourth signal is to activate a third one of the plurality of artificial neurons, the fourth signal is to designate a third location corresponding to a third location as a different starting location, and activation of the third neuron causes another spike chain to propagate along a particular path from the third neuron to the first neuron; and determine a path from the third location to the destination location based on the particular path.

Example 40 may include the subject matter of any one of Examples 33-39, where each bidirectional connection between two neighboring neurons in the plurality of neurons includes a respective synapse pair, where each synapse pair connecting two neighboring neurons includes a respective first synapse from a first one of the neighboring neurons to a second one of the neighboring neurons and a respective second synapse from the second neighboring neuron to the first neighboring neuron.

Example 41 may include the subject matter of Example 40, where spikes in the spike wave are transmitted on at least one of the synapses in each synapse pair in the SNN, and the weight is increased according to the STDP rule only for the synapse in a synapse pair other than the synapse in the synapse pair that first transmitted one of the spikes in the spike wave.

Example 42 may include the subject matter of Example 41, where STDP rule specifies that the weight of a presynaptic synapse of a given neuron is to increase if a spike arrives on the presynaptic synapse within a time duration following a spike being sent on a postsynaptic synapse of the given neuron.

Example 43 may include the subject matter of any one of Examples 33-42, where weights of the plurality of synapses are set to a common value prior to initiation of the spike wave. are the same Example 44 may include the subject matter of Example 43, where receiving a spike in the spike wave is to cause any one of the plurality of neurons to be activated and send an outgoing spike to one or more respective neighboring neurons in the SNN unless the neuron is in a refractory period, and the refractory period is implemented for each of the plurality of neuron.

Example 45 is a method including: defining a spike timing dependent plasticity (STDP) rule to be applied in a spiking neural network (SNN), where the SNN includes a plurality of artificial synapses to bi-directionally connect neurons in the plurality of neurons to model a plurality of locations within a physical environment; sending a first signal to activate a first one of a plurality of artificial neurons, where the first signal is to designate a first location in the plurality of locations as a destination location, activating the first neuron causes a spike wave to propagate from the first neuron to other neurons in the plurality of neurons, propagation of the spike wave causes synaptic weights of a subset of the plurality of synapses to be increased based on the STDP rule, and the subset of synapses includes synapses to transmit spikes in a direction opposed to the propagation of the spike wave; sending a second signal to activate a second one of the plurality of artificial neurons, where the second signal is to be sent after propagation of the spike wave and is to designate a second location in the plurality of locations as a starting location, and activation of the second neuron causes a spike chain to propagate along a path from the second neuron to the first neuron; and sending a third signal to a controller of an autonomous device to cause the autonomous to navigate a physical path from the starting location to the destination location based on the path.

Example 46 may include the subject matter of Example 45, where each of the plurality of neurons corresponds to a respective one of the plurality of locations, the first neuron is defined to correspond to the first location, and the second neuron is defined to correspond to the second location.

Example 47 may include the subject matter of Example 46, where the spike chain propagates to a subset of the plurality of neurons on a portion of the subset of synapses, and the path includes a path over locations represented by the subset of neurons.

Example 48 may include the subject matter of any one of Examples 45-47, where the SNN is defined to model a lattice network corresponding coordinates in the physical environment.

Example 49 may include the subject matter of Example 48, where the lattice network includes one of a two-dimensional lattice to model a two-dimensional physical space or a three-dimensional lattice to model a three-dimensional physical space.

Example 50 may include the subject matter of any one of Examples 45-49, further including sending a neuromodulatory signal after propagation of the spike wave to cause an increase in a spiking threshold potential parameter of each of the plurality of neurons.

Example 51 may include the subject matter of any one of Examples 45-50, further including sending a third signal after the first and second signals, where the third signal is to activate a third one of the plurality of artificial neurons, the third signal is to designate a third location corresponding to a third location as a different starting location, and activation of the third neuron causes another spike chain to propagate along a particular path from the third neuron to the first neuron; and determining a path from the third location to the destination location based on the particular path.

Example 52 is an apparatus including a neuromorphic computing device including a routing fabric and a plurality of neuromorphic cores, where at least a subset of the plurality of neuromorphic cores are to respectively implement one or more of a plurality of artificial neurons in a spiking neural network (SNN) to model a physical environment, and each neuron in the SNN models a respective one of a plurality of locations within the physical environment. The neuromorphic computing device is further to route a first signal to activate a first one of a plurality of artificial neurons, where the first neuron corresponds to a first one of the plurality of locations, generate a first set of spikes to be sent by the first neuron in response to activation of the first neuron, where the first set of spikes causes a spike wave in the SNN, propagate the spike wave to other neurons in the plurality of neurons on artificial synapses in the SNN, where the artificial synapses are implemented using the routing fabric, adjust synaptic weights of a subset of the synapses based on propagation of the spike wave and a spike timing dependent plasticity (STDP) rule, and the subset of synapses includes synapses to transmit spikes in a direction opposed to the propagation of the spike wave, route a second signal to activate a second one of the plurality of artificial neurons, where the second neuron corresponds to a second one of the plurality of locations, generate a second set of spikes to be sent by the second neuron in response activation of the second neuron, propagate a spike chain across a portion of the subset of synapses, where the spike chain is initiated by the second set of spikes, and the spike chain is to propagate along a path defined by the portion of the subset of synapses from the second neuron to the first neuron in the SNN.

Example 53 may include the subject matter of Example 52, where the neuromorphic computing device further includes logic to generate data to describe the path, where the path includes a subset of the neurons and corresponds to a path in the physical environment including locations modeled by the subset of neurons.

Example 54 may include the subject matter of any one of Examples 52-53, where the neuromorphic computing device is further to implement at least one of the neurons in the SNN as a hazard neuron to model a hazard location in the physical environment.

Example 55 may include the subject matter of Example 54, where the hazard location includes an absolute hazard and the hazard neuron is implemented to be disconnected from other neurons in the SNN and is not to receive the spike wave.

Example 56 may include the subject matter of Example 54, where the neuromorphic computing device implements the hazard neuron to cause the hazard neuron to delay sending of postsynaptic spikes responsive to presynaptic spikes to be received at the hazard neuron.

Example 57 may include the subject matter of Example 56, where the delay is implemented by increasing an axonic delay parameter of the hazard neuron.

Example 58 may include the subject matter of Example 56, where the delay is implemented by providing an inhibitory interneuron to correspond to the hazard neuron to model neural inhibition at the hazard neuron.

Example 59 may include the subject matter of any one of Examples 56-58, where length of the delay corresponds to severity of the hazard location.

Example 60 may include the subject matter of any one of Examples 52-59, where the first signal includes a plurality of first signals and the plurality of first signals are to be routed to a set of destination neurons including the first neuron and at least a third neuron, and the spike wave is initiated by spikes generated at each of the neurons in the set of destination neurons.

Example 61 may include the subject matter of Example 60, where a first portion of the spikes to initiate the spike wave are to be sent a duration of time ahead of a second portion of the spikes to initiate the spike wave to model relative desirability of a first portion of the set of destination neurons over a second portion of the set of destination neurons, where the first portion of the spikes are to be sent by the first portion of destination neurons, and the second portion of the spikes are to be sent by the second portion of the destination neurons.

Example 62 may include the subject matter of Example 61, where a length of the duration of time corresponds to a degree of difference in the relative desirability.

Example 63 may include the subject matter of any one of Examples 52-62, where the path includes a SNN path and the apparatus further includes a particular device including a movement control to accept an input based on the SNN path and direct movement of the particular device along a physical path within the physical environment based on the input.

Example 64 may include the subject matter of Example 63, where the particular device includes a robot.

Example 65 may include the subject matter of Example 63, where the particular device includes a drone.

Example 66 may include the subject matter of Example 63, where the particular device includes an autonomous vehicle.

Example 67 may include the subject matter of any one of Examples 63-66, where the particular device includes logic to determine a start location and provide data to the neuromorphic computing device to cause the second signal to be routed to the second neuron.

Example 68 may include the subject matter of any one of Examples 52-67, where the first set of spikes to initiate the spike wave are to be sent together in a particular time step.

Example 69 may include the subject matter of any one of Examples 52-68, where the spiking neural network is implemented using a neuromorphic computing device including a network of neuromorphic cores.

Example 70 may include the subject matter of Example 69, where the network of neuromorphic cores includes: a plurality of neuromorphic cores, each neuromorphic core in the plurality of neuromorphic cores includes a respective processing resource and logic to implement one or more artificial neurons; one or more routers to route spiking messages between artificial neurons implemented using the plurality of neuromorphic cores; and memory including data to define interconnections of the plurality of artificial neurons in the spiking neural network.

Example 71 may include the subject matter of Example 70, where each neuromorphic core is to implement two or more of the plurality of artificial neurons.

Example 72 may include the subject matter of Example 71, where the neuromorphic cores time multiplexes access to the processing resources of the respective neuromorphic core to concurrently implement the two or more artificial neurons.

Example 73 is a system including means to perform the method of any one of Examples 45-51.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results.

What is claimed is:

1. At least one non-transitory machine accessible storage medium having instructions stored thereon, wherein the instructions when executed on a machine, cause the machine to:

define a spiking neural network (SNN) to be implemented on a neuromorphic computing device, wherein the SNN comprises a plurality of artificial neurons and a plurality of artificial synapses forming bidirectional connections between neighboring neurons of the plurality of artificial neurons to model a particular network;

send a first signal to a first neuron of the plurality of artificial neurons, wherein the first signal is to cause the first neuron to emit one or more first spikes to neighboring neurons in the SNN and cause a wave of spikes to propagate through the SNN, and weights of a portion of the plurality of artificial synapses are to increase responsive to the wave of spikes based on a spike timing dependent plasticity (STDP) rule defined for the SNN;

send a neuromodulatory signal to the plurality of artificial neurons to increase a spike potential threshold of each of the plurality of artificial neurons to a value higher than used in propagation of the wave of spikes through the SNN, wherein the neuromodulatory signal is to be sent after sending of the first signal;

send a second signal to a second neuron of the plurality of artificial neurons after the neuromodulatory signal is sent to the plurality of artificial neurons, wherein the second signal is to cause the second neuron to emit one or more second spikes to neighboring neurons in the SNN, the one or more second spikes are to cause a chain of spikes to propagate to the first neuron on a path comprising a subset of the portion of artificial synapses based on the increase in the weights of the portion of artificial synapses, and propagation of the chain of spikes on the subset of artificial synapses is further based on the increase in the spike potential threshold; and determine that the path comprises a shortest path in the particular network from a first network node represented by the second neuron to a second network node represented by the first neuron.

2. The storage medium of claim 1, wherein the subset of artificial synapses are to transmit spikes in a direction opposite the propagation of the wave of spikes.

3. The storage medium of claim 1, wherein each bidirectional connection between two neighboring neurons in the plurality of artificial neurons comprises a respective synapse pair of the plurality of artificial synapses, wherein each synapse pair connecting two neighboring neurons comprises a respective first synapse from a first one of the neighboring neurons to a second one of the neighboring neurons and a respective second synapse from the second neighboring neuron to the first neighboring neuron.

4. The storage medium of claim 3, wherein spikes in the wave of spikes are transmitted on at least one of the synapses in each synapse pair in the SNN, and the weight is increased according to the STDP rule only for the synapse in a synapse pair other than the synapse in the synapse pair that first transmitted one of the spikes in the wave of spikes.

5. The storage medium of claim 4, wherein STDP rule specifies that a weight of a presynaptic synapse of a given artificial neuron is to increase if a spike arrives on the presynaptic synapse within a time duration following a spike being sent on a postsynaptic synapse of the given artificial neuron.

6. The storage medium of claim 1, wherein weights of the plurality of artificial synapses are set to a common value prior to initiation of the wave of spikes.

7. The storage medium of claim 6, wherein receiving a spike in the wave of spikes is to cause any one neuron of the plurality of artificial neurons to be activated and send an outgoing spike to one or more respective neighboring neurons in the SNN unless the one neuron is in a refractory period, and the refractory period is implemented for each of the plurality of artificial neurons.

8. The storage medium of claim 6, wherein the instructions, when executed, further cause the machine to send a neuromodulatory signal after propagation of the chain of spikes to reset weights of the plurality of artificial synapses.

9. The storage medium of claim 8, wherein the instructions, when executed, further cause the machine to send another signal to activate a third neuron of the plurality of artificial neurons, wherein activation of the third neuron causes propagation of another wave of spikes in the SNN outward from the third neuron, and weights of a different subset of the plurality of artificial synapses are to be increased based on the propagation of the other wave of spikes.

10. A method comprising:
defining a spiking neural network (SNN) to be implemented on a neuromorphic computing device, wherein the SNN comprises a plurality of artificial neurons and a plurality of artificial synapses forming bidirectional connections between neighboring neurons of the plurality of artificial neurons to model a particular network;

sending a first signal to a first neuron of the plurality of artificial neurons, wherein the first signal is to cause the first neuron to emit one or more first spikes to neighboring neurons in the SNN and cause a wave of spikes to propagate through the SNN, and weights of a portion of the plurality of artificial synapses are to increase responsive to the wave of spikes based on a spike timing dependent plasticity (STDP) rule defined for the SNN;

sending a neuromodulatory signal to the plurality of artificial neurons to increase a spike potential threshold of each of the plurality of artificial neurons used in propagation of the wave of spikes through the SNN, wherein the neuromodulatory signal is to be sent after sending of the first signal;

sending a second signal to a second neuron of the plurality of artificial neurons after the sending of the neuromodulatory signal, wherein the second signal is to cause the second neuron to emit one or more second spikes to neighboring neurons in the SNN, the one or more second spikes are to cause a chain of spikes to propagate to the first neuron on a path comprising a subset of the portion of artificial synapses based on the increase in the weights of the portion of artificial synapses, and propagation of the chain of spikes on the subset of artificial synapses is further based on the increase in the spike potential threshold; and determining that the path comprises a shortest path in the particular network from a first network node represented by the second neuron to a second network node represented by the first neuron.

11. An apparatus comprising:
a neuromorphic computing device comprising:
a routing fabric;
a plurality of neuromorphic cores, wherein at least a subset of the plurality of neuromorphic cores are to respectively implement one or more of a plurality of artificial neurons in a spiking neural network (SNN) to model a particular network topology, and each artificial neuron in the SNN models a respective one of a plurality of nodes within the particular network topology;

wherein the neuromorphic computing device is to:
route a first signal to activate a first neuron of a plurality of artificial neurons, wherein the first neuron corresponds to a first one of the plurality of nodes;
generate a spike wave based on activation of the first neuron, wherein the spike wave is to propagate from the first neuron to other neurons in the plurality of artificial neurons on a first subset of artificial synapses in the SNN, wherein the artificial synapses are implemented using the routing fabric;
adjust synaptic weights of a second subset of the artificial synapses based on propagation of the spike wave and a spike timing dependent plasticity (STDP) rule, and the second subset of artificial synapses comprise artificial synapses in the SNN other than the first subset of artificial synapses;
route a neuromodulatory signal to the plurality of artificial neurons to increase a spike potential threshold of each of the plurality of artificial neurons to a value higher than used in propagation of the spike wave through the SNN, wherein the neuromodulatory signal is to be sent after the first signal;
route a second signal to activate a second neuron of the plurality of artificial neurons, wherein the second signal is to be sent after the neuromodulatory signal, wherein the second neuron corresponds to a second one of the plurality of nodes; and generate a spike chain originating from the second neuron based on the second signal, wherein the spike chain is to propagate along a path from the second neuron to the first neuron, wherein the path comprises a portion of the second subset of artificial synapses, and the propagation of the spike chain on the second subset of artificial synapses is based on the increase in the spike potential thresholds of the plurality of artificial neurons.

12. The apparatus of claim 11, wherein the particular network topology is one of a random network topology, a small world network topology, a scale free network topology, a hierarchical network topology, and a spatially embedded network topology.

13. The apparatus of claim 11, wherein the particular network topology models a physical environment.

14. The apparatus of claim 11, wherein the neuromorphic computing device further comprises logic to generate path data to describe the path.

15. The apparatus of claim 14, wherein the neuromorphic computing device further comprises an interface to output the path data to another system.

16. The apparatus of claim 11, wherein the plurality of neuromorphic cores are interconnected by the routing fabric as a mesh of neuromorphic cores.

17. The apparatus of claim 11, wherein the neuromorphic computing device comprises one or more memory elements to store one or more routing tables and at least a portion of the artificial synapses of the SNN are defined using the one or more routing tables.

18. The apparatus of claim 11, wherein each neuromorphic core in the plurality of neuromorphic cores comprises a respective processing resource and logic to implement one or more artificial neurons.

19. The apparatus of claim 18, wherein the logic to implement one or more artificial neurons in the SNN comprises a soma process and one or more dendrite processes for each artificial neuron to be implemented by the respective neuromorphic core.

\* \* \* \* \*